PCM TIME DIVISION TELEPHONE SWITCHING SYSTEM

Filed Sept. 11, 1958

INVENTORS: D. B. JAMES
J. D. JOHANNESEN
M. KARNAUGH
W. A. MALTHANER

BY John C. Albrecht
ATTORNEY

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 5

INVENTORS: D. B. JAMES
J. D. JOHANNESEN
M. KARNAUGH
W. A. MALTHANER
BY John C Albert
ATTORNEY Oct. 25, 1960 D. B. JAMES ET AL 2,957,949

PCM TIME DIVISION TELEPHONE SWITCHING SYSTEM

Filed Sept. 11, 1958 44 Sheets-Sheet 6

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 8

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John A. Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 13

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 17

INVENTORS: D. B. JAMES
J. D. JOHANNESEN
M. KARNAUGH
W. A. MALTHANER
BY John C Albrecht
ATTORNEY Oct. 25, 1960 D. B. JAMES ET AL 2,957,949

PCM TIME DIVISION TELEPHONE SWITCHING SYSTEM

Filed Sept. 11, 1958 44 Sheets-Sheet 18

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 22

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY

INVENTORS: D. B. JAMES
J. D. JOHANNESEN
M. KARNAUGH
W. A. MALTHANER

BY John C Albrecht
ATTORNEY

PCM TIME DIVISION TELEPHONE SWITCHING SYSTEM

Filed Sept. 11, 1958

INVENTORS: D. B. JAMES
J. D. JOHANNESEN
M. KARNAUGH
W. A. MALTHANER
BY John C Albrecht
ATTORNEY INVENTORS: D. B. JAMES
J. D JOHANNESEN
M. KARNAUGH
W. A. MALTHANER
BY John C Albrecht
ATTORNEY Oct. 25, 1960 D. B. JAMES ET AL 2,957,949

PCM TIME DIVISION TELEPHONE SWITCHING SYSTEM

Filed Sept. 11, 1958 44 Sheets-Sheet 28

INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958 44 Sheets-Sheet 29

INVENTORS: D. B. JAMES
J. D. JOHANNESEN
M. KARNAUGH
W. A. MALTHANER
BY John C Albrecht
ATTORNEY Oct. 25, 1960 D. B. JAMES ET AL 2,957,949

PCM TIME DIVISION TELEPHONE SWITCHING SYSTEM

Filed Sept. 11, 1958 44 Sheets-Sheet 30

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY

PCM TIME DIVISION TELEPHONE SWITCHING SYSTEM

Filed Sept. 11, 1958

INVENTORS: D. B. JAMES
J. D. JOHANNESEN
M. KARNAUGH
W. A. MALTHANER
BY John C. Albrecht
ATTORNEY

T — AUTOMATIC TRANSITION

◇ — MANUAL TRANSITION

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER
BY John C Albrecht
ATTORNEY Oct. 25, 1960 D. B. JAMES ET AL 2,957,949

PCM TIME DIVISION TELEPHONE SWITCHING SYSTEM

Filed Sept. 11, 1958 44 Sheets-Sheet 38

INVENTORS: D. B. JAMES
J. D. JOHANNESEN
M. KARNAUGH
W. A. MALTHANER

BY John C Albrecht
ATTORNEY

INVENTORS: D. B. JAMES
J. D. JOHANNESEN
M. KARNAUGH
W. A. MALTHANER

BY John C Albrecht
ATTORNEY

Oct. 25, 1960 D. B. JAMES ET AL 2,957,949

PCM TIME DIVISION TELEPHONE SWITCHING SYSTEM

Filed Sept. 11, 1958 44 Sheets-Sheet 40

INVENTORS: D. B. JAMES
J. D. JOHANNESEN
M. KARNAUGH
W. A. MALTHANER

BY John C Albrecht

ATTORNEY

Oct. 25, 1960 D. B. JAMES ET AL 2,957,949

PCM TIME DIVISION TELEPHONE SWITCHING SYSTEM

Filed Sept. 11, 1958 44 Sheets-Sheet 41

INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY INVENTORS: D. B. JAMES
J. D. JOHANNESEN
M. KARNAUGH
W. A. MALTHANER
BY John C Albrecht
ATTORNEY 2,957,949

PCM TIME DIVISION TELEPHONE SWITCHING SYSTEM

Dennis B. James, Far Hills, John D. Johannesen, Morris Plains, Maurice Karnaugh, Bernardsville, and William A. Malthaner, New Providence, N.J., assignors to Bell Telephone Laboratories, Incorporated, New York, N.Y., a corporation of New York Filed Sept. 11, 1958, Ser. No. 760,502

54 Claims. (Cl. 179—18)

This invention relates in general to electronic switching and transmission systems, and more particularly to electronic telephone switching systems.

Through the years, telephone switching systems have progressed from completely manual and electromechanical systems to systems wherein the potentials of high speed electronic devices are utilized. With this progress, there has been vastly increased concentration of control functions in a central common control. Accordingly, the equipment allocated on a per line or per trunk basis has been simplified, and the equipment common to an entire office or switching unit has greatly increased in complexity. The savings in cost of per line or per trunk equipment has more than balanced the increased cost of the common equipment, and in addition, greater flexibility of operation has been achieved.

Heretofore, however, switching and transmission concepts have been treated separately in telephone switching systems. That is, switching systems have been designed without great regard for optimum transmission conditions and vice versa.

Accordingly, it is an object of this invention to improve telephone switching systems through an advantageous combination of switching and transmission techniques.

It is a further object of this invention to effect savings in outside cable facilities connecting subscribers and the central office.

It is a further object of this invention to improve the transmission characteristics of automatic telephone systems.

It is still another object of this invention to simplify and optimize the switching medium connecting the various subscribers.

It is a further object of this invention to permit orderly growth of a telephone switching system on a modular basis.

It is still another object of this invention to minimize the current handling requirements of the telephone switching network interconnecting the various subscribers.

It is a further object of this invention to permit connection to telephose switching centers employing different methods of switching and transmission, thereby making the subject system fully compatible with existing systems.

These and other objects of this invention are achieved in one specific illustrative embodiment wherein remote line concentrators are employed, and wherein switching at both the concentrator and the central office is on a time division multiplex basis. Advantageously, transmission between concentrators is by time division pulse code modulation. In this system, subscribers are served by the concentrator on a time division basis and transmission between the subscriber and the concentrator is on a normal analog voice frequency basis.

In transmission and switching systems crosstalk problems become rapidly more complex as the number of circuits treated in a common group increases and are more troublesome between circuits carrying analog signals than between circuits carrying digital signals. Accordingly, it is a feature of this invention that minimization of crosstalk is achieved by performing all analog to digital conversion in the small modular building blocks so that only small groups of lines are subjected to analog crosstalk exposure.

Time division switching at both the concentrator and the central office greatly reduces the bulk and complexity of the switching networks at these locations. Power, space, and voltage level requirements may further be reduced through the exclusive use of solid state devices. The reduction in size at the central office is aided by the use of simple incoming conductor connecting blocks since a fewer number of conductors are required between concentrators and the central office than are required for subscribers in systems not having remote concentrators. Pulse code modulation transmission between concentrators and through the central office permits connections which have a constant net loss, a constant bandwidth, and which are free of transmission noise. Further, the quality of transmission is independent of transmission medium, makeup, and length, and the variable circuit loss in such a system results from the transmission losses incurred in the two-wire voice frequency analog circuits between the subscribers and the concentrators.

In this one specific illustrative embodiment, transmission between the concentrators and the central office is by way of four-wire transmission lines and control of the concentrator is effected over a two-wire line from the central office to the concentrator.

Since the connection between subscribers of the subject system and other telephone switching centers is effected at the central office, arrangements must be provided to convert the pulse coded modulation signals from a concentrator to normal analog voice frequency signals for transmission to distant offices, and conversely, means must be provided to convert voice frequency signals from distant offices to pulse code modulation signals for transmission to remote concentrators. Accordingly, a device called a trunkor, which is similar to a remote concentrator, is employed at the central office to provide the link between the subject system and a local manual control switchboard and between the subject central office and other telephone switching centers. The trunkor differs from the concentrators in that it serves trunks rather than subscribers. Since it may be physically located near the central office, it may be possible to obtain timing signals directly from the central office; therefore, much of the control circuitry necessary for a concentrator can be omitted in the trunkor.

In accordance with one feature of this invention, the switching and transmission aspects of the system are considered as a single problem and are concomittantly optimized through the use of pulse code modulation transmission techniques and time division switching arrangements.

In accordance with another feature of this invention, lossless speech transmission is achieved between concentrators and between concentrators and trunkors by use of pulse code modulation signals.

In accordance with another feature of this invention, the switching networks in concentrators, trunkors, and the central office are operated on a time division basis.

In accordance with another feature of this invention, an improved time division hybrid is employed in each concentrator to connect a two-wire PAM (Pulse Amplitude Modulation) transmission bus employed in a concentrator to a four-wire trunk to the central office, and modular line packages are provided as required to connect lines to the PAM bus.

In accordance with another feature of this invention, a trunk concentrator, termed a trunkor, is advantageously employed to provide the link between the subscribers of the subject system and other telephone switching centers.

In accordance with another feature of this invention, similarly numbered subscribers' lines in all concentrators are simultaneously scanned to detect the supervisory state thereof.

In accordance with another feature of this invention, the identities of the lines to be connected through the time division switching network of a remote concentrator and the identity of lines to be scanned are transmitted from the central office to the remote concentrator over a single control pair.

In accordance with another feature of this invention, the switching and transmission system is arranged on a modular basis to permit an orderly growth of a switching center with central and remote units as basic modules. These modules are interconnected on a time division basis through space separated gates at the central module.

In accordance with another feature of this invention, delay lines in combination with relatively short shift registers are employed as memory devices for maintenance of data regarding transmission connections through the system and progress information regarding the establishment, maintenance, and disestablishment of these connections.

In accordance with another feature of this invention, busy tones and other supervisory tones are transmitted to remote concentrators from the central office without engagement of the central office time division switching network.

The transmission delay in the two-wire speech pair from the central office to the concentrator and the two-wire control pair from the central office to the remote concentrator will change or vary similarly with changes in temperature. Accordingly, in accordance with another feature of this invention, the total loop transmission delay from the central office to a remote concentrator and back is adjusted by means of a single delay line inserted at the central office in the send transmission path which carries coded speech and scanner signals from a remote concentrator to the central office.

In accordance with another feature of this invention, operation in the remote concentrator is maintained in proper time relationship with operations at the central office by means of discrete framing signals transmitted from the central office to the remote concentrators.

In accordance with another feature of this invention, transmission circuits through the system having additional bandwidth may be provided by increasing the speech sampling rate for particular lines and by accordingly changing the line filter. The increased sampling rate is achieved by repetition of entries in the memory.

The above and other objects and features of this invention can best be understood in reference to the drawings in which.

Figure 4:
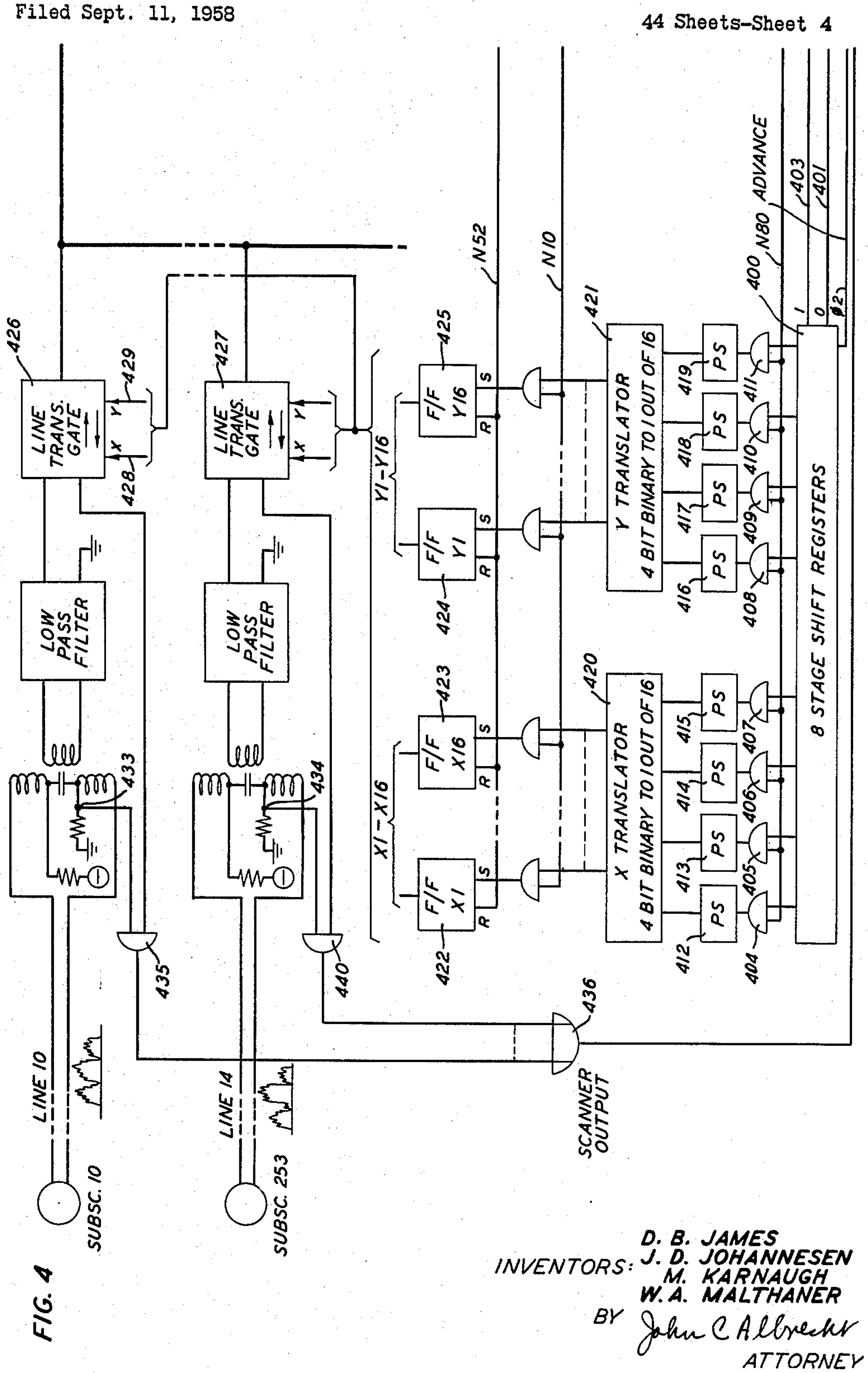
Figure 5:
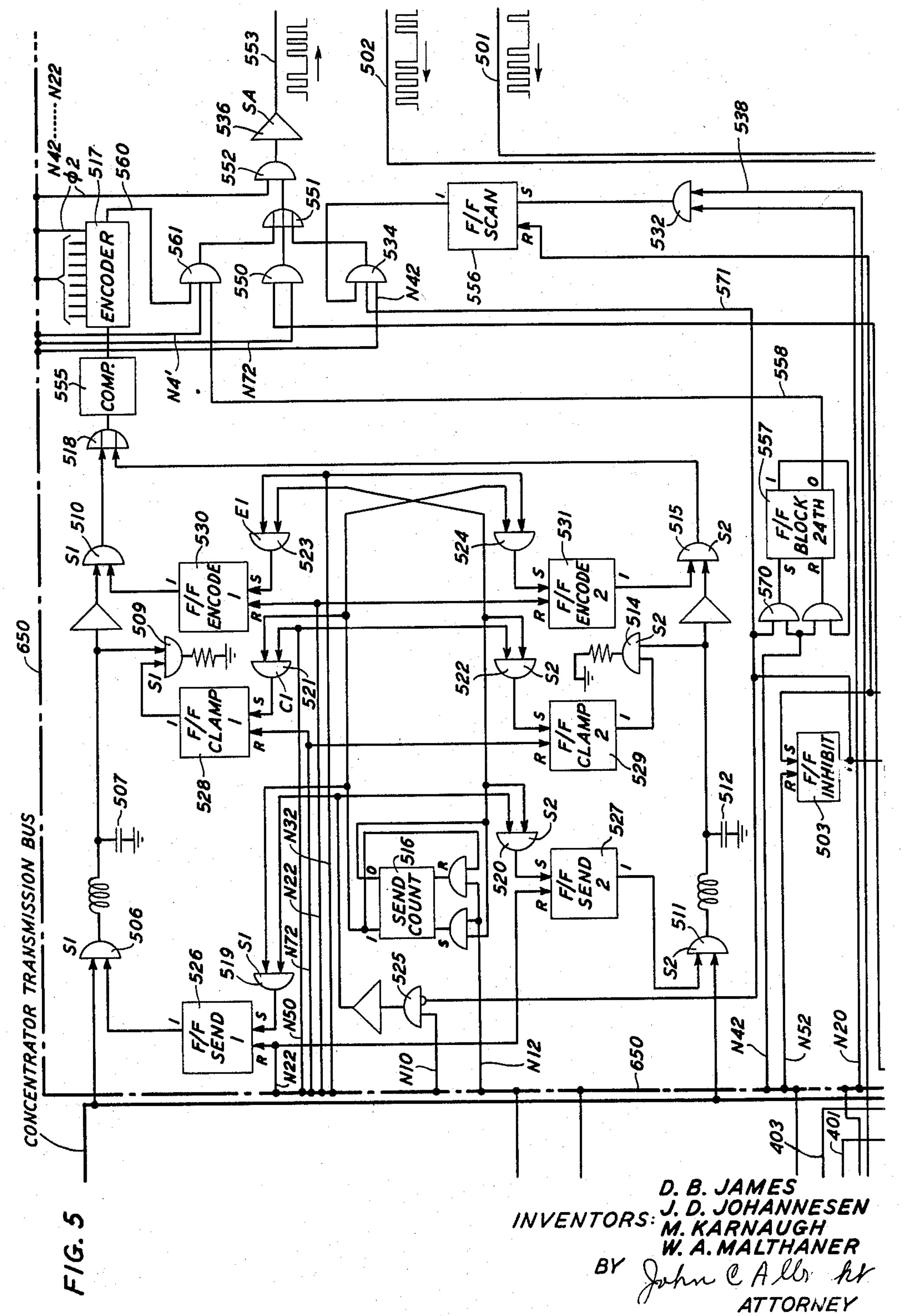
Figure 6:
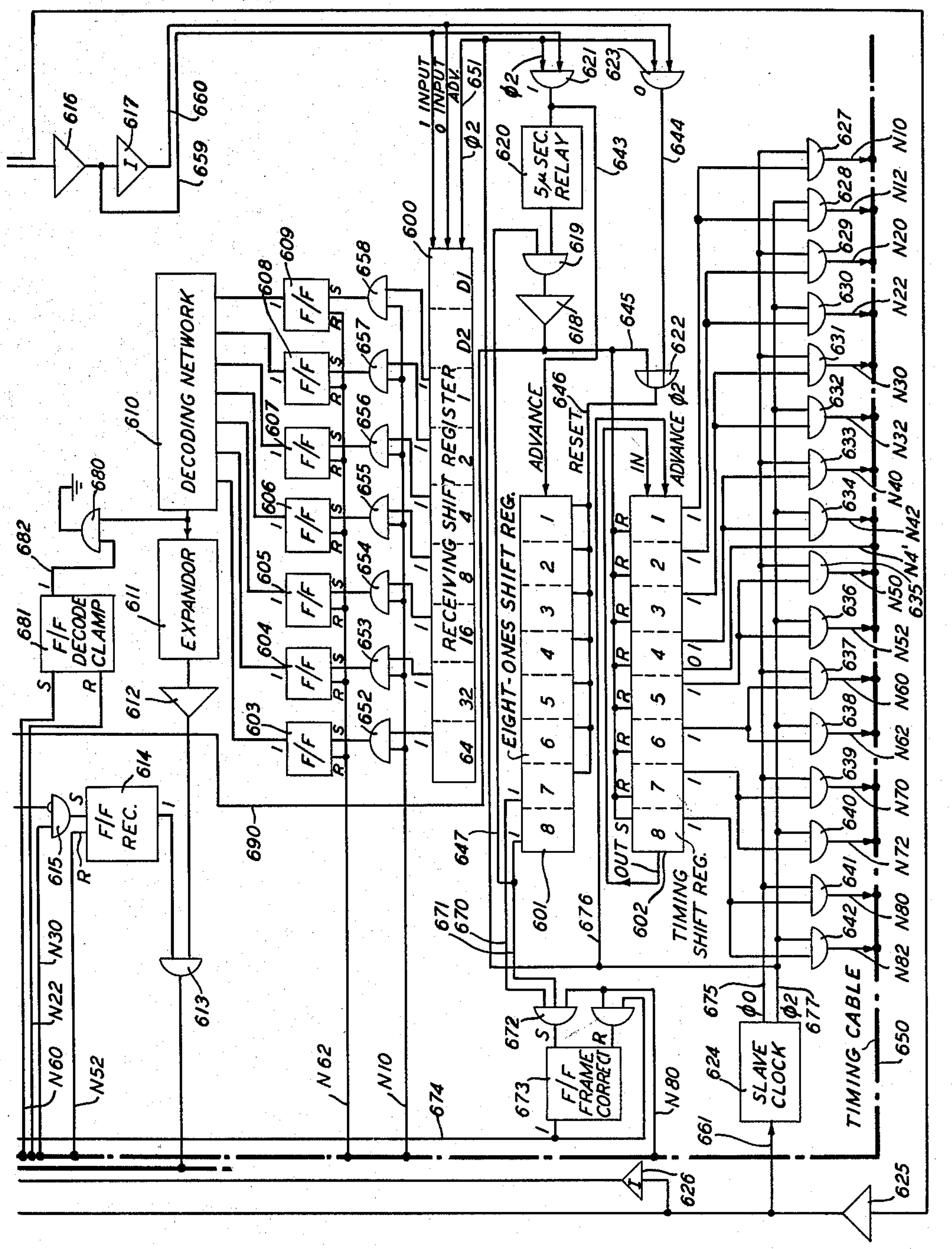
Figure 11:
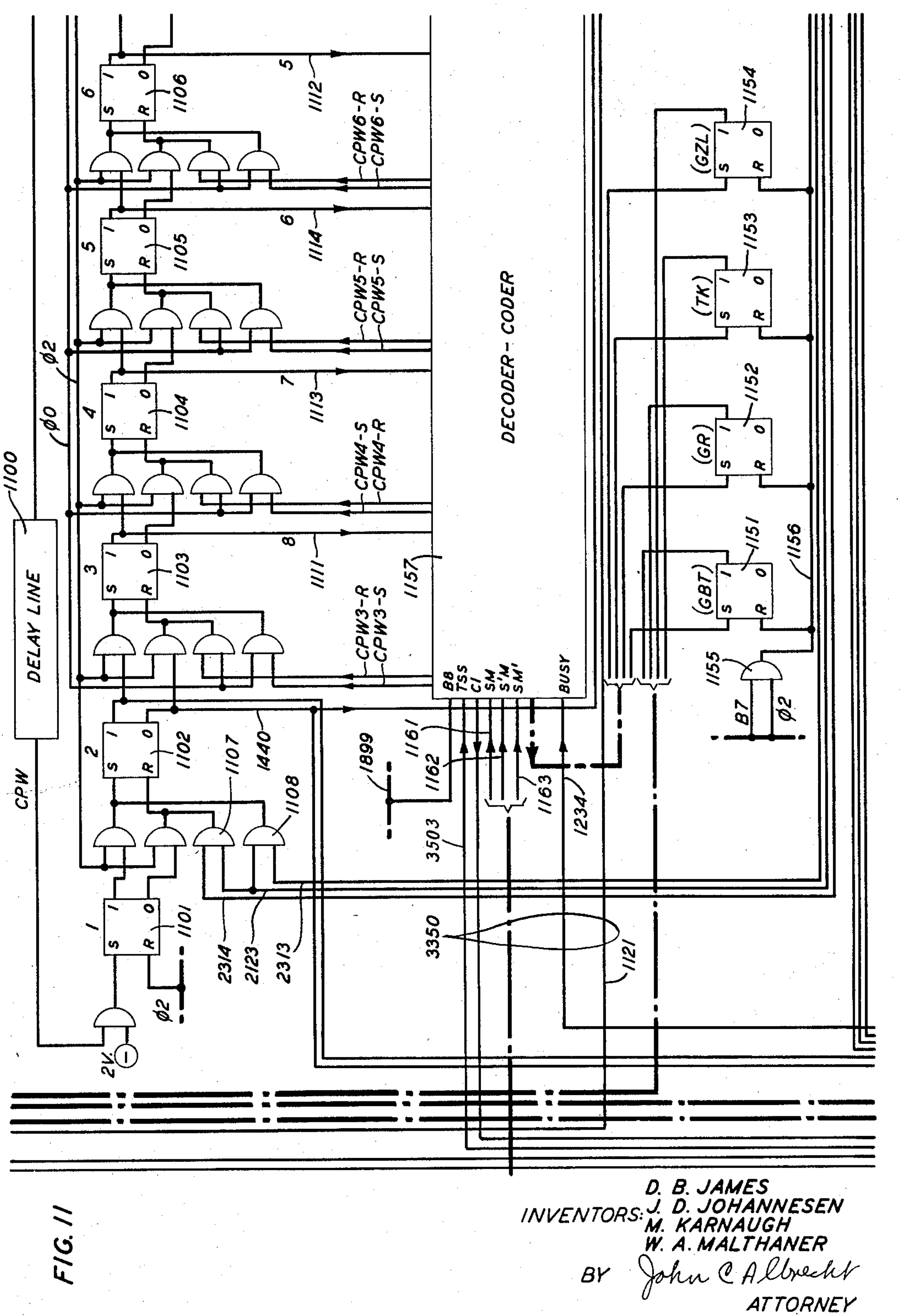
Figure 12:
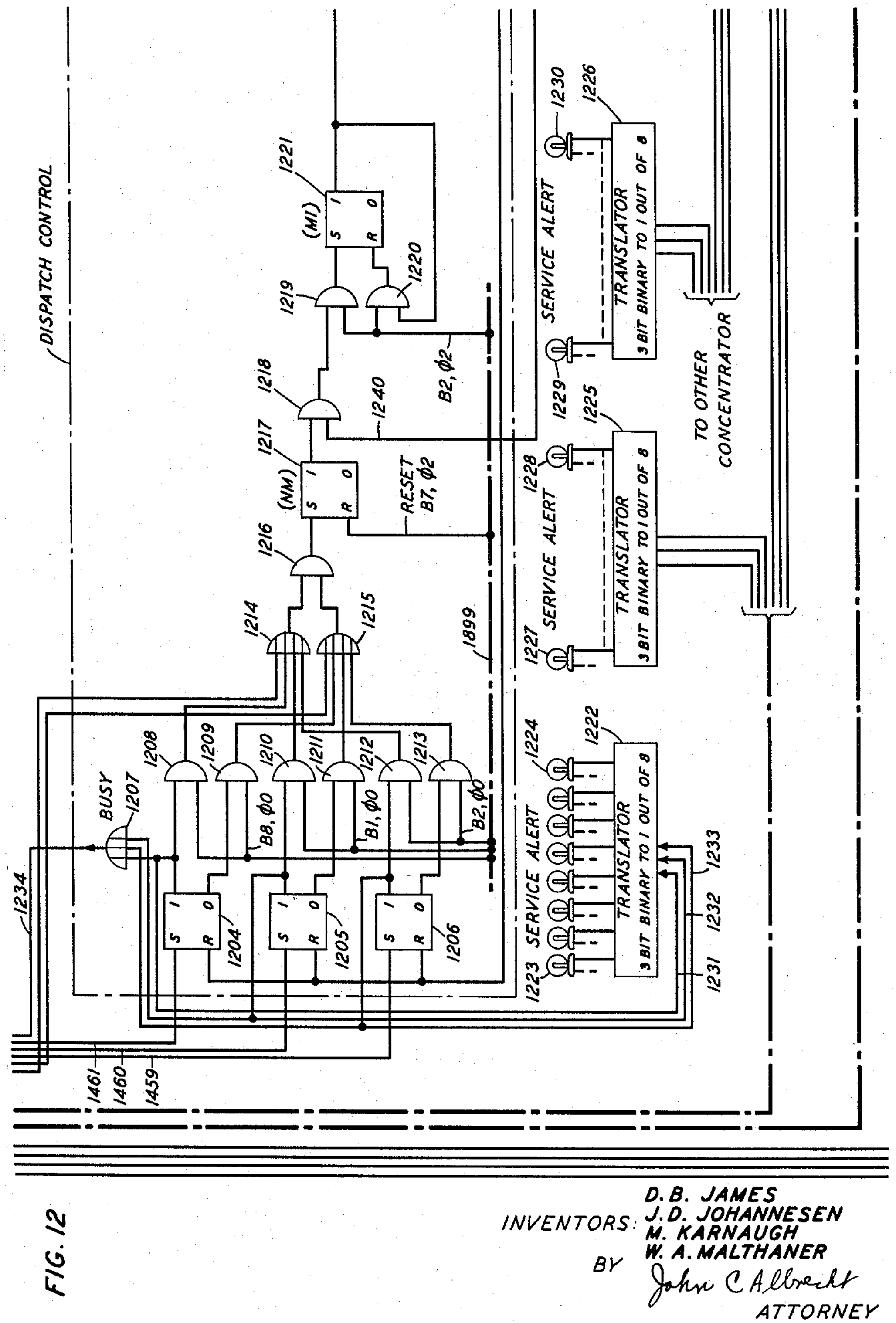
Figure 13:
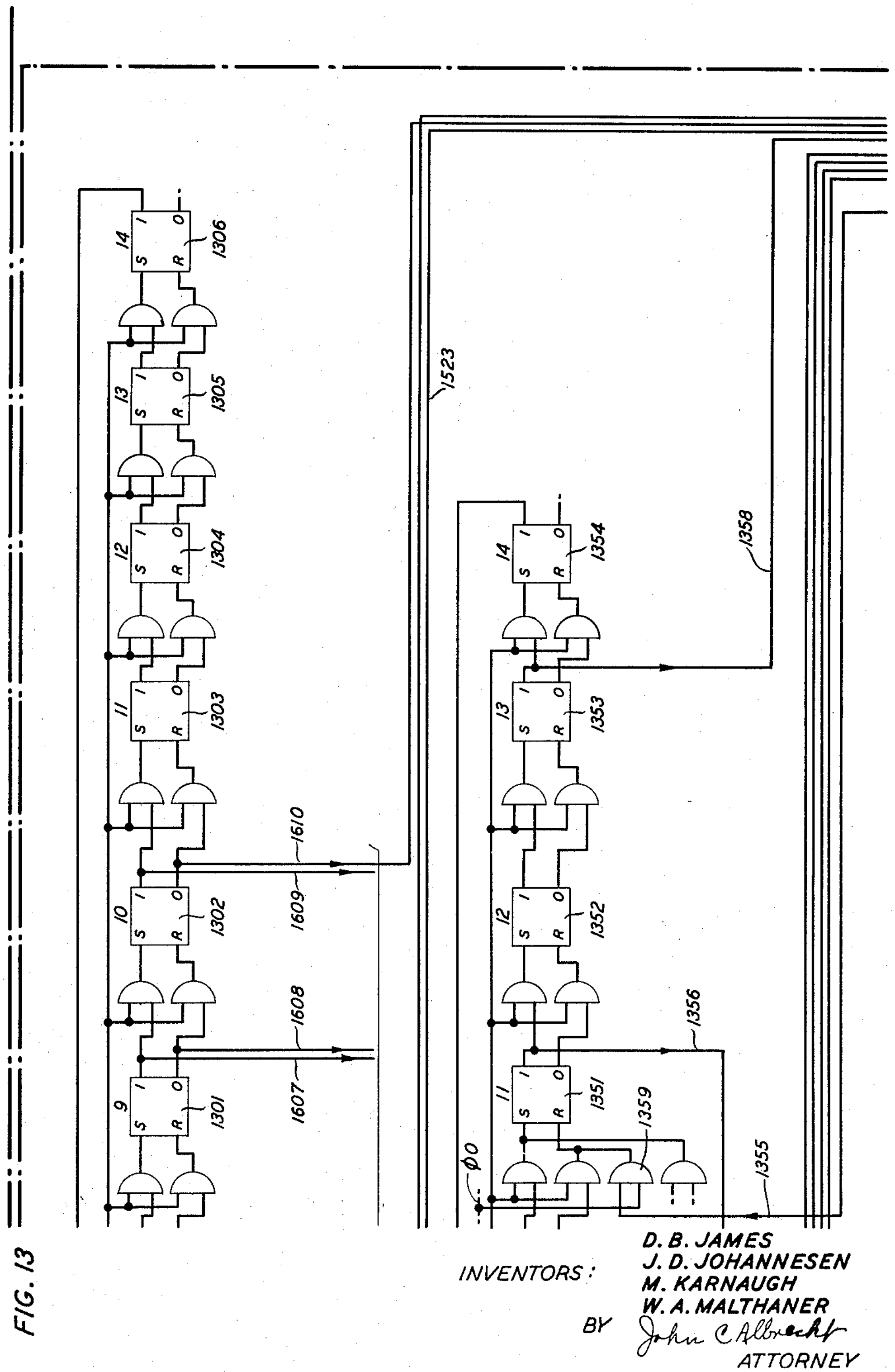
Figure 17:
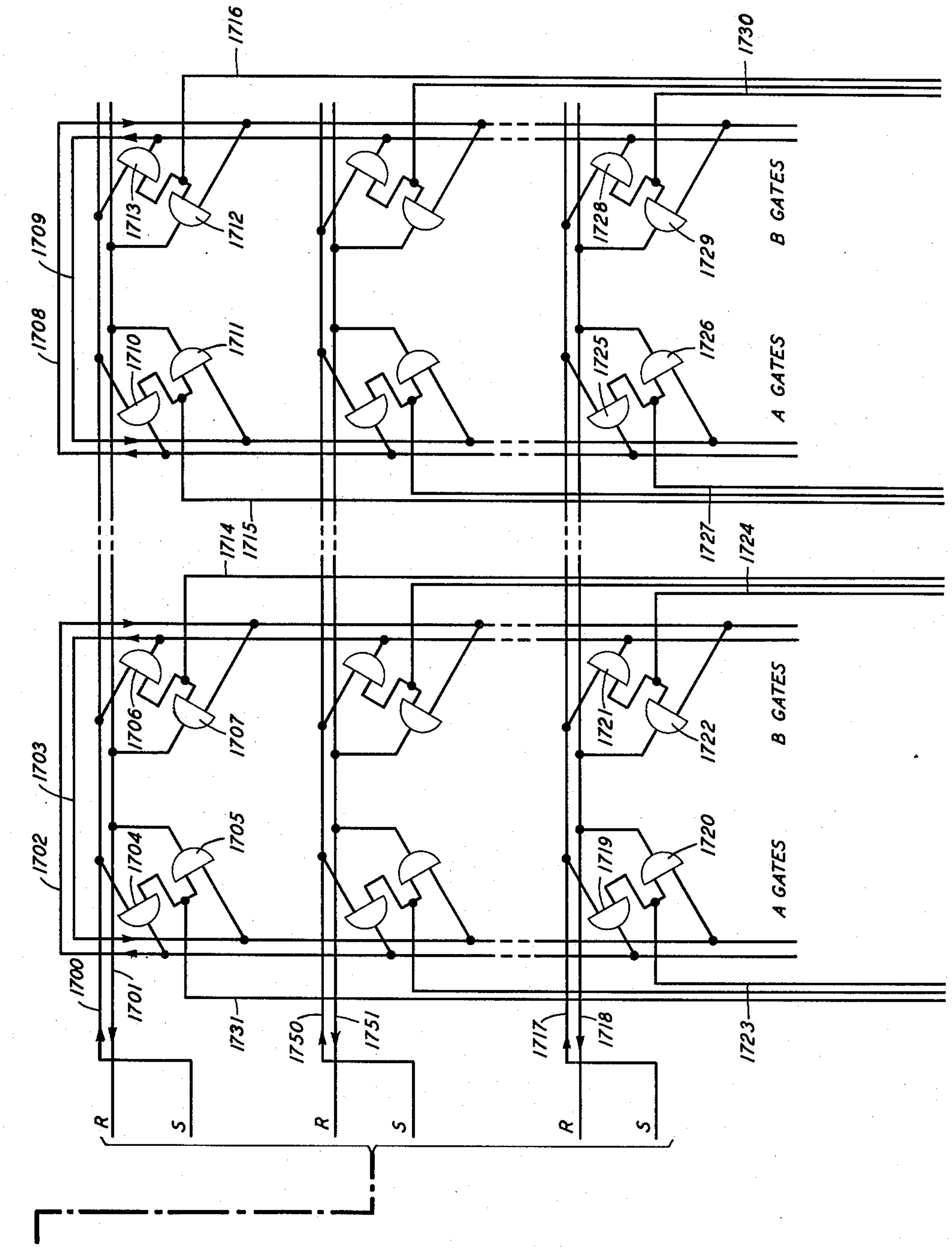
Figure 18:
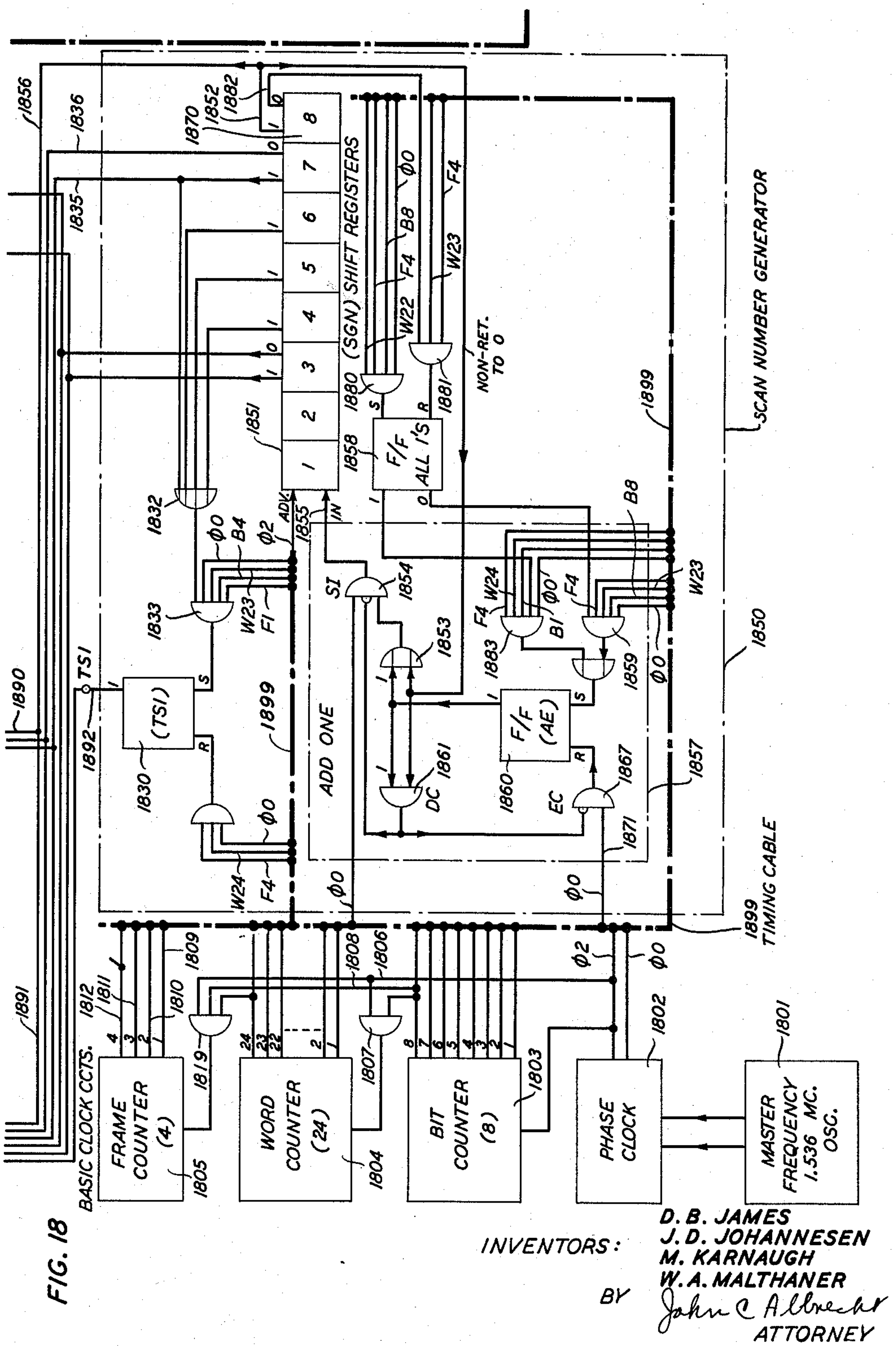
Figure 19:
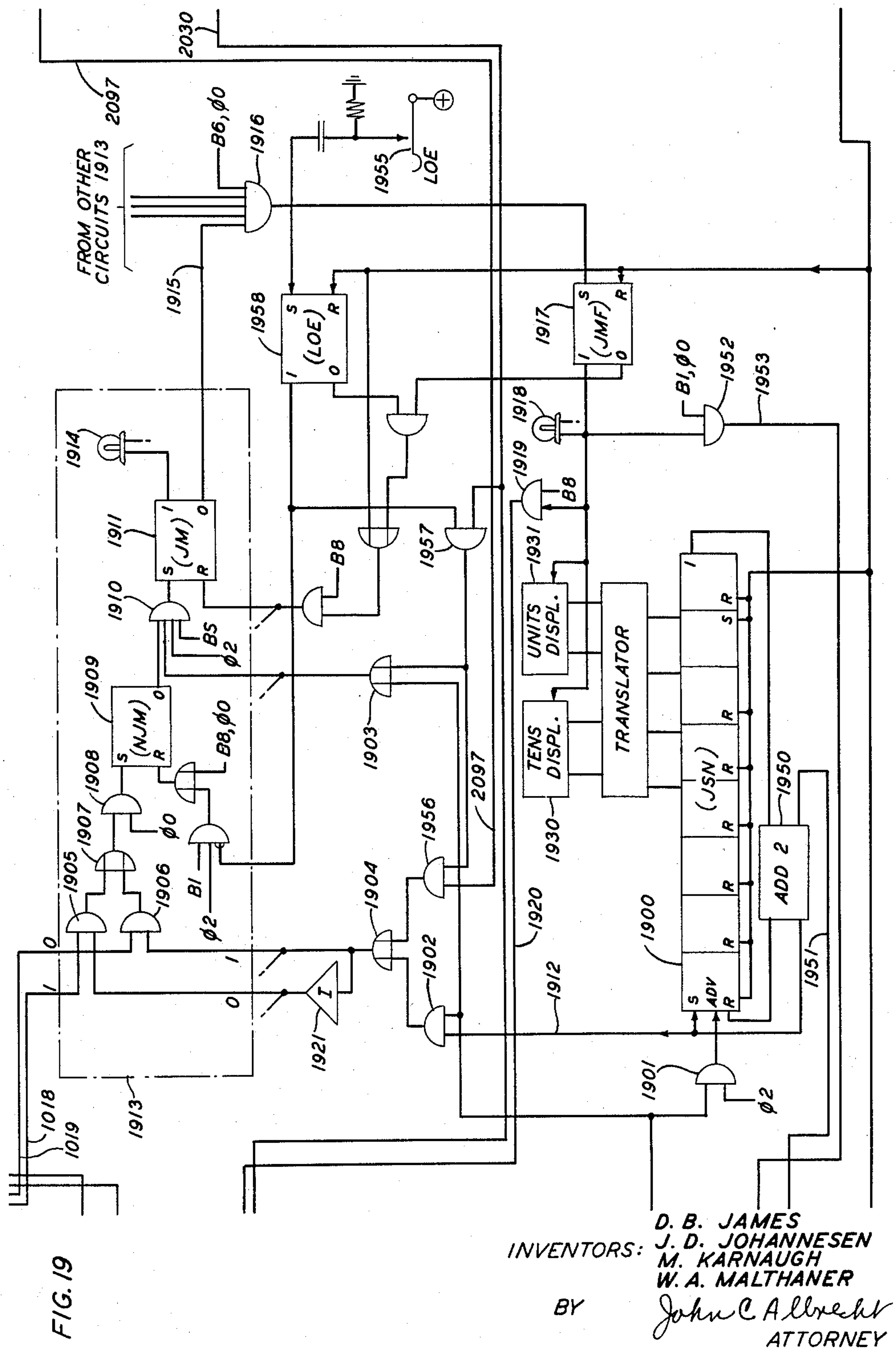
Figure 20:
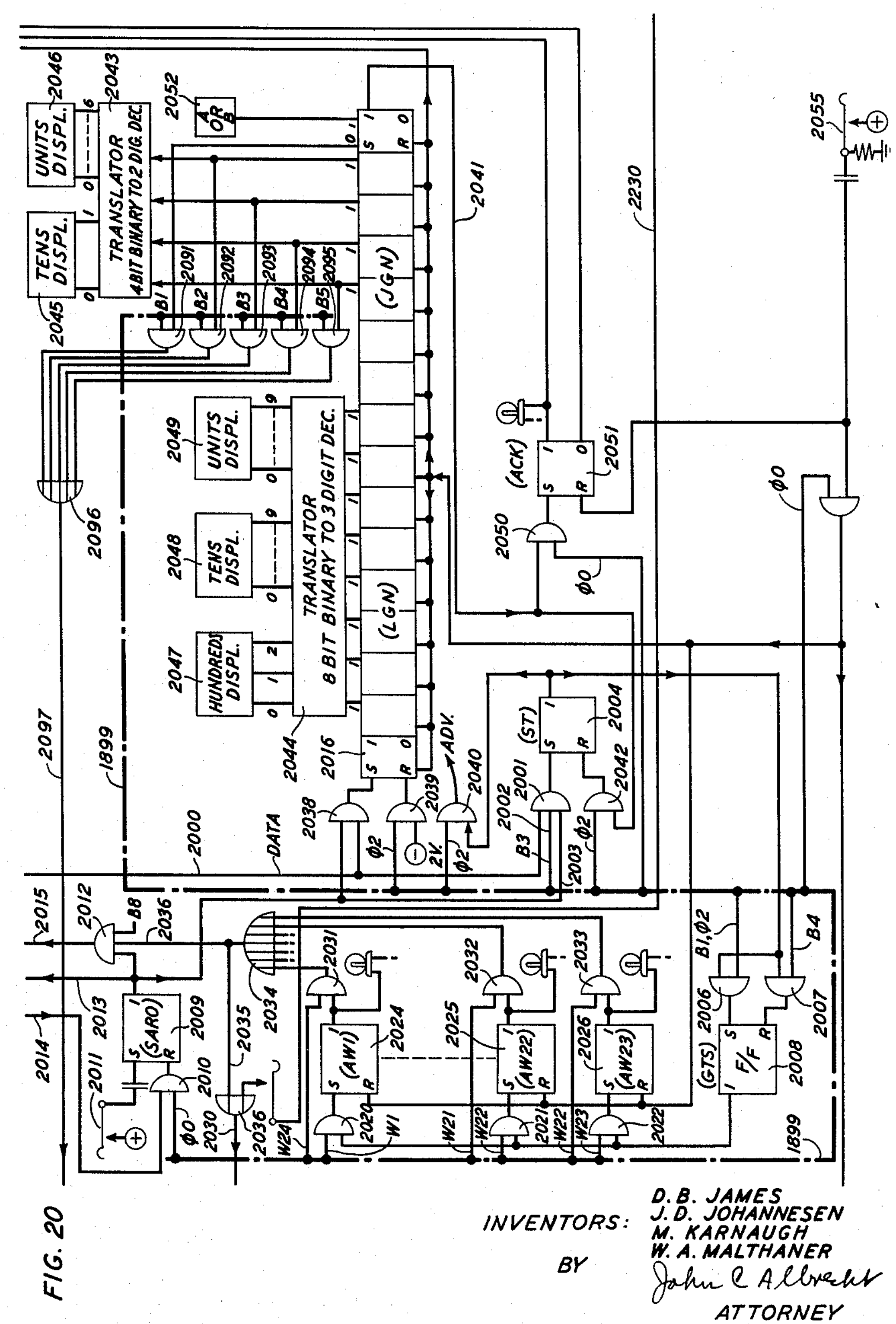
Figure 33:
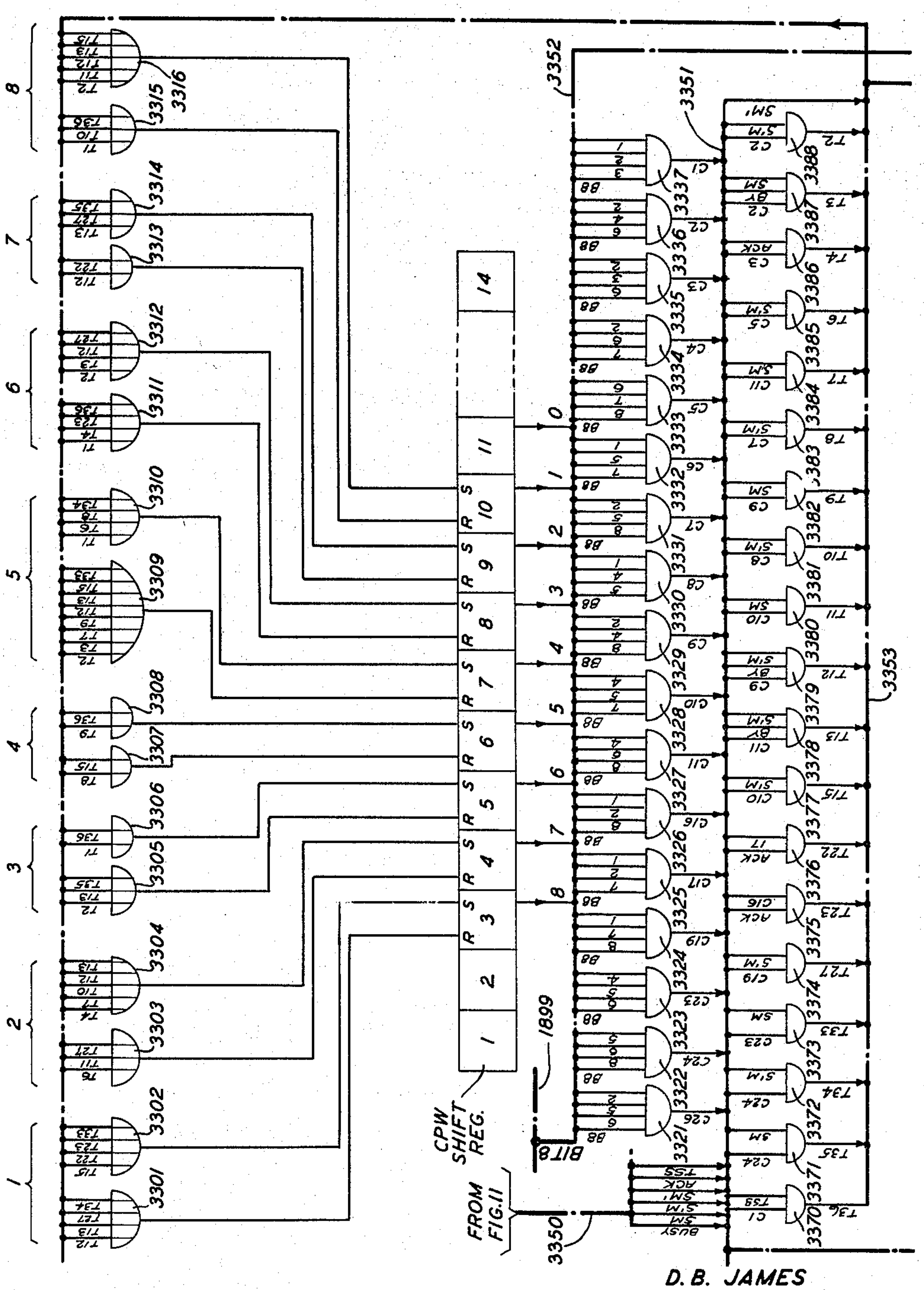
Figure 34:
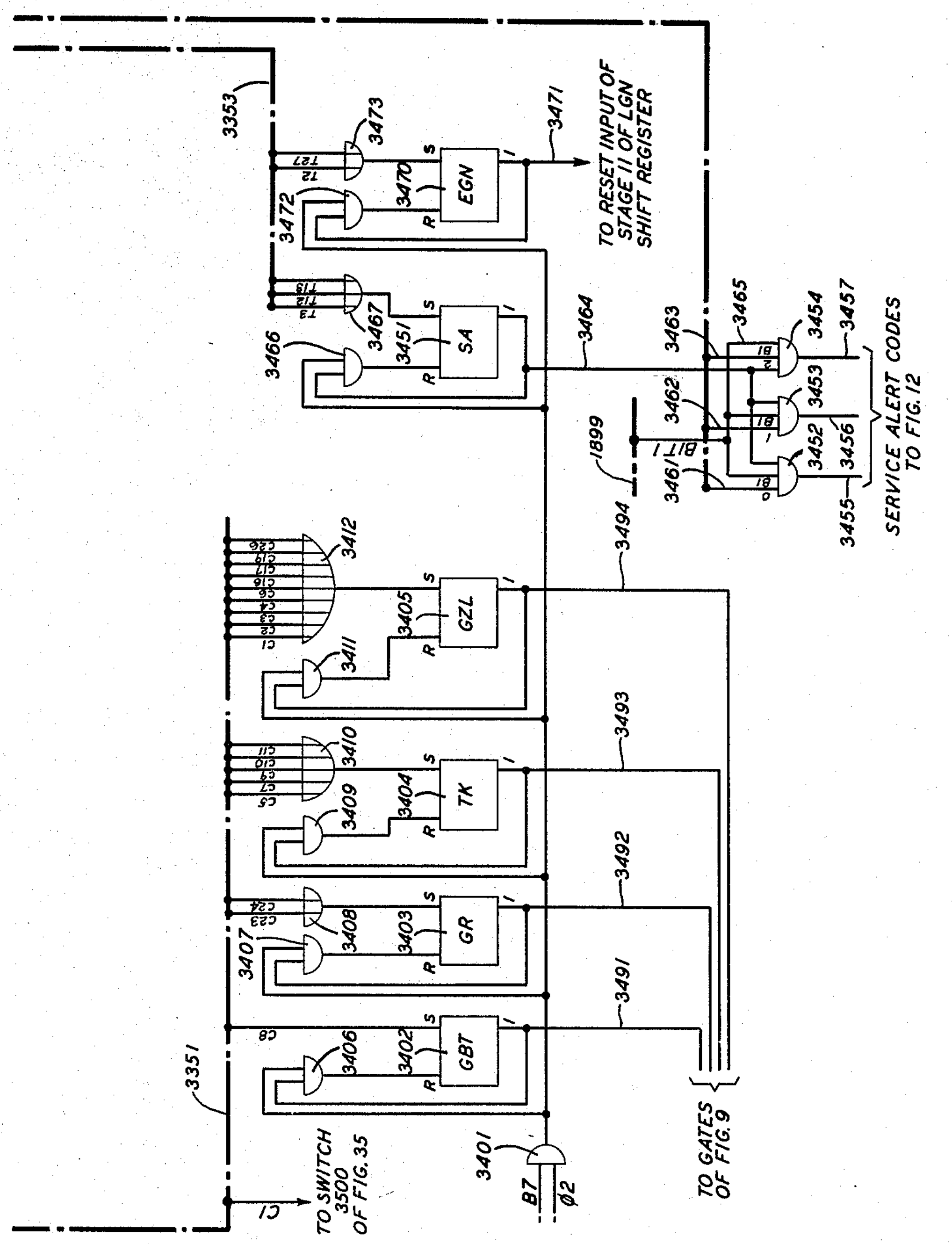
Figure 36:
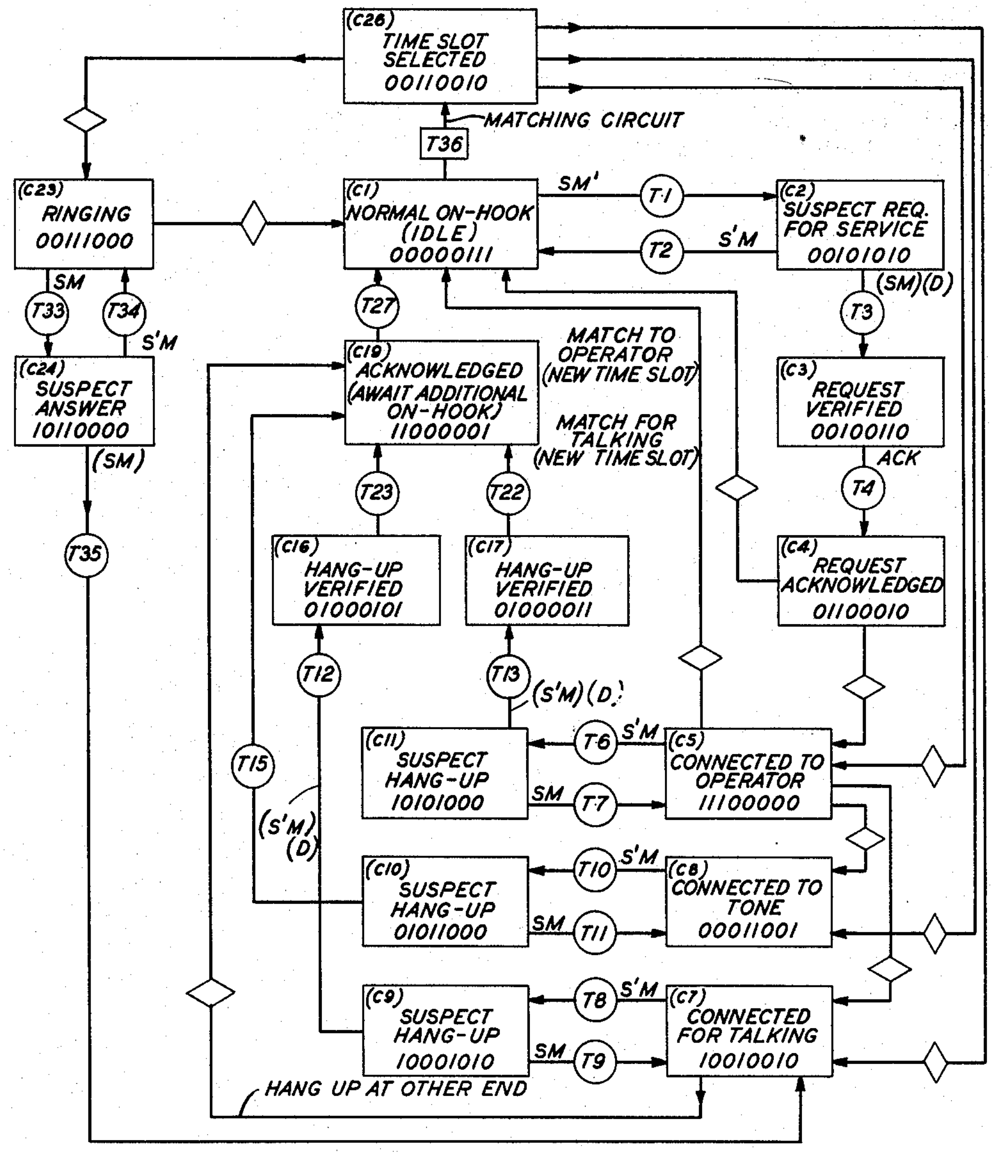

Figs. 4 through 6 comprise a schematic representation of the remote portion of a concentrator module;

Figs. 7 through 16, 21, and 23 comprise a schematic representation of the central office control portion of a concentrator module;

Fig. 17 is a schematic representation of four junctors forming two junctor pairs serving two concentrators and one trunkor within the central office switching network;

Fig. 18 is a schematic representation of the clock pulse source and the scanning number generator of an office control module;

Figs. 19, 20, 22, 24, and 35 comprise a schematic representation of the manual control portion of an office control module;

Figs. 25 through 28 comprise a schematic representation of a trunkor module with the exception of the trunkor to junctor crosspoints which are shown in Fig. 17;

Figs. 29 through 32 are time diagrams of the timing pulses and functions of a concentrator;

Figs. 33 and 34 are a schematic representation of the Call Progress Word Decoder-Coder 1151 of Figs. 11 and 12;

Fig. 36 is a Call Progress Word state diagram;

Figs. 37 through 43 are time diagrams of the timing pulses and functions of a concentrator controller and the manual control; and Figs. 44 through 48 show the arrangements of the preceding figures.

In the above noted drawings many schematic representations are employed so as not to obscure the inventive concepts of this system and certain unnecessary detail has been omitted. For example, although many amplifiers are shown it must be understood that for equipment or other reasons additional amplifiers may have to be inserted to overcome transmission and splitting losses. Further, in the transmission lines connecting the central office and the remote concentrators regenerative repeaters would be employed as required.

Although specific reference is made to wire transmission lines between the central office and remote concentrators it is obvious that any other transmission medium, such as radio, having the requisite bandwidth can be equally well employed.

In the following description the general system diagram of Fig. 1 and a simplified system schematic shown in Figs. 2 and 3 shall be discussed first to provide a general description of the major components and operation of our system before the detailed disclosure of one specific illustrative embodiment. Certain elements appearing in each of these three descriptions have been designated by different reference numerals so that each description may be substantially independent of the others. Thus, for example, the Send, Receive, and Control Conductors 116, 117, and 118 of Fig. 1 correspond respectively to Conductors 212, 201, and 203 of Figs. 2 and 3 and to Conductors 553, 502, and 501 of the detailed description. It is believed, however, that the identification of these various elements by different reference numbers in the three descriptions will be readily apparent without specific cross references in each instance between the various descriptions.

*General system description (Fig. 1)*

Figures 1, 1A:
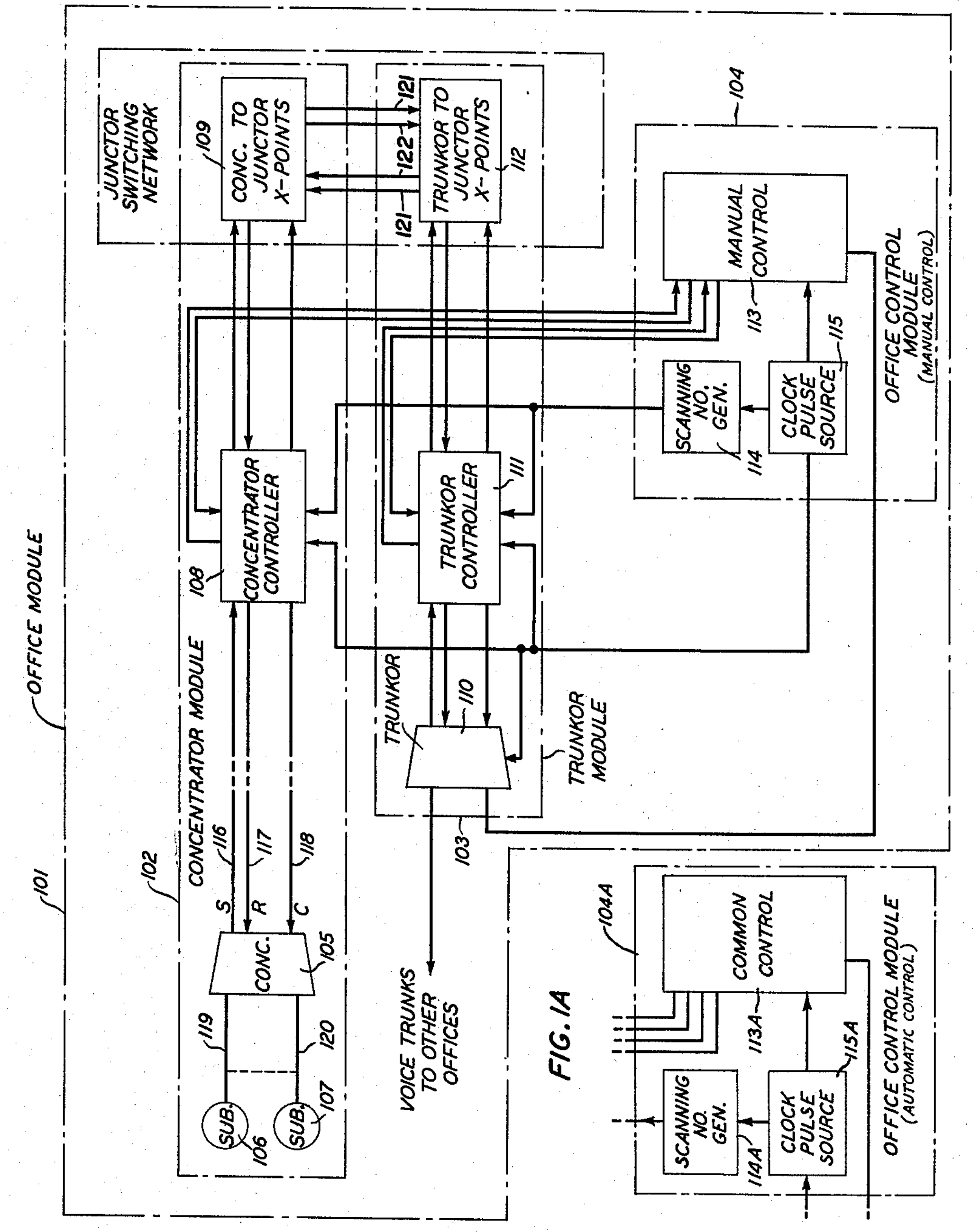
Fig. 1 is a block diagram representation of a telephone central office module having one concentrator module, one trunkor module, and a manual office control module.
Fig. 1A is a block diagram of an office control module for automatic control for employment in an alternative embodiment of our invention.

In Fig. 1, the Office Module 101 comprises the Concentrator Module 102, the Trunkor Module 103, and the Office Control Module 104. Although only one concentrator module and one trunkor module are shown, it must be understood that an office module would comprise a plurality of concentrator modules and possibly a plurality of trunkor modules. The Concentrator Module 102 comprises a remote Concentrator 105 and its attendants ubscribers' lines represented by 106 and 107; a Concentrator Controller 108 located at the central office and the Concentrator to Junctor Crosspoints 109 also located at the central office.

The trunkor module comprises a Trunkor 110 which is similar to the Remote Concentrator 105; however, the trunkor is located at the central office and certain of the control and timing functions of a concentrator are omitted from the trunkor. The Trunkor Controller 111 is a counterpart of the Concentrator Controller 108 and is similarly located at the central office and the Trunkor to Junctor Crosspoints 112 are similar to the Concentrators to Junctor Crosspoint 109 and are also located at the central office.

The Office Control Module 104 comprises Manual Control 113 for receiving switching instructions from subscribers via concentrator or trunkor controls and for dispatching instructions to the appropriate concentrator or trunkor controls. The office control module further comprises a Scanning Number Generator 114 wherein the addresses of the lines to be scanned to determine the supervisory states thereof are generated.

The Clock Pulse Source 115 is a complex source of precisely phased pulses required for the control of the concentrator and trunkor controls, the trunkor, and the manual control.

Each remote concentrator module is similar to every other concentrator module and is connected to the central office via three transmission paths such as 116, 117, and 118. Coded information signals representative of speech, signaling, and line scanner responses are transmitted from the remote concentrator to the concentrator controller over the send line such as 116; coded information representative of speech and concentrator framing signals are transmitted from the concentrator controller to the remote concentrator over the receive line such as 117, and addesses representative of the lines being served and scanned in the concentrator are transmitted from the concentrator controller to the remote concentrator over control conductors such as 118.

Connection between subscribers such as 106 and 107 and the Concentrator 105 is over two-wire transmission lines such as 119 and 120, and communication in both directions on such lines is by way of normal analog speech signals. Transmission between the concentrator such as 105 and the concentrator controller such as 108 and through the junctor switching network to other concentrators is on a pulse code modulation and time division multiplex basis.

The Trunkor 110 provides the transmission link between the subscribers' lines and the Manual Control 113 and between the subscribers' lines and distant offices. The Trunkor 110 decodes speech information flowing from subscribers such as 106 and 107 and intended for the Manual Control 113 and encodes speech information flowing from the Manual Control 113 to the subscribers such as 106 and 107. Trunkors are also employed as a link between subscribers such as 106 and 107 and voice frequency trunks to other switching and communication systems not employing pulse code modulation (PCM). As previously indicated, this system employs time division multiplexing between each of the concentrators in an office module and transmission between concentrators is by PCM. Communication from each of the concentrators to each of the subscribers' lines is as noted via individual transmission paths; however, subscribers are served in a concentrator on a time division basis.

Twenty-four time division channels are employed, in this one specific illustrative embodiment, between each of the concentrators and the concentrator controllers and similarly between a trunkor and the trunkor controller. Operation of the concentrators, as disclosed herein, is on a synchronous basis, that is, similarly numbered time slots are simultaneously served in each of the concentrators; thus when Time Slot 1 is served in Concentrator 105, Time Slot 1 is also served in each of the other concentrators of the office module not shown in Fig. 1. This arrangement is used herein to simplify an understanding of the system; however, it must be clearly understood that a system of frogging of time slots between the concentrators could be readily employed. That is, it is not necessary to serve subscribers in similarly numbered time slots simultaneously in the various concentrators and trunkors of an office module.

Each speech information period, referred to herein as a time slot, is 5.2 microseconds long. An 8 kilocycle time division rate is employed to obtain transmission quality equivalent to a 3.5 kilocycle nonmultiplexed channel. There are eight information bits per time slot and twenty-four time slots per frame; therefore, 192 bits per frame period. Each frame period is 125 microseconds long and each bit period is .651 microsecond. The basic bit rate is loosely referred to herein as 1.5 megacycles; however, the timing pulses employed in the remote concentrator, concentrator controller, trunkor, and trunkor controller are actually at a 1.536 megacycle rate.

Timing within a frame is established in the Office Module Clock Pulse Sourse 115 of Fig. 1. This clock pulse source is shown in greater detail in Fig. 18. The Master Frequency Oscillator 1801 provides the basic pulse rate to the dividing chain which comprises the Phase Clock 1804, and the Bit Counter 1803, the Word Counter 1804, and the Frame Counter 1805. In the Phase Clock 1802, two phases of the basic 1.5 megacycle source, 180 degrees apart, are derived for use throughout the central office and in the trunkor controller.

The bit counter sequentially provides pulses on the 1 through 8 Conductors of Fig. 18, which connect to Timing Cable 1899. Each of these conductors is energized for one bit period of about .651 microsecond.

Each time the bit 8 Conductor 1808 and the phase 2 Conductor 1806 are simultaneously energized, the AND Gate 1807 will be enabled to provide an input to the Word Counter 1804. Therefore, each time eight bit periods have elapsed, the Word Counter 1804 will be advanced one step and the Word Conductors 1 through 24 will be energized successively for word periods of approximately 5.2 microseconds each.

Each time the Word Conductor 24, denoting the twenty-fourth or last time slot of a frame, is simultaneously energized with the phase 2 Conductor 1806 and the bit 8 Conductor 1808, the AND Gate 1819 will be energized to increment the Frame Counter 1805 by one count. The Frame Counter 1805 is arranged to count frames in groups of four and the 1 through 4 Conductors 1809 through 1812 will be sequentially energized for frame periods of 125 microseconds each.

A point in time at the central office is fully defined by an indication of the frame, the word or time slot, the bit, and the phase. At the central office, the individual frame, word, bit and phase conductors are employed in combination to establish timing, and individual conductors are labeled F1 to 4, W1 to 24, B1 to 8, and phase 0 or 2. Where a timing element is not included as an enabling signal to a gate or other work function, the enablement or work function occurs during each period of the omitted time element. For example, where only the word, bit and phase conductors are employed, the action occurs during every frame and where only the bit and phase conductors are employed, the action occurs during every word of every frame, et cetera.

Transmission of pulses from the central office to the remote concentrator incurs a time delay which is a function of the length of the line separating the central and the remote concentrator and the transmission characteristics of the line connecting the two locations. Information at the concentrator, however, remains in the same relative time positions as at the central office. Timing signals are derived at the remote concentrator from the incoming signals to effect switching operations at the proper times. In Fig. 1, signals on the Control Conductor 118 (corresponding to Control Conductor 501, described below) comprise discrete binary patterns representative of the address of line gates within the concentrator, and although the pulses on this conductor do not occur in a regular pattern, they do occur with sufficient frequency to permit synchronization of a slave clock in the remote concentrator with the Clock Source 1801. The Slave Clock 624 shown in Fig. 6 is coupled to the output of the Control Amplifier 625 through Conductor 661, as discussed in the detailed description set forth below. As in the central office, two phases of the slave clock source, namely $\varphi_1$ and $\varphi_2$, which are 180 degrees apart, are employed in the remote concentrator.

Once per frame of twenty-four time slots, a discrete framing signal comprising eight consecutive "1's" is transmitted from the central office to each of the remote concentrators over the receive line 117 (corresponding to receive line 502, described further below). The concentrators may be separated from the central office by various time delays, therefore, timing within the concentrator is arbitrarily established with respect to receipt of the framing signal. That is, recognition of the 8 "1's" signal marks the zero phase of the last bit of the twenty-third time slot.

At the remote concentrator, the basic bit and phase signals are combined to provide complex timing signals. As noted, at the central office, the frame, word, bit, and phase conductors are used in combination to time work functions within the central office. At the remote concentrator, however, the composite signals indicating bit and phase are employed.

Timing signal conductors within the remote concentrator are labeled $N_{B\varphi}$ wherein N corresponds to W at the central office, B corresponds to B, and $\varphi$ corresponds to $\varphi$. An indication of frame is not required at the remote concentrator. The time of occurrence of the timing pulses is obvious from the labeling. In the conservation of space in certain figures of the drawing, the labels for the various timing conductors have been written on a single line and not as subscripts as shown above.

Figure 29:
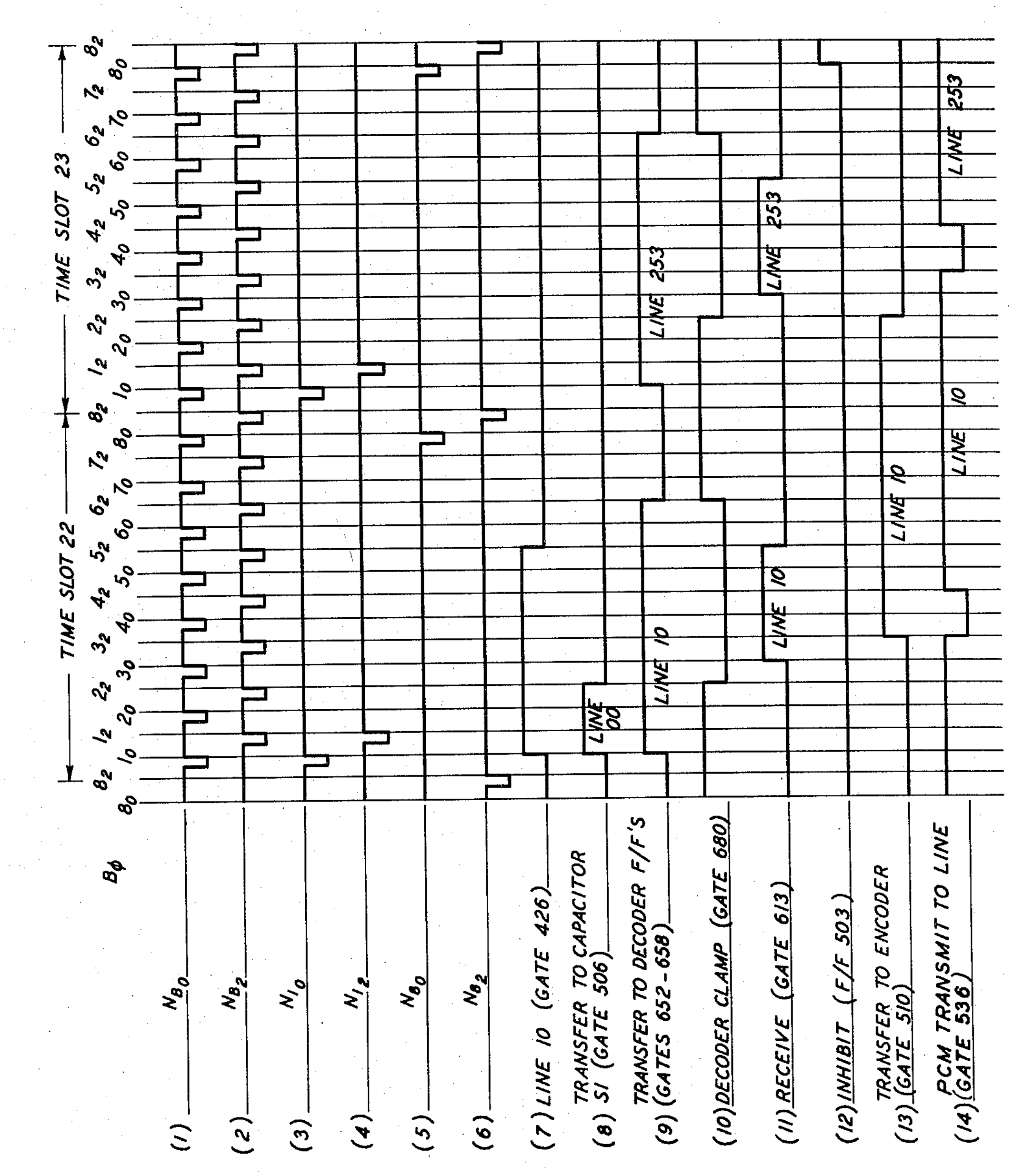
Figure 30:
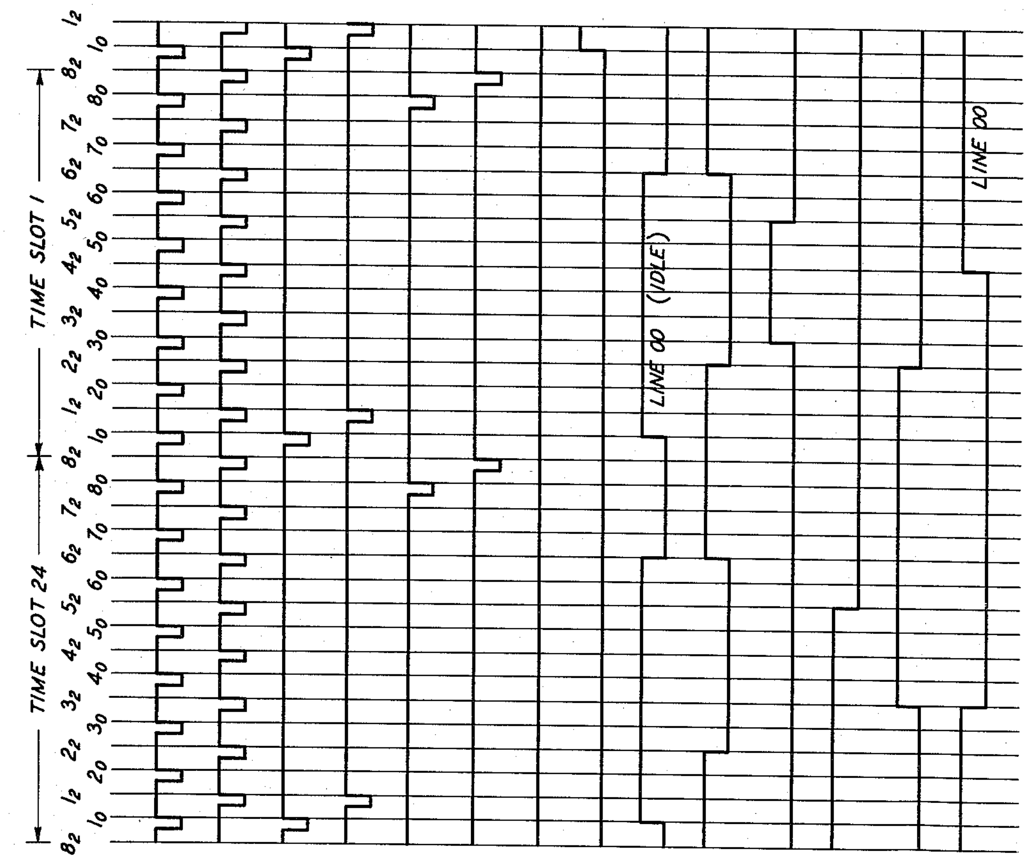
Figure 31:
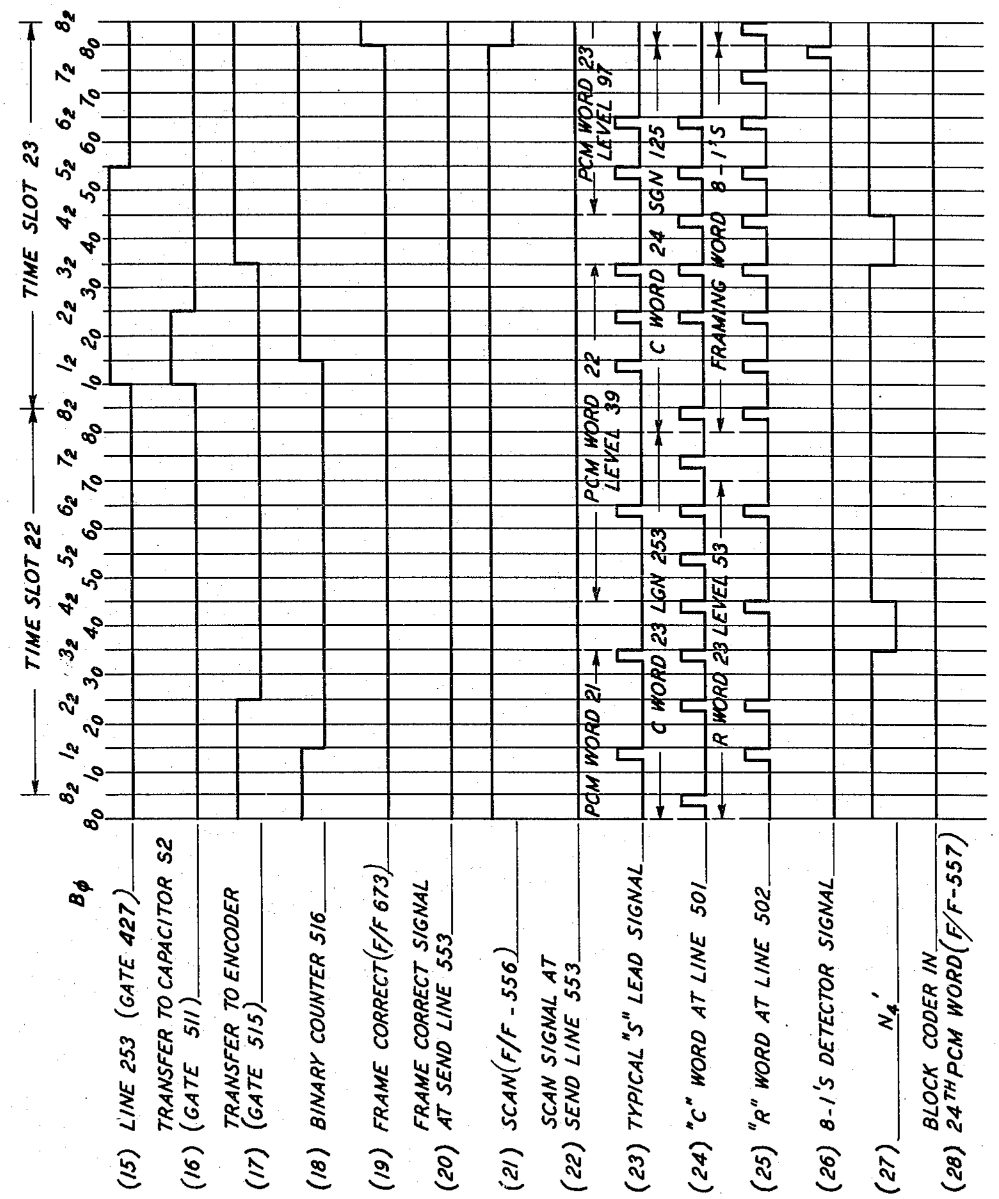
Figure 32:
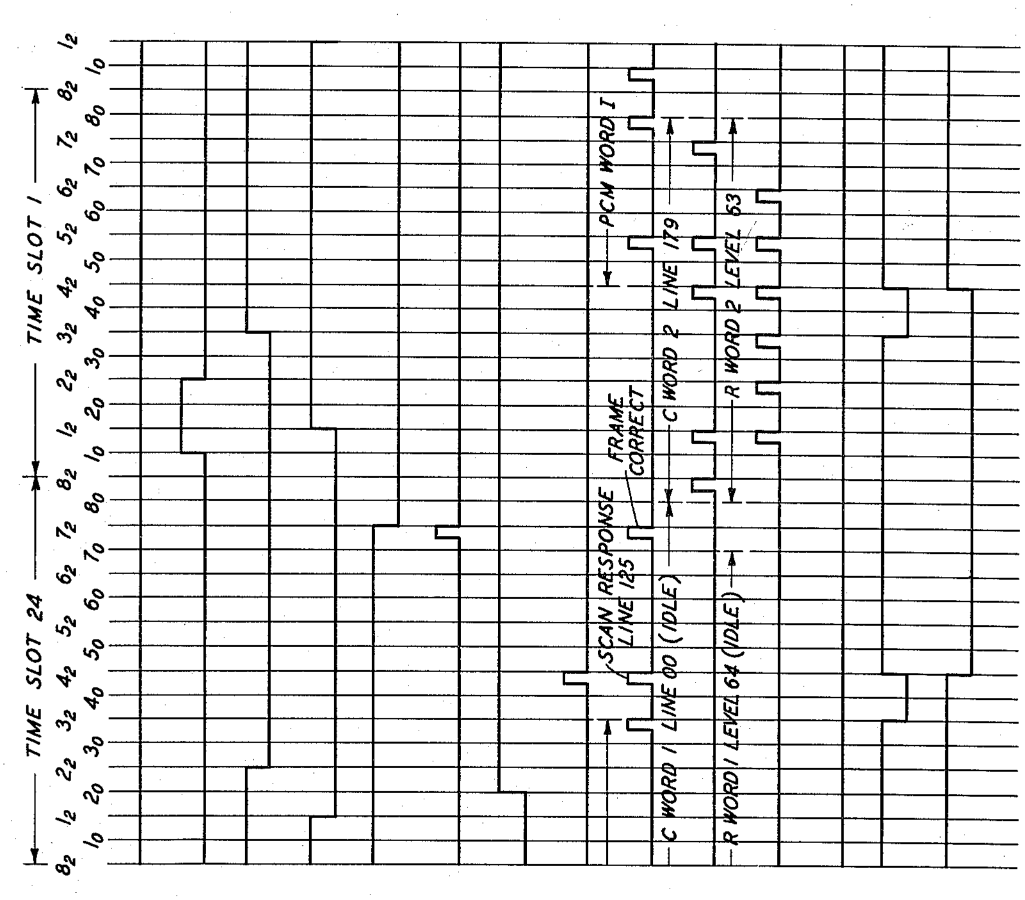

The relationship of the pulses employed in each concentrator is shown in Figs. 29 and 31. The pulses of the first row, at the top of Fig. 29, are labeled $N_{B_0}$. The subscript 0 indicates that this is a phase 0 pulse. The $N_B$ indicates that these pulses occur in every bit and every word of each frame. Similarly, the second line shows the $N_{B_2}$ pulses which are the phase 2 pulses occurring in each bit and each word of a frame. The remaining pulses in lines 3 through 6 occur in each word of a frame; however, they occur only in the bit periods indicated by the first subscript number. For example, the sixth line shows pulse $N_{8_2}$ which indicates a pulse in phase 2 in the eighth bit of every word. Although not shown, the two pulses per bit period occurring between $N_{1_2}$ and $N_{8_0}$ occur in a similar pattern.

As will be seen later in this discussion, all actions within the concentrator are timed through the pulses derived in this manner and present on Timing Cable 650, seen in Fig. 6.

*Simplified system description (Figs. 2 and 3)*

A time division hybrid comprising two send legs and one receive leg provides the transition from the four-wire send and receive lines 212 and 201, respectively, to the two-wire Common Transmission Bus 213. The bidirectional line gates such as 209 and 210, under control of address pulses from the Concentrator Control Circuit 200, selectively connect subscribers' line circuits to the two-wire common transmission bus.

The Gates 209 and 210 may be of the type disclosed in the copending application Serial No. 570,530, filed March 9, 1956, of J. D. Johannesen, P. B. Myers, and J. E. Schwenker, now Patent 2,899,570, granted August 11, 1959, and the time division hybrid may be of the type disclosed in application Serial No. 702,149 filed December 11, 1957, of D. B. James and J. D. Johannesen.

The first send leg of the time division hybrid comprises a Send Gate 214, the Clamp 218, Amplifier 216, and the First Send Output Gate 222. The second send leg is identical to the first send leg and comprises Send Gate 215, Clamp 219, Amplifier 217, and Send Output Gate 223. The Send OR Gate 224 provides means for bringing the output signals from the first and second send legs through the Compressor 238 and the Encoder 225, which serve the two send legs on an alternate basis.

The receive leg of the time division hybrid comprises the Decoding Network 234, the Clamp 240, the Expandor 235, the Amplifier 236, and the Receive Gate 237. Coded speech information is received from the central office via the Receive Conductor 201 and the Receiving Amplifier 239. The coded information is decoded in the Network 234 to provide analog speech signals which are expanded in 235. The expandor has a response curve complementary to that of the Compressor 238. The expanded speech signals are amplified by Amplifier 236 and gated to the Common Transmission Bus 213 through Receive Gate 237. Having reached the Common Transmission Bus 213, the speech signals are selectively gated to the appropriate line through an associated line gate such as 209 and 210.

The Line Scanner 204 provides means for determining the supervisory state of the subscribers' lines such as 205 and 206. The address of the line to be interrogated is transmitted to the Line Scanner 204 over the Control Conductor 203, and activation of the line scanner is effected over the Scanner Control Conductor 211. Line scanner responses are transmitted to the central office concentrator controller via Conductor 230, AND Gate 231, Conductor 233, OR Gate 226, Amplifier 227, and send line 212.

Figure 2:
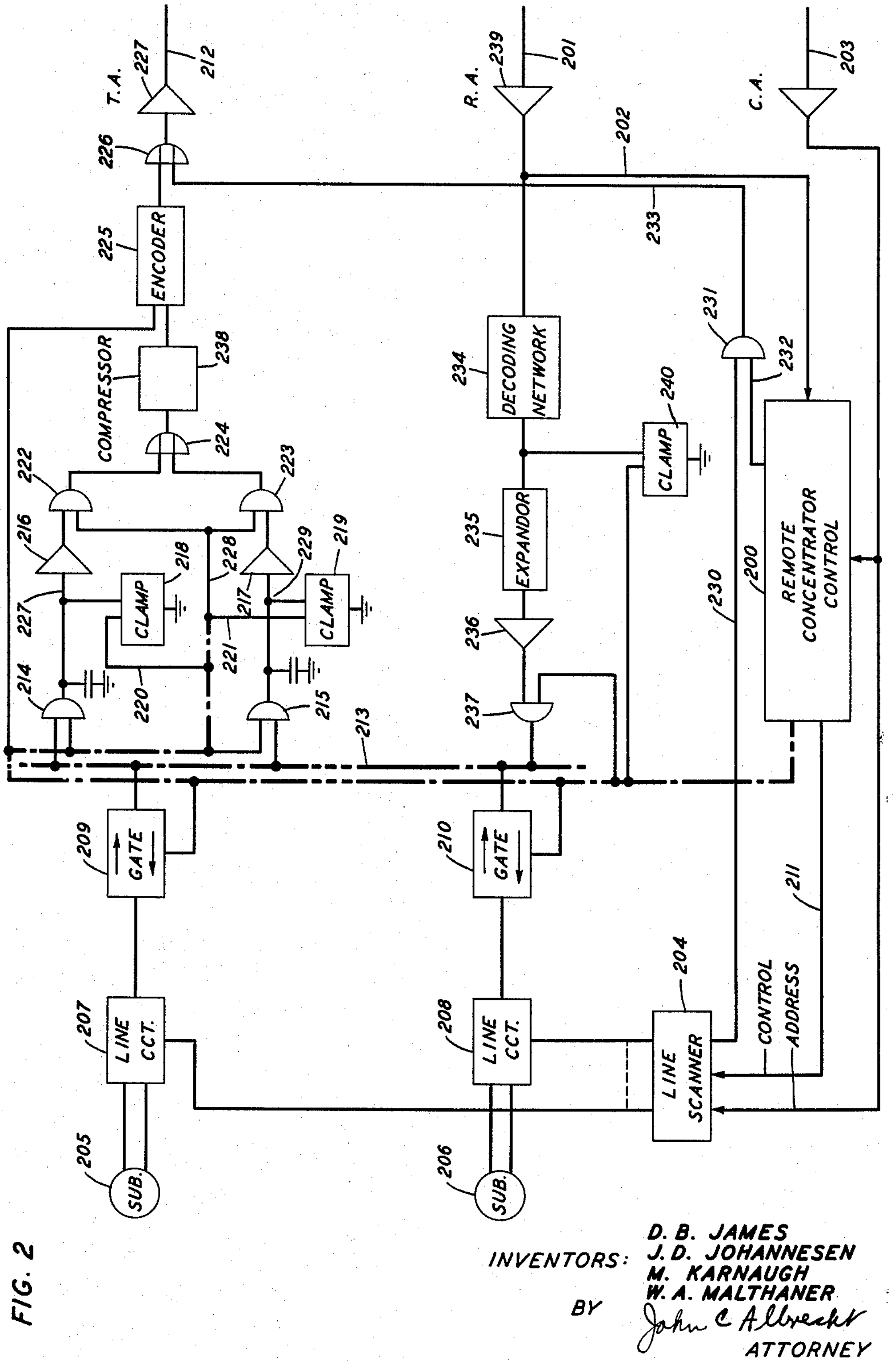
Fig. 2 is a block diagram representation of the remote portion of a concentrator module such as is employed in Fig. 1.

The arrangements of Fig. 2 are shown in greater detail in Figs. 4, 5, and 6.

Figure 3:
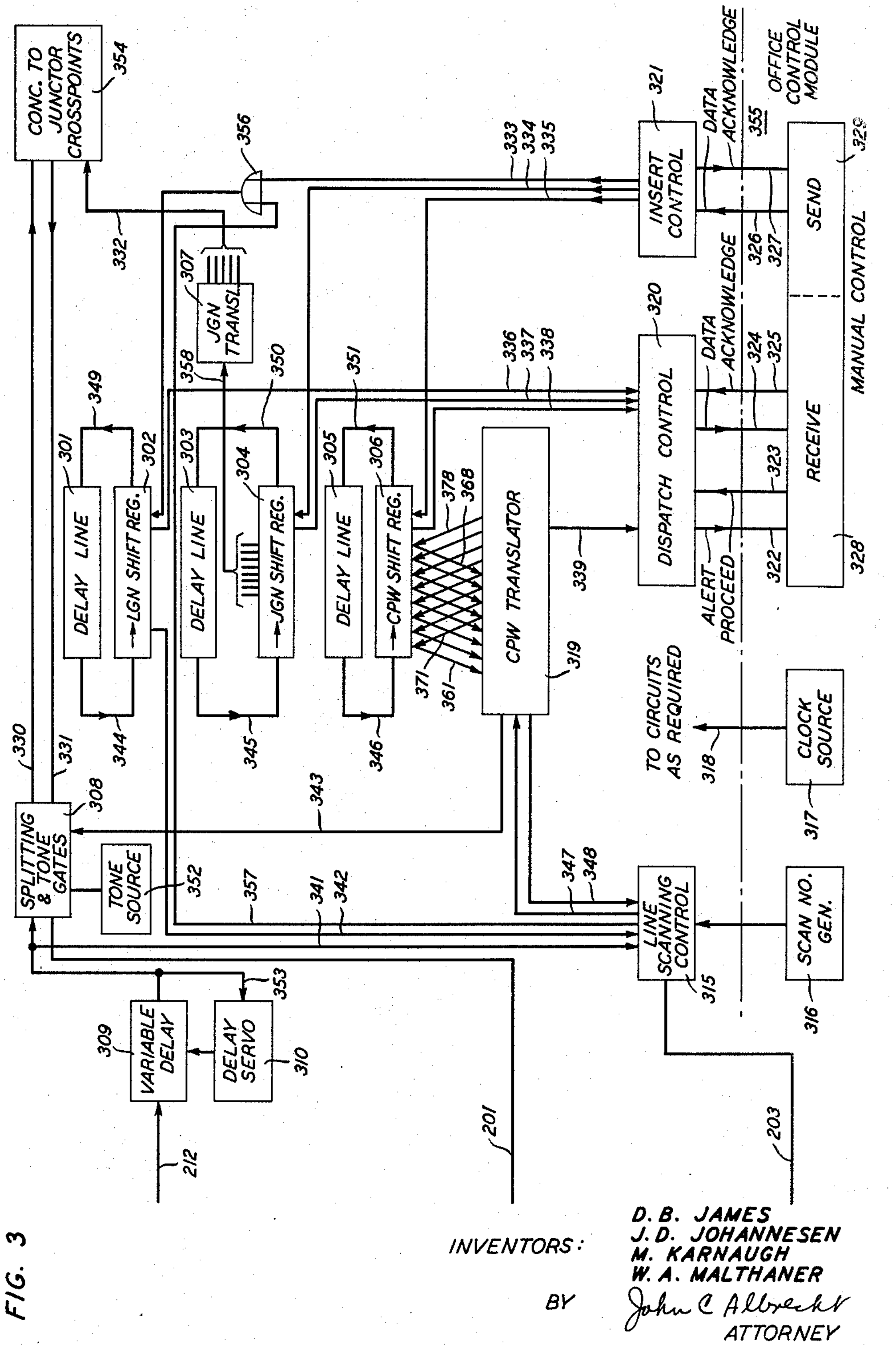
Fig. 3 is a block diagram representation of the central office portion of a concentrator module and a portion of the manual office control module.

The central office portion of an office module is shown in Fig. 3 with provisions for the control of the concentrator. The Office Control Module 355 corresponds to the Office Control Module 104 of Fig. 1. In Fig. 1 the Manual Control 113 is shown as a single block. However, in Fig. 3 the manual control is divided into a Send Portion 329 and a Receive Portion 328. The purpose of the send and receive portions of the manual control will be obvious as the discussion proceeds.

All concentrators are served on a synchronous basis, that is, similarly numbered time slots are being served in each of the plurality of concentrators and in the trunkor. In each of the first twenty-three time slots three separate information words must be maintained concerning the concentrator line or trunkor trunks to be served. The three words are Line or Trunk Gate Number, Junctor Gate Number, and Call Progress Word. The information handled in the twenty-fourth time slot will be discussed separately later.

As previously described, the frame is the basic period in which twenty-four time slots are served. Each of the twenty-four time slots is eight bits long; therefore a frame comprises 192 bit periods. Each of the three information words is stored in a circulating memory which includes a delay line and a short shift register. In each case the shift register is assumed to be 14 stages long and the delay line 178 bits long. In the more detailed description it will be seen that the shift registers need not all be 14 stages long and that this uniformity of length is adapted herein only for purposes of clarity; where possible the shift register may be shortened and the delay line built out so that the total loop delay of the delay line and register is 192 bits or one frame.

The circulating memory for the Line Gate Number comprises the delay line 301 and the Shift Register 302. Line Gate Numbers for the first twenty-three time slots may be inserted in this memory loop under control of the Insert Control 321 via Conductor 333 and OR Gate 356. Line Scanning Gate Numbers may also be inserted by the Line Scanning Control 315 via Conductor 357 and OR Gate 356. Line Gate Numbers are read out of the memory loop on Conductor 342 and are subsequently transmitted to the remote concentrator over the control conductor such as 203. Connection between the Line Gate Number Readout Conductor 342 and the Control Conductor 203 is through the Line Scanning Control 315.

The Line Gate Number is also transmitted to the Dispatch Control 320 via Conductor 336. This data is then available to the Receive Portion 328 of the Office Control Module 355.

In Fig. 1 the central office junctor switching network is seen to comprise a plurality of concentrator to junctor crosspoints such as 109, a plurality of trunkor to junctor crosspoints such as 112, and a plurality of junctor links such as 121 and 122. As in the case of the transmission lines between the central office and the remote concentrator and between the central office and the trunkor, transmission within the central office is on a four-wire basis. A connection is effected in the junctor switching network by energizing a send and receive gate in each of the concentrator to junctor crosspoint blocks of the concentrators to be interconnected. For example, if the Concentrator 105 were to be connected to the Trunkor 110, send and receive concentrator to junctor crosspoints in 109 and send and receive trunkor to junctor crosspoints in 112 would have to be simultaneously energized to effect the desired connections. Consequently, in the Concentrator to Junctor Crosspoints 354, a send crosspoint connecting Transmission Line 330 and a receive crosspoint connecting receive line 331 must be energized to provide a concentrator to junctor connection.

Junctor Gate Number Translator 307 is a five-bit binary one out of 32 translator which accepts five binary Junctor Gate Number Addresses as input signals on Conductor Group 358 and selectively energizes in accordance therewith one of the 32 conductors in Group 332. As in the case of the Line Gate Number circulating memory Junctor Gate Numbers may be serially transmitted from the Junctor Gate Number Shift Register to the dispatch control via Conductor 337 and then to the Receive Portion 328 of the Office Control Module 355. Further, new Junctor Gate Numbers may be inserted by the manual control via the Data Conductor 326, the Insert Control 321 and the Junctor Gate Number Insert Conductor 334.

Call Progress relates to the state of a line or call served in a particular time slot and the Call Progress Word is an eight bit binary number denoting the current progress of a call. The current state of the call is combined with new knowledge relating to the line being served to provide control signals within the concentrator controller and to change the present or current Call Progress Word to a new word which includes the newly added information. For example, the Call Progress Word relating to a particular line may indicate that a hang-up is suspected, that is, a line which was served has now gone to the on-hook condition and on a subsequent supervisory scan it is again found that the line is in the on-hook condition thereby verifying the fact that the party has terminated the call and that the first on-hook condition was not merely a hit on the line. In this instance the Call Progress Word must be changed to indicate that a hang-up has been verified and action must be taken to clear the subject call from the particular time slot.

The Call Progress Word in any particular time slot can be transmitted to the receive portion of the office control module via the Call Progress Word Dispatch Conductor 338, the Dispatch Control 320 and the Data Conductor 324, and a new Call Progress Word can be manually inserted via the Data Conductor 326, the Insert Control 321, and the Call Progress Word Insert Conductor 335. The Call Progress Word appears as an eight bit parallel binary word to the Call Progress Word Translator 319 on Conductors 361 through 368 and a new Call Progress Word may be gated from the Call Progress Word Translator 319 to the Call Progress Word Shift Register via Conductors 371 through 378.

The Line Gate Numbers and the Scanning Gate Numbers, which are a counterpart of the LGN for the twenty-fourth time slot, are transmitted to the remote concentrator via the Line Scanning Control 315 and the Control Conductor 203.

In summary, three information words, namely, Line Gate Number, Junctor Gate Number, and Call Progress Word are circulated in individual memories.

The Junctor Gate Numbers are transmitted at the appropriate times to the Junctor Gate Number Translator 307 to effect control of the concentrator to junctor crosspoints in accordance with the desired interconnections. The Call Progress Words are employed at the concentrator control to control actions with respect to calls being processed and they represent the state of a call served in a particular time slot.

As previously indicated, Line Gate Number Words and PCM coded speech samples are transmitted from the concentrator control to the remote concentrator via the Control Conductor 203 and the Receive Conductor 201. Each of these words is sent in serial form and the first bit of the Line Gate Number is sent simultaneously with the first bit of the speech sample word. It is assumed that the control and receive transmission lines from the central office to the remote concentrator are similar in physical characteristics and therefore alike in time delay. In the illustrative embodiment of this system it is important that the total loop time delay from the central office concentrator controller, out to the remote concentrator and back to the central office be maintained at an integral number of frame periods. This total loop delay is assumed to be one or two frame periods of 125 microseconds each.

As will be shown in the detailed description of the remote concentrator, a pulse is transmitted from the remote concentrator to the concentrator controller each time the discrete framing signal reaches the remote concentrator at the precisely proper time. This frame correct acknowledgment pulse is transmitted from the remote concentrator in the third bit period of the twenty-fourth time slot of each frame, and since its time of expected arrival at the central office is predetermined, any deviation from the expected time of arrival may be employed as an alarm signal. The coded signals on the send conductor are employed in the Delay Servo 310, which adjusts the length of the variable delay line 309 to bring the total loop delay to an integral number of bit periods. It is further assumed that the loop delay will be initially adjusted to within one bit of an integral number of frame periods and that servo thereafter will hold the loop delay continuously within a tolerance of a small fraction of one bit. It is obvious that additional inputs to the servo loop to provide the coarser initial correction could be readily incorporated.

The Splitting and Tone Gate Circuit 308 provides means for sending PCM coded supervisory tones such as busy tone, no such number tones, and quiet tone to the remote concentrator without engaging concentrator to junctor crosspoints. The discrete serial 8 "1's" framing signal is introduced through the tone gates during the twenty-fourth time slot of each frame. The use of the discrete framing signal will be better understood in the later description of timing within a remote concentrator. The Tone Source 352 provides PCM code words cyclically varying in accordance with the desired tones and may be of the type disclosed in the copending application Serial No. 760,480, filed Sept. 19, 1958, of H. E. Vaughan Case 26.

Having briefly described the major functional elements of the central office portion of a concentrator module, we may now turn to the Office Control Module 355. The Clock Source 317 comprises a source of complex clock pulses which are required in the operation of this system. The detailed connections in the employment of these clock pulses appearing on Cable 318 will be shown later with respect to the more detailed drawing of the central office. The nature of these pulses has been explained with respect to Fig. 18.

The Line Scanner Number Generator 316 serves all of the remote concentrators and trunkors in parallel. Subscribers' lines are cyclically scanned to detect their current supervisory state, i.e., off-hook or on-hook. Similarly numbered lines are scanned in all concentrators and trunkors simultaneously, that is, when line 1 is being scanned in the first concentrator, line 1 is being scanned in all other concentrators and trunkors.

Line scanning requires four frame periods; therefore, the Scanning Number Generator 316 sequentially provides binary codes representative of the lines to be scanned and provides a new scanning gate number once every four frame periods.

The Office Control Module 355 includes the Receive Manual Control 328 whereby information stored in the circulating memories and relating to a call in progress can be obtained for manual observation. The Send Manual Control 329 is employed to insert new information in the circulating memory for the establishment and disestablishment of calls in the system.

In this specific illustrative embodiment of our invention certain control operations are disclosed as being manually performed by an operator in the central office. It is, of course, to be understood, however, that such operations may more advantageously be performed by electronic circuitry, in which case the operator may be considered as only exemplary, the operator functions being performed by the control circuitry in a fully automatic electronic embodiment of our time division switching and transmission system.

The arrangements of Fig. 3 are shown in greater detail in Figs. 8 through 24 and a fuller description will be made with respect thereto.

DETAILED SYSTEM DESCRIPTION

*Remote Concentrator*

A more detailed schematic drawing of the control portion of a remote concentrator is shown in Fig. 6. The Slave Clock 624 is a crystal controlled oscillator operating at approximately 1.536 megacycles, and this clock is set in phase by means of the address signal pulses received over the Control Conductor 501. Obviously, in the coded pattern established by the address signals on Conductor 501, pulses will occur only at discrete times in accordance with the address code and not at the basic clock rate. Such pulses, however, recur at sufficiently short intervals to insure correct phasing and frequency of the Slave Clock 624.

A return-to-zero type of signal is employed over the receive, transmit, and address conductors. That is, a pulse shorter than a bit period indicates a "1" and the signal returns to zero even during bit periods in which a "1" occurs.

All operations within the remote concentrator control are set in frame by a discrete framing signal which is transmitted from the central office concentrator controller to the remote concentrator control over the Receive Conductor 502 during the twenty-fourth time slot of each frame. The framing signal consists of eight consecutive "1's" which are recognized by the 8 "1's" Shift Register 601 and its attendant circuitry.

Information on Receive Conductor 502 is amplified in Amplifier 616 and is then transmitted directly over Conductor 659 in serial form to the "1" input conductor of the Receiving Shift Register 600 and through AND Gate 621 to the 8 "1's" shift register input conductor over Conductor 643. The information is also transmitted via the Logical Inverter 612 and Conductor 660 to the "0" input terminal of the Receiving Shift Register 600 and to the 8 "1's" register Reset Conductor 646 via AND Gate 623 and OR Gate 622.

At the occurrence of the eight consecutive "1's" on 502, the 8 "1's" Register 601 will be filled, that is, all eight stages of the Register 601 will be in the "1" state and output signals will be present on Conductors 670 and 671, which are the "1" output conductors of stages 7 and 8. The output from two stages is employed to indicate the filling of the 8 "1's" shift Register 601 rather than the output of the eighth stage alone as it is important to assure that a true 8 "1's" signal has been received. Unless two stages are interrogated, it is possible to generate a frame correct signal when the concentrator is actually out of frame. The output signals on Conductors 670 and 671 are combined in AND Gate 672 with the $N_{80}$ pulse and their simultaneous energization effects setting of the Frame Correct Flip-Flop 673.

The Frame Correct Flip-Flop 673 is set only if the remote concentrator is in proper frame when the 8 "1's" framing signal is detected. The system is arranged so that the 8 "1's" signal completely fills the 8 "1's" Shift Register 601 just preceding the $N_{80}$ pulse. If the framing signal arrives after the $N_{80}$ pulse has been generated, the output Conductors 670 and 671 from the seventh and eighth stages of the 8 "1's" shift register will not be energized at the occurrence of the $N_{80}$ pulse and the Gate 672 will not be enabled. If the framing signal arrives more than a brief period before the $N_{80}$ pulse, the first seven stages of the 8 "1's" shift register will have been reset and again Gate 672 will not be enabled. In any event, each time the 8 "1's" shift register is filled, the Conductor 647 will be energized and the signal on this conductor will be combined with the output of the 0.5 microsecond Delay Circuit 620 to enable AND Gate 619. The output signal from AND Gate 619, which is amplified in Amplifier 618, is transmitted via Conductor 645, OR Gate 622, and Conductor 646 to reset the first seven stages of the 8 "1's" shift register directly to the Timing Shift Register 602 to reset stages 1 through 7 and set stage 8. Therefore, upon the occurrence of a framing signal, an $N_{80}$ pulse is generated. That is, setting of the eighth stage of Shift Register 602 and the occurrence of a phase 0 pulse on conductor 675 enables Gate 641 to provide an $N_{80}$ pulse.

Subsequent to the setting of the eighth stage of Shift Register 602, phase 2 pulses on Conductor 676 will advance the initial "1" from the eighth stage back to the first stage and successively through stages 2 through 7 of the Timing Shift Register 602. Each of the stages 1 through 8 will remain in the set condition for a full bit period, and the occurrence of the phase 0 and phase 2 pulses on Conductors 675 and 677 in combination with the timing shift register stage output conductors will selectively and successively enable the Gates 627 through 642 to provide the complex timing pulses required in the remote concentrator. The output conductors of Gates 627 through 642 are shown connected to the Timing Cable 650, and it is through this cable that these pulses are distributed throughout the remote concentrator. In addition to the basic phase 0 and phase 2 pulses for each of the bit periods of the eight bit word, the conductor labeled $N_4'$ is energized for all bit periods other than the fourth bit period. The $N_4'$ information is employed to inhibit transmission of PCM speech information during the eighth bit period of each word. The eighth bit period is not employed in the message on the S lead from the concentrator to the central office except during the twenty-third word at which time the scanner response is sent.

It is assumed that the Slave Clock 624 will remain in step with the data signals on Conductor 661; therefore, the complex timing pulses will remain in the proper time relationship between framing signals.

If the remote concentrator clock is in proper phase when the framing signal is detected, the Frame Correct Flip-Flop 673 will be set at time $8_0$ of the twenty-third time slot of each frame. Accordingly, the Frame Correct Conductor 674 will be energized at time $23_{80}$ and upon occurrence of the $24_{72}$ pulse, AND Gate 550 will be energized. The output of Gate 550 is transmitted through OR Gate 551, AND Gate 552, and Regenerative Amplifier 536 to the send line 553. The output of AND Gate 550 is gated through 552 upon occurrence of the phase 2 pulse on Conductor 554; therefore, signals are transmitted to the send line 553 in precisely proper phase.

In accordance with the above discussion, it is noted that acknowledgment will be transmitted to the concentrator controller, which is located at the central office, each time the concentrator is in proper phase at the time of detection of the 8 "1's" framing signal.

As previously explained, address and scanning signals are transmitted from the concentrator controller to the remote concentrator over Conductor 501; pulse code modulation speech signals and framing signals are transmitted to the remote concentrator over Conductor 502; and on a time division basis, pulse code modulation speech signals, scanner responses, and frame correct acknowledgment signals are transmited from the remote concentrator to the concentrator controller over Send Conductor 553.

The operation of the time division hybrid of Fig. 5 can best be understood by way of example with reference to the time diagram of Figs. 29 through 32. Assume that Subscriber 10 is to be served in a particular time slot, for example, in Time Slot 22, and that Subscriber 253 is to be served in the succeeding time slot. As seen in line 7 of Fig. 29, the line gate for Subscriber 10 is enabled at $22_{10}$ and remains enabled until $22_{52}$.

As previously discussed, PCM codes representative of the subscriber's line address are transmitted from the central office to the remote concentrator via the Control Pair 501. These address signals are amplified in Amplifier 625 and transmitted in parallel to the Slave Clock 624 via Conductor 661 and to the input terminals of the eight stage Address Shift Register 400. The signal at the output of Amplifier 625 is on a single rail basis, and this signal is converted to a two rail basis by the use of the Logical Inverter 626. The uninverted output of Amplifier 625 and the output of Inverter 626 are connected via Conductors 401 and 403 to the 0 and 1 input terminals, respectively, of the Address Shift Register 400. The address signals are shifted through the Register 400 under the influence of phase 2 advance signals. At time $21_{72}$, the last bit of the address has been shifted into the Register 400 and immediately thereafter, at time $21_{80}$, the information in Register 400 is gated in parallel through the AND Gates 404–411, processed in the Pulse Stretchers 412–419 and in the X and Y translators 420 and 421. The first four bits of the line gate address are employed as inputs to the four bit binary to 1-out-of-16 X Translator 420 and the last four bits are processed in the four bit binary to 1-out-of-16 Y Translator 421. Accordingly, after translation, one of the sixteen output conductors of the X Translator 420 and one of the sixteen output conductors of the Y Translator 421 will be simultaneously energized. At time $22_{10}$, the information on the energized X and Y translator output conductors will be gated to the appropriate ones of the $X_1$ through $X_{16}$ and $Y_1$ through $Y_{16}$ Flip-Flops 422 to 423 and 424 to 425. Accordingly, after translation, one of the X flip-flops such as 422 or 423 and one of the Y flip-flops such as 424 or 425 will be in the set condition. The "1" output conductors such as 428 and 429 of the X and Y flip-flops are connected in pairs to the control terminals of the line transmission gates such as 426 and 427. With sixteen possible X choices and sixteen possible Y choices, a total of 256 line gates may be selectively enabled. At time $22_{52}$, the Flip-Flops 422 through 425 are reset and the line gate is disabled.

In the 4½ bit periods between time $1_0$ and time $5_2$, the subscriber's speech must be sampled for purposes of encoding, and the decoded speech sample at the output of the Amplifier 612 must be transferred to the subscriber's line. To accomplish sampling, the S1 Gate 506 is enabled at $22_{10}$ to provide a path from the output of the subscriber's Line Gate 426 to the first Storage Capacitor 507 associated with the first send leg of the time division hybrid. The S1 Gate 506 remains enabled for 1½ bit periods, and it is during this time that the speech originating at the subscriber's line is sampled and stored on the Capacitor 507. Further, by time $22_{10}$, a PCM code representative of a speech sample originating at a distant subscriber has fully entered the Receiving Shift Register 600. This coded signal comprises seven bits and was transmitted in serial form from the central office with the most significant bit being the first element of the serial message. The receiving shift register has two buffer delay stages, D1 and D2, which, as will be seen later, are required to permit the work operations in the remote concentrator to occur in proper sequence. The amplitude or level of the speech sample originating at the distant subscriber and intended for the local subscriber is indicated by the setting of the seven binary weighted stages 1 through 64 of the Receiving Shift Register 600. Since a sample is being taken of the speech information originating at line 10 during the period starting at $22_{10}$ and ending at $22_{22}$, the receive leg of the hybrid must be isolated from the concentrator transmission bus during this period. However, decoding takes a finite period of time; therefore, at time $22_{10}$, the binary code representative of the speech sample from the distant end is gated through Gates 652 through 658 to the decoding network input Flip-Flops 603 through 609. As seen in line 9 of the time diagram, the code representative of the incoming speech sample will reside in the decoding Flip-Flops 603 to 609 from the period starting at $22_{10}$ and ending at $22_{62}$. Until the time immediately preceding transfer of the output signal from the Decoding Network 610 to the Expander 611, and thence to the concentrator transmission bus via Amplifier 612 and Receive Gate 613, the output conductor of the Decoding Network 610 will be clamped at ground level. Clamping is effected by holding the decode clamp Flip-Flop 681 in the set state until time $22_{22}$, at which time the decode clamp flip-flop is reset. Resetting Flip-Flop 681 de-energizes its "1" output Conductor 682, and thereby disables AND Gate 680 to remove the ground from a decoding output conductor. One-half bit time later at time $22_{30}$, the Receive Gate 613 is enabled and the speech sample output of the decoding network is gated to the concentrator transmission bus, and thence via the bidirectional Line Transmission Gate 426 to the line circuit of Subscriber 10. At time $22_{52}$, the transfer of the speech sample from the decoder to the subscriber is completed and the Line Gate 426 and the Receive Gate 613 are both disabled.

The S1 Gate 506 was disabled at time $22_{22}$ to remove the input to the first Send Capacitor 507 and one bit period later at time $22_{32}$, Gate 510 is enabled to transfer the speech sample stored on Capacitor 507 to the Encoder 517. It should be noted that the speech sample is first processed in Compressor 555 which has a response curve such that high amplitude signals are compressed. As is well known, in pulse code modulation, it is desirable to encode low level speech signals in smaller discrete amplitude steps than large speech signals. Accordingly, when compressed speech signals are applied to an encoder input terminal, the desired encoding is accomplished. The serial output of Encoder 517 appears on Conductor 560 and is gated through AND Gate 561, OR Gate 551, and AND Gate 552 to the Send Amplifier 536 and the send line 553. The output of the encoder is a seven bit serial binary coded word with the most significant binary bit being a first element of the word reaching the transmit line. AND Gate 561 is enabled for all periods other than the twenty-fourth word and the eighth bit time of each send word. The eighth bit time is not employed herein except during the twenty-third word, at which time the scanner response is sent back to the central office. Setting of the block twenty-fourth word Flip-Flop 557 de-energizes the "0" Output Conductor 558 and thereby disables Gate 561 during the twenty-fourth word of each frame and de-energization of Conductor $N_4'$ during the fourth bit period of every word disables Gate 561 during the period that the eighth PCM bit would be transmitted from the encoder to the line.

As seen at line 14 of Fig. 29, the seven bit PCM send word starts on the line at time $22_{42}$ and is fully on the line by time $23_{32}$. An example of a PCM word for Time Slot 22 having an amplitude of Level 39 is shown at line 23 of the time diagram. The bit occurring in line 23 at time $22_{62}$ is the second most significant bit of word 22 and the bit at time $23_{32}$ is the least significant bit. Accordingly, from left to right the active bits of PCM word 22 have the values 32, 4, 2, and 1, respectively.

As seen at line 13 of the time diagram, the transfer of the speech sample stored on Condenser 507 is not completed until time $23_{22}$ at which time Gate 510 is disabled. Accordingly, the actions with respect to subscriber's line 10, which is served in Time Slot 22, require 9½ bit times and only an eight bit PCM word is handled on the send and receive lines. In the conservation of time, a second hybrid send leg is employed so that a time slot can be held to eight bit periods. As seen at lines 15 and 16 of Fig. 31, the Line Gate 427 associated with subscriber's line 253 opens at time $23_{10}$ and the Send Gate 511 of the second hybrid leg also operates at time $23_{10}$ to sample the speech originating with Subscriber 253. As in the prior discussion with respect to line 10, the coded word intended for line 253 has fully entered the receiving shift register by time $23_{10}$ and at this time Gates 652 to 658 are enabled to transfer the incoming coded word to the decoder input flip-flops. The second Send Gate 511 remains operated for 1½ bit periods to effect sampling of speech from Subscriber 253 and then one bit period after completion of sampling, at time $23_{32}$, Gate 515, in the second hybrid leg, is enabled to transfer the speech sample from Capacitor 512 to the input of Encoder 517. Accordingly, Compressor 555 and Encoder 517 serve the two hybrid send legs on an alternate basis. As explained with respect to line 10, line 253 must be sampled to originate a send code and must receive a speech sample from the distant station during the period starting at $23_{10}$ and ending at $23_{52}$. During this time the line gate for line 253 remains operated. After time $23_{22}$, at which time Gate 511 is disabled and the speech sample on Capacitor 512 is isolated from the concentrator transmission bus, action must be taken to transfer the decoded speech sample signal to Subscriber 253. In furtherance of this action, the decoder as shown at line 10 of the time diagram is unclamped at time $23_{22}$ and Receive Gate 613 is enabled for 2½ bit periods starting at time $23_{30}$ and ending at $23_{52}$.

The encoding of the speech sample from the Capacitor 512 to the encoder is not terminated until $24_{22}$, and the actions with respect to line 253, which is being served in Time Slot 23, similarly requires 9½ bit periods.

A binary counter 516 receives an input count at time $N_{12}$ of each time slot, and therefore switches from the "0" to "1" state and back on alternate time slots. When the binary counter 516 is in its "1" state at time $N_{10}$, the first hybrid send leg comprising Gate 506, capacitor 507, Send Output Gate 510, Clamp Gate 509, Clamp Flip-Flop 528, and Encoding Flip-Flop 530 will be employed, and when the counter is in its "0" state at time $N_{10}$, the second hybrid send leg comprising Send Input Gate 511, Capacitor 512, Output Send Gate 515, Clamp Gate 514, Clamp Flip-Flop 529, and Encoding Flip-Flop 531 will be employed. The output signals from the Send Output Gates 510 and 515 are taken through Send OR Gate 518 to the Compressor 555. When the Send Counter 516 is in its "1" state and the first send leg is to be employed, the AND Gates 519, 521, and 523 are all primed by the energization of the "1" output conductor of the Counter 516, and when the send counter is in its "0" state and the second send leg is to be employed the AND Gates 520, 522, and 524 are primed. The speech signal to be transmitted is transferred from the concentrator transmission bus selectively through one of the Input Send Gates 506 and 512 in accordance with the setting of the Send Counter 516 and the Send Flip-Flops 526 and 527. The AND Gate 525 is employed in the setting of the Send Flip-Flops 526 and 527 and this gate passes the signal on the $N_{10}$ conductor to the Gates 519 and 511, except when the Inhibit Flip-Flop 503 is in its set state.

The twenty-fourth time slot of each frame is reserved for the scanning of lines at the remote concentrator and the framing of actions within the concentrator. The framing word comprising 8 "1's" is shown in line 25 of Fig. 31 as this signal appears on the line. At time $23_{72}$, the first bit of the 8 "1's" signal settles in the first stage of the 8 "1's" Shift Register 601 and eight bit periods later at time $23_{80}$, the 8 "1's" register is completely filled. The 8 "1's" signal is transmitted during the twenty-fourth time slot in place of a coded speech sample from a distant subscriber. As seen at line 24 of the time diagram, the scanner gate number for the line to be scanned in this particular frame, namely, the scan gate number for line 125, appears on the control conductor in the same time relationship as the 8 "1's" signal. The serial scan gate number is transmitted from the central office to the remote concentrator with the least significant bit being the first element of the series. In the timing diagram at line 24, reading from left to right from time $22_{82}$ to $23_{62}$, the active elements carry the respective binary weights of 1, 4, 8, 16, 32, and 64, which is the code for 125.

The framing operation has been previously described in detail and as indicated, if the $N_{80}$ pulse occurs at the time the 8 "1's" framing signal is detected, framing is deemed to be correct and a frame correct signal is transmitted from the remote concentrator to the central office. As shown at line 20 of the time diagram, the frame correct signal enters the send line at time $24_{72}$ and as indicated in line 23 of the time diagram, this is in the third bit position of the twenty-fourth send word. As will be seen later with respect to discussion of the Delay Servo at the central office, this acknowledgment signal is employed to provide an alarm when the total loop delay is incorrect.

Lines associated with a remote concentrator are serially scanned to detect transitions in supervisory state with a view towards recognizing requests for service, disconnects, supervisory flashes, etc. Scanning is effected by selectively energizing a subscriber's line gate while simultaneously inhibiting the send and receive gates in the concentrator. If a line such as is associated with Subscriber 10 is in the off-hook condition, the potential detected at the scanning points such as 433 and 434 will enable an associated scanning gate such as 435. The output of the scanning AND gates such as 435 and 440 are combined in OR Gate 436 for transmission to the set conductor of the Scan Flip-Flop 556. The Scan Flip-Flop 556 is reset upon the occurrence of an 8 "1's" framing signal on Conductor 690; therefore, at time $23_{80}$, the Scan Flip-Flop 556 will be placed in its reset state regardless of its prior state. If the line which is scanned is found to be in the on-hook state, Conductor 538, which is the output of OR Gate 436, will not be energized before the next $23_{80}$ pulse and the scanner flip-flop will remain disabled. However, if the line is in the off-hook condition at time $24_{20}$, Gate 432 will be enabled and the scanner flip-flop will be set. In the time diagram the scanner gate number for line 125 is shown at line 24 in the twenty-fourth C on control word position. At line 21, it is seen that the scan flip-flop is set to its "1" state at time $24_{20}$. For the fourth bit period starting at time $N_{32}$ and terminating at time $N_{42}$, the $N_4'$ conductor will be de-energized, as seen at line 27 of the time diagram, and the output of the encoder will be removed from the transmitting OR Gate 551.

The Inhibit Flip-Flop 503, which inhibits voice transmission and reception during scanning, is set to its "1" state by the energization of the 8 "1's" Conductor 690. The "1" output conductor of the inhibit flip-flop in conjunction with an $N_{42}$ pulse serves to enable AND Gate 570, and thereby set the block twenty-fourth send word flip-flop to the "1" state. The block twenty-fourth send word flip-flop will remain operated for eight bit periods starting at $24_{42}$ and terminating at $1_{42}$. Accordingly, during the scanning period starting at $24_{42}$, and ending at $1_{42}$, the "0" output Conductor 558 of the Flip-Flop 557 is de-energized, to disable the encoder output AND Gate 561. The "1" output conductor of the Inhibit Flip-Flop 503, when energized, inhibits AND Gate 615 and thereby prevents setting of the Receive Flip-Flop 614 during the twenty-fourth time slot of each frame.

The Scan Flip-Flop 556 is set to its "1" state at time $24_{20}$ indicating that subscriber's line 125, not shown, is in the off-hook condition. As noted, the inhibit Flip-Flop 503 is in its "1" state, thereby energizing Conductor 571, and at time $24_{42}$ the Scan Output Gate 534 is enabled to transmit a pulse through combining OR Gate 551 to the Send Output AND Gate 552. A phase 2 pulse on Conductor 554 enabled Gate 552 and a scan response pulse, indicating that the scan line was in the off-hook condition, is transmitted to the line. As shown at line 23 of the time diagram, a pulse which enters the send line at time $24_{42}$ is in the eighth bit position of the twenty-third PCM word.

*Concentrator controller and switching network*

Figure 16:
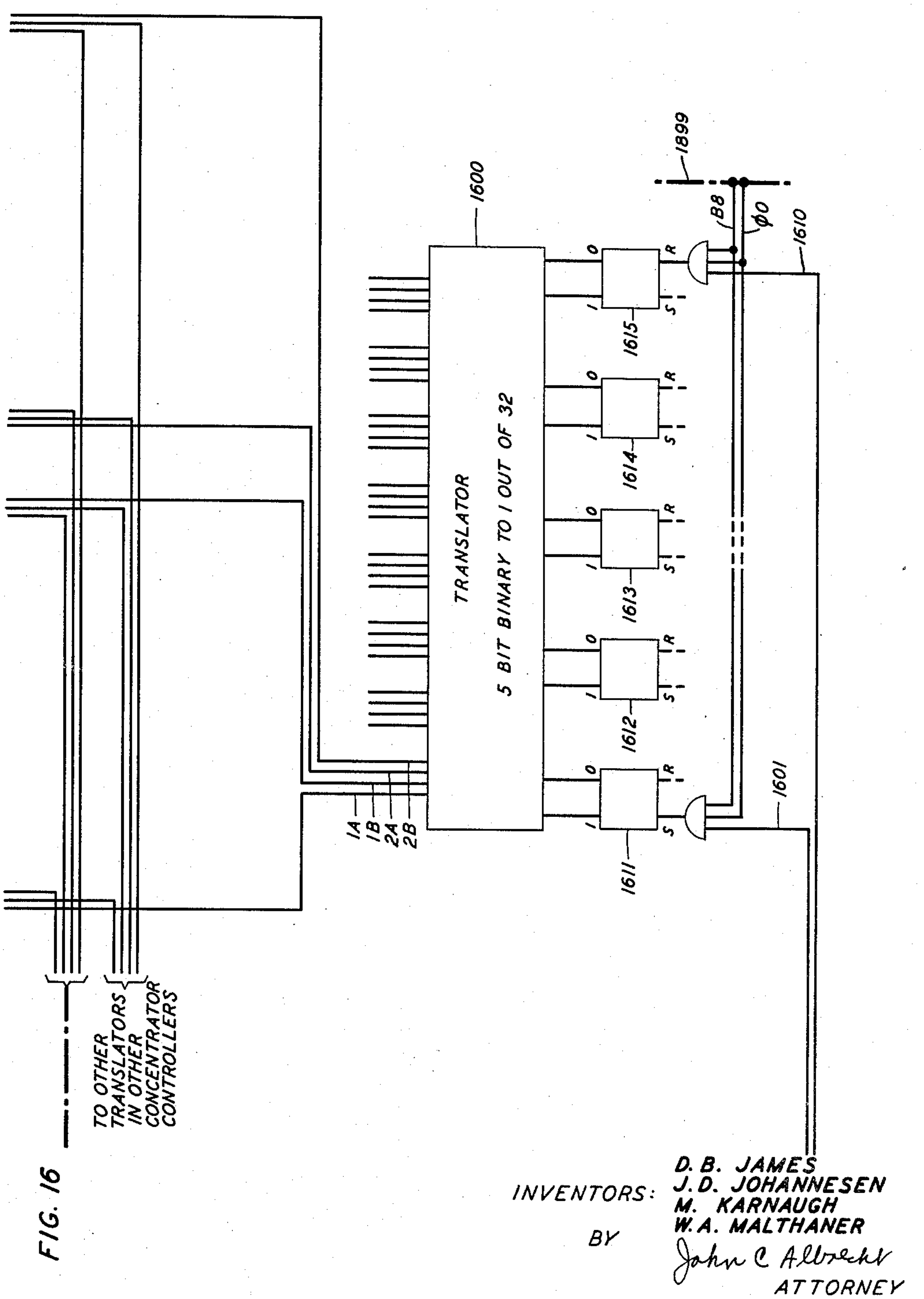

The central office concentrator controller for the remote concentrator of Figs. 4, 5, and 6 is shown in functional detail in Figs. 7 through 15. The concentrator to junctor and trunkor to junctor crosspoints are shown in Fig. 17 and a binary translator which accepts concentrator binary address inputs to provide selective energization of the crosspoints of Fig. 17 is shown in Fig. 16. One such translator is provided for each concentrator and trunkor.

Figure 7:
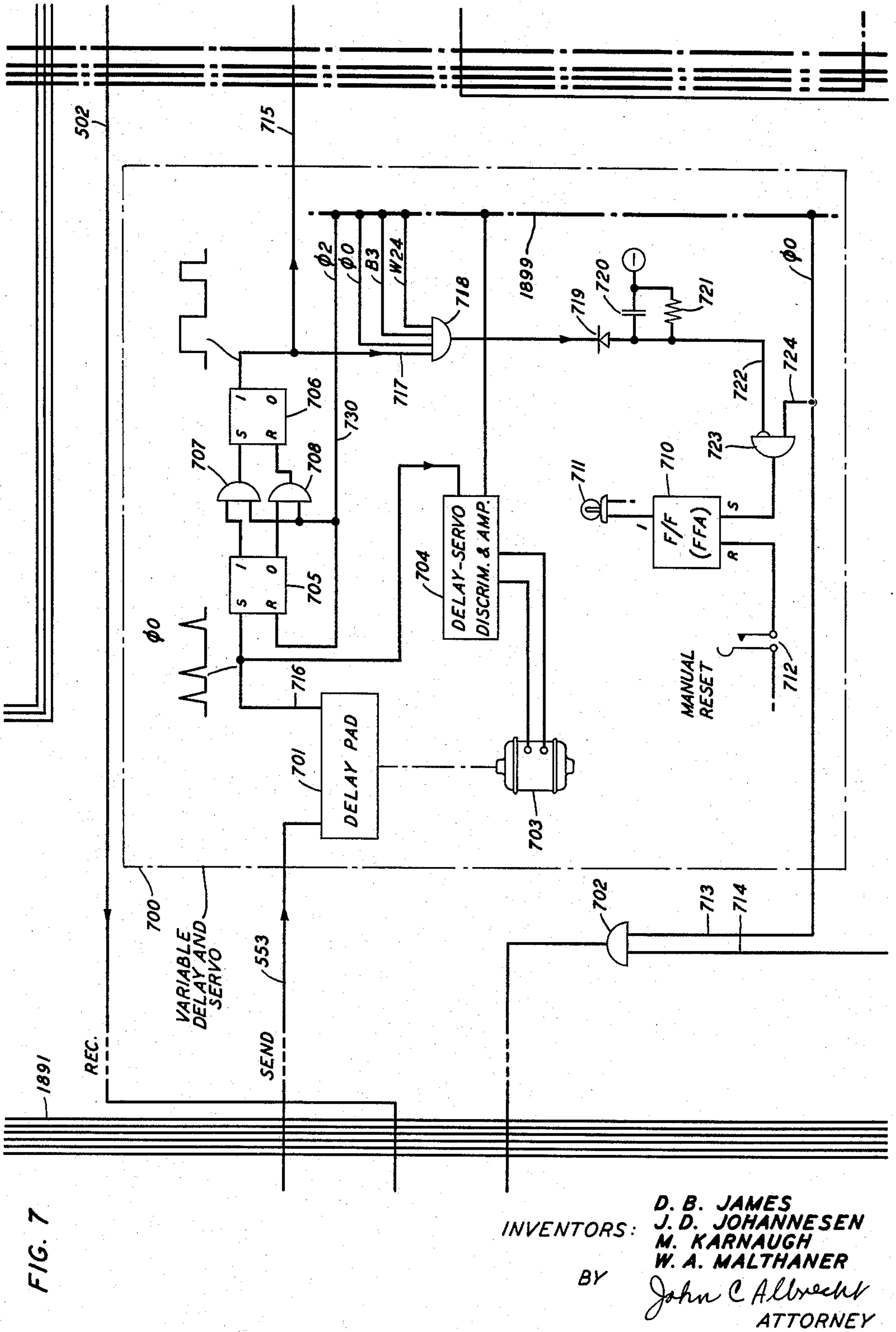

The arrangements of Fig. 7 provide the point of connection at the central office for the three transmission lines running between the central office and the remote concentrator of Figs. 4, 5, and 6. Conductor 553 is referred to as the send conductor and this labeling is determined with respect to the remote concentrator. That is, on Conductor 553, information is sent from the remote concentrator to the central office, and similarly on Conductor 502 information is received at the remote concentrator from the central office. Send Conductor 553 terminates in the Variable Delay Pad 701. As explained with respect to Fig. 3, the delay period is automatically adjusted to precisely establish the total loop delay from the central office to the remote concentrator and back to the central office as an integral number of frame periods. All data originating at the remote concentrator leaves the Delay Pad 701 after the delay has been corrected. The delayed data enters the Delay Servo Discriminator and Amplifier 704 and by a parallel connection the two stage shift register comprising stages 705 and 706. Each bit of data entering the Delay Servo is examined and it is compared with standard phase 0 pulses generated locally in the clock source of Fig. 18. A Delay Servo of the type employed herein to actuate the Servo Motor 703 is shown in the application Serial No. 706,358 of W. A. Malthaner, filed December 31, 1957. The servo adjusts the Delay Pad 701 to put the data in step with the phase 0 pulses at the output of the Pad 701.

The data pulses entering the send line at the remote concentrator are well shaped square waves. However, in transmission from the remote concentrator to the central office, the data pulses can become distorted and may advantageously be regenerated by repeaters (not shown) at various intermediate points. Transmission can be over conventional cable or any of the well-known electromagnetic "wireless" means. The shift register comprising stages 705 and 706 is employed to regenerate the line signals and to convert the return-to-zero signals on Conductor 716 to non-return-to-zero signals on Conductor 715. As noted, the data on Conductor 716 is in phase 0 time; therefore, each time a "1" appears on Conductor 716, the First Shift Register Stage 705 is set to its "1" state at approximately phase 0 time. At the immediately succeeding phase 2 time, the phase 2 advance pulse on Conductor 730 resets stage 705 and advances the "1" stored therein to stage 706 by enabling AND Gate 707. The occurrence of a succeeding "1" in the data on Conductor 716 without an intervening zero will again set stage 705 at the immediately succeeding phase 0 time, and, as before, the energization of Conductor 730 at time phase 2 will reset stage 705 and enable Gate 707 to provide the setting signal to stage 706 which is already in the "1" state.

Where a data "0" immediately succeed a "1," the first shift register stage 705 remains in the reset or "0" state at the occurrence of the "0" data signal and at the occurrence of the immediately succeeding phase 2 pulse on Conductor 730, and AND Gate 708 is enabled to reset stage 706. Resetting of stage 706 de-energizes output Conductor 715, thereby terminating the pulse on the output conductor precisely at the end of a bit period.

The regenerated pulses are transmitted to line 715 and eventually to the central office switching network. In addition, the regenerated data on Conductor 715 is available at Conductor 717 which is one of the inputs to the Frame Correct AND Gate 708. The frame correct acknowledgment signal is expected in phase 0 of the third bit of the twenty-fourth time slot; therefore, at this time Gate 718 is enabled to gate the frame correct signal to the alarm circuit. The frame correct signal at the output of Gate 718 appears as a series of negative going pulses occurring once every twenty-fourth time slot. The negative pulses forward-bias Diode 719 and serve to charge Capacitor 720. So long as Capacitor 720 remains charged, Gate 723 is inhibited and the Alarm Flip-Flop 710 remains in the reset state. If frame correct acknowledgement signals do not appear at time word 24, bit 3, phase 0, the charge on Capacitor 720 will be drained through Resistor 721, and Gate 723 will be enabled by the next succeeding phase 0 pulse on Conductor 724. Alarm Flip-Flop 710 will be set to light the light 711 and energize any other desired distinctive alarm signals. The Alarm Flip-Flop 710 may be manually reset by closing Switch 712.

In summary, the data on Conductor 553 is transmitted through a Delay Pad 701 which is adjusted to place the data in precisely phase 0 time on Conductor 716. Since the data undergoes considerable distortion in transmission from the remote concentrator to the central office, it is regenerated at intervals and finally converted from a return-to-zero signal into a non-return-to-zero signal by the two-stage shift register comprising stages 705 and 706.

The frame correct acknowledgment signals are expected at bit 3 of the twenty-fourth time slot and are gated to the alarm circuit to detect either the absence of the frame correct signal or the shifting of the acknowledgment outside the expected time of arrival.

The data on Conductor 715 is available for transmission through the central office switching network to either a remote concentrator or a trunkor.

The central office time division switching network comprising crosspoints for two of a plurality of concentrators and one of a plurality of trunkors and two of a plurality of interconnecting junctors is shown in Fig. 17. One of a plurality of Junctor Gate Number Translators, one of which is shown as 307 of Fig. 3, is shown as Translator 1600 of Fig. 16.

Although the discussion herein relates to connections through the central office switching network and wholly within this single office module from subscriber to subscriber and from subscriber to an operator or trunk, it is to be understood that connections may be established from this central office switching network to the central office switching network of other similar office modules by employing junctor pairs having A gates as shown in Fig. 17 in one office module and B gates in the other office module.

In Fig. 17, the Send and Receive Conductors 1700 and 1701 are associated with the remote concentrator of Figs. 4, 5, and 6. The transmit and receive lines 1717 and 1718 are associated with the trunkor of Figs. 25 through 27 and the transmit and receive lines 1750 and 1751 are assigned to a second remote concentrator, not shown.

The first junctor comprises the transmission Conductors 1702 and 1703 and the second junctor comprises the Conductors 1708 and 1709. It is seen in Fig. 17 that a concentrator or trunkor send conductor may be connected to either of the junctor conductors such as 1702 or 1703. For example, if Conductor 1731 is energized, the Send Conductor 1700 will be connected through Gate 1704 to the Junctor Conductor 1702 and the Receive Conductor 1701 will be connected through Gate 1705 to the Junctor Conductor 1703. However, if Control Conductor 1714 is energized to enable Gates 1706 and 1707, the connections between the Send and Receive Conductors 1700 and 1701 and the Junctor Conductors 1702 and 1703 will be reversed. That is, when Gates 1706 and 1707 are enabled, Send Conductor 1700 will be connected to 1703 and Receive Conductor 1701 will be connected to 1702. A similar situation obtains with respect to each concentrator and trunkor and each of the junctors.

In Fig. 17, Gates 1704, 1705, 1719 and 1720 which provide access to the first junctor comprising Conductors 1702 and 1703 are designated A Gates and the Gates 1706, 1707, 1721, and 1722 which similarly provide access to the Junctor Conductors 1702 and 1703, but in reverse connection to those connections of the A Gates, are designated B Gates. Similarly, with respect to the second junctor comprising Conductors 1708 and 1709 the remaining gates are designated as A and B Gates. To effect a connection between two concentrators, a set of concentrator to junctor A Gates must be energized for the first concentrator and B Gates for the second concentrator. Similarly, a connection may be effected between the send and receive lines of a concentrator and of a trunkor. For example, a connection between send and receive lines 1700 and 1701 via Junctor Conductors 1702 and 1703 and send line 1717 and receive line 1718 may be effected by energizing the A Gates 1704 and 1705 and the B Gates 1721 and 1722. Further, the same interconnection can be made by energizing the A Gates 1719 and 1720 and the B Gates 1706 and 1707.

Five bit binary Junctor Gate Number Codes are transmitted in parallel on a two-rail basis from the Junctor Gate Number Shift Register to the Junctor Gate Number Translator 1600 via Conductors 1601 through 1610. The Junctor Gate Number is gated to the Translator Input Storage Cells 1611 through 1615 and held in these cells for one time slot period during which time the desired interconnection is effected.

*Talk and tone gates*

In the routine control of a remote concentrator and in the establishment of calls to a concentrator, a variety of tones and discrete signal sources must be transmitted from the central office to a remote concentrator. Connection of these tones is effected through the talk and tone gates of Fig. 9. The Talk and Tone Gates 901 through 910 provide for the connection of the various required tones to the remote concentrator Receive Line 502 and for interconnection of the remote concentrator Receive Line 502 and the concentrator to junctor Receive Conductor 1701. Gates 901 through 910 are associated with the remote concentrator of Figs. 4, 5, and 6; Gates 951 to 960 are associated with a second concentrator, not shown; and Gates 971 through 980 are associated with the trunkor of Figs. 25 through 27.

The 8 1's Generator 921 provides 8 serial 1's for each word of a frame. The 8 1's signal is gated to each of the concentrator and trunkor receive lines such as 502 during the twenty-fourth word of each frame. The word 24 Conductor 931 is enabled for the entire twenty-fourth word period starting with time $23_{82}$ and terminating at time $24_{82}$. Accordingly, the first "1" of the 8 serial 1's reaches the output of AND Gate 901 at time $24_{10}$ and the last one of the 8 serial 1's reaches the output of AND Gate 901 at time $24_{80}$.

The remaining Tone Sources 922 through 925 are cyclically varying PCM word generators which provide the PCM codes representative of the various tones.

Some Call Progress States are nontalking, such as idle, suspect request for service, and hang-up verified. When a time slot is in one of these nontalking states a zero level or quiet code is transmitted to the remote concentrator. The zero level code is selectively gated to a receive line such as 502 through the AND Gates 903, 953, and 973. These gates are under control of a gate zero level flip-flop such as 1154, the operation of which will be described later with respect to the Call Progress Word Decoder-Coder.

Similarly, the PCM codes for ringing tone and busy tone are selectively gated to the receive line 502 under control of the gate ringing and gate busy Flip-Flops 1152 and 1151, respectively, and the PCM code representative of ringing induction is transmitted to the send line 1700, also under control of the gate ringing Flip-Flop 1152 to indicate to the calling subscriber that the called line is being rung.

While any of the preceding tones are being transmitted to the send and receive lines, the talk gates such as 906 and 907 will be disabled, thereby isolating the remote concentrator transmission lines from the concentrator to junctor transmission lines. The Talk Gates 906 and 907 are selectively enabled during busy time slots, in which talking is anticipated, by the setting of the Talk Flip-Flop 1153. Flip-Flop 1153 is similarly under control of signals from the Call Progress Word Decoder-Coder.

Figure 9:
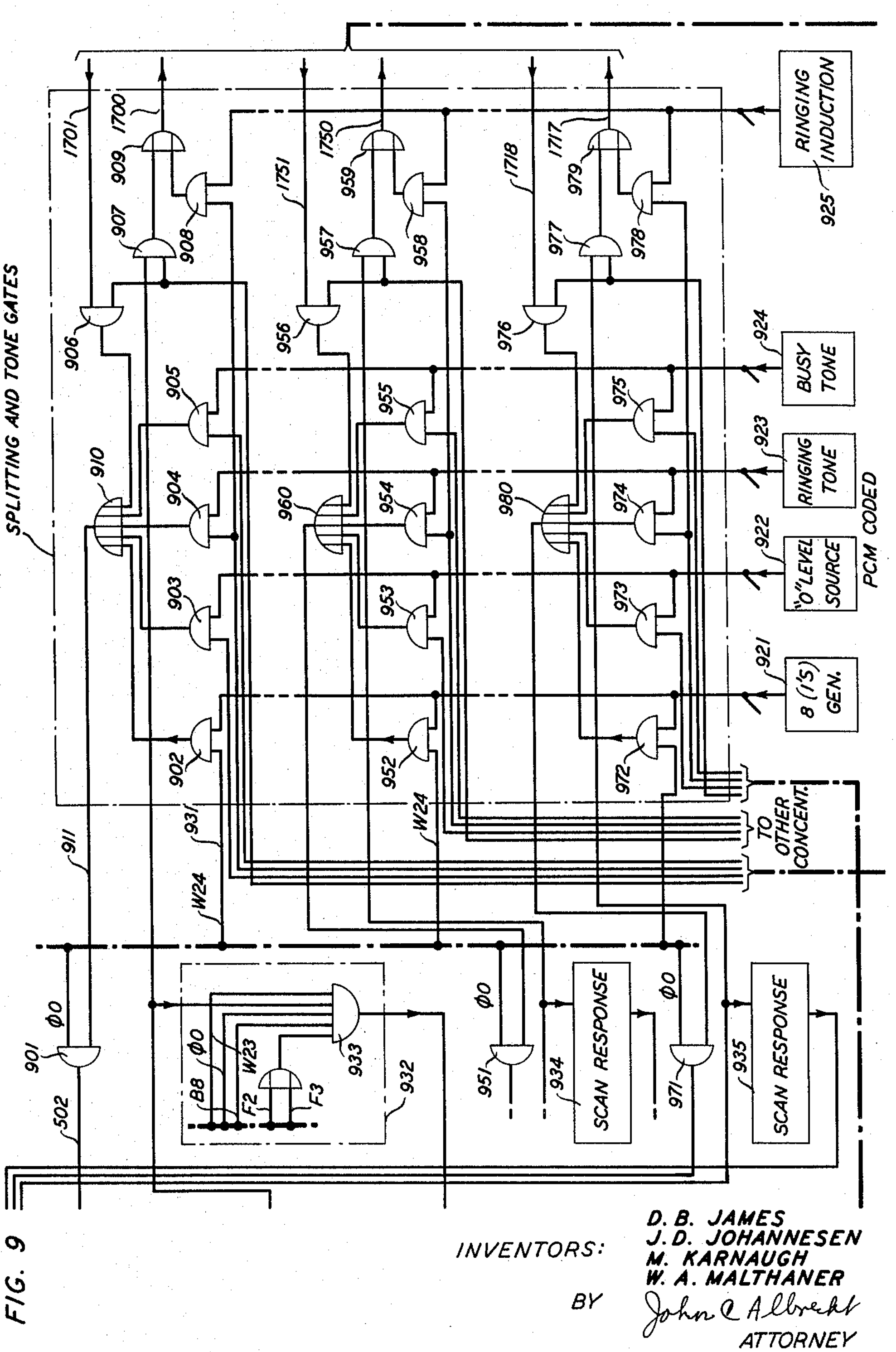
Figure 10:
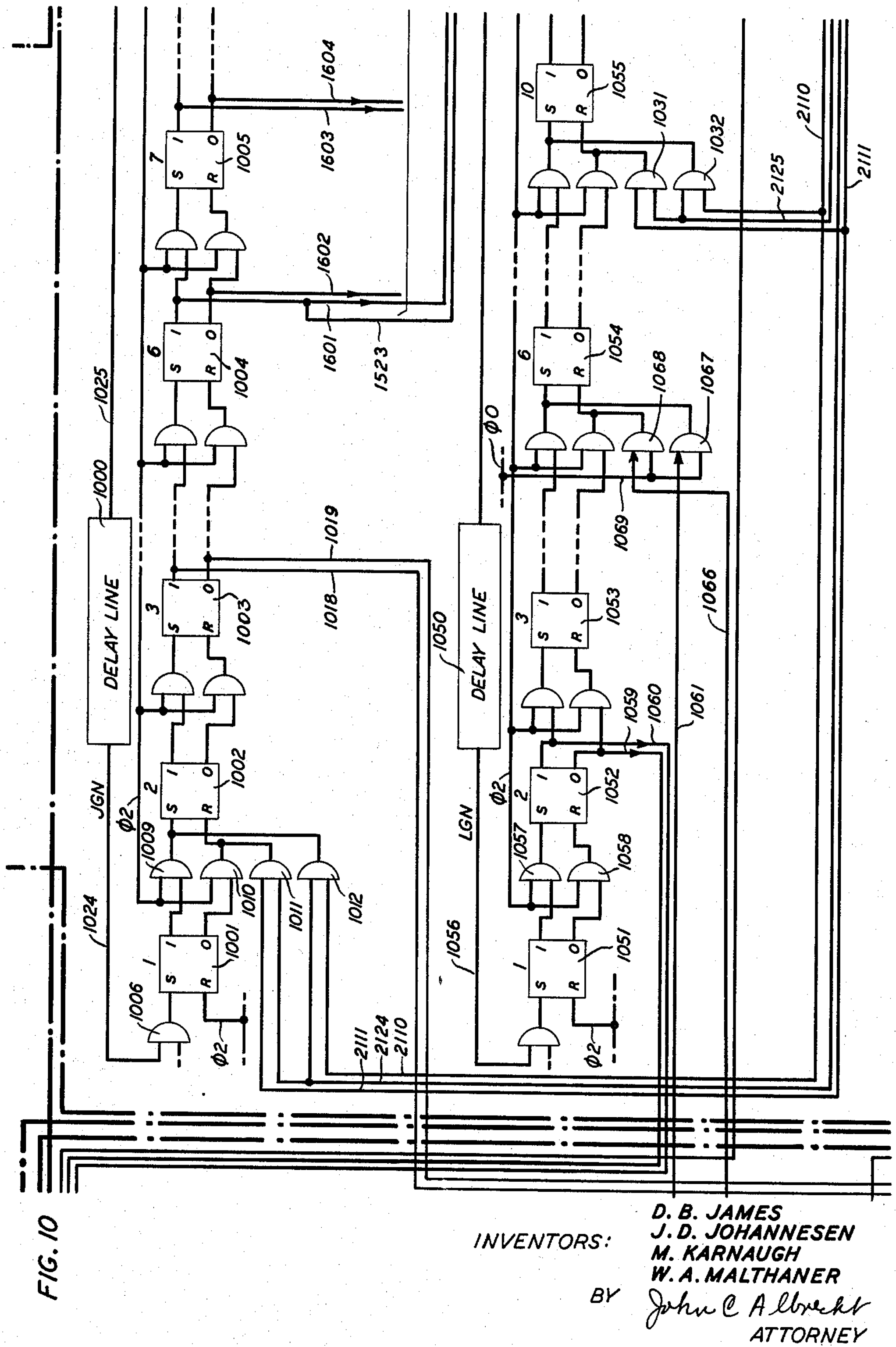

Also, in Fig. 9, there is shown the scan response gates such as 932. A Scanning Gate Number originates at a central office concentrator controller during the twenty-fourth word of the first frame and an answer is expected at the central office during the immediately succeeding second or third frame. The scan response, as seen at line 23 of the time diagram, is in the eighth bit position of the twenty-third word. AND Gate 933 is enabled during frames 2 and 3, word 23, bit 8, phase 0, and thereby the scan response is gated to the set conductor of the Scan Response Flip-Flop 813. If the scan line is in the on-hook condition, a zero will be present on the line, and Flip-Flop 813 will remain in the reset condition; however, if the scan line is in the off-hook condition, Flip-Flop 813 will be set. The Scan Response Gate Circuit 934 is associated with the second concentrator, not shown, and the Scan Response Gate Circuit 935 is associated with the trunkor of Figs. 25 through 27.

*Scan gate number generator and scanning circuits*

The Scan Gate Number Generator 1850 is common to all concentrators and trunkors served by a single central office module. The Scan Gate Number Generator serves to sequentially provide the binary codes representative of line numbers 1 through 255, inclusive. Each line is scanned for four frames during the twenty-fourth time slot of each frame; therefore, the Scan Gate Number is incremented once every four frames. The Scan Gate Number, once generated, circulates in the loop which includes the Scan Gate Number Shift Register 1851, the Output Conductor 1852, OR Gate 1853, AND Gate 1854, and Input Conductor 1855. The Serial Scan Gate Number is available to each of the concentrator and trunkor controllers via Conductor 1856. The line number 00 in which all elements of the code are zeros is systematically omitted in the repertoire of the Scan Gate Number Generator 1850.

The Add 1 Circuit 1857 serves to increment the circulating Scan Gate Number once every four frames. If a code other than the code for the number 255 is circulating in the loop, the All 1's Flip-Flop 1858 will be reset to its "0" state sometime during the twenty-third word of the fourth frame and at phase 0, bit 8 of the twenty-third word of the fourth frame, AND Gate 1859 will be enabled to set the Add 1 Flip-Flop 1860. Setting of the Add 1 Flip-Flop 1860 causes the circulating Scan Gate Number to be incremented by one count. The Scan Gate Number circulates from stage 1 to 8 and back to stage 1 with the least significant bit being the first element of the serial code. As is well known, a binary number is incremented by one count by starting with the least significant bit and changing the value of the bits so long as a change is made from a "1" to a "0" and stopping as soon as the first shift is made from "0" to "1." So long as the eighth stage 1870 of the Scan Gate Number Shift Register remains in its "1" state, the Output Conductor 1852 will be enabled and this signal and the "1" output of the Add 1 Flip-Flop 1860 are combined to enable AND Gate 1861. Enablement of AND Gate 1861 inhibits AND Gate 1867 to prevent resetting of the Add 1 Flip-Flop 1860 and inhibits enablement of AND Gate 1854. Accordingly, each time a "1" is read from the serial shift register on Conductor 1852, a "0" is inserted in the first stage of the Shift Register 1854 to replace the "1."

Upon the occurrence of a "0" on Conductor 1852, AND Gate 1861 will be disabled and via OR Gate 1853 AND Gate 1854 will be enabled upon the occurrence of the immediately succeeding phase 0 pulse on Conductor 1870. Accordingly, a change in the code is made from a "0" to a "1" and the add function is completed.

Since AND Gate 1861 is disabled upon the occurrence of a "0" in the eighth stage 1870, AND Gate 1867 will be enabled upon the occurrence of a phase 0 pulse on Conductor 1871 and the Add 1 Flip-Flop will be reset to terminate the incrementing function.

It has been assumed in the above discussion that a code other than 255 is to be incremented. In the process of incrementing the code 255, which in binary form, is all "1's," the next code in logical succession would be all "0's" representing line number 00. Line number 00 is reserved to indicate the absence of a line number in the system; therefore, this number need never be scanned. To omit the code wherein each element is in the "0" state, the All 1's Flip-Flop 1858 is employed.

At frame 4, word 22, bit 8, phase 0, AND Gate 1880 is enabled to set the All 1's Flip-Flop 1858 and during the twenty-third word period of the fourth frame, the "0" output of the serial shift register on Conductor 1882 appears as a final enabling signal to AND Gate 1881. If any element of the Scan Gate Number Code is in the "0" state, the All 1's Flip-Flop will be reset during the twenty-third time slot and incrementing of the serial Scan Gate Number will proceed as described above; however, if each element of the Scan Gate Number is in the "1" state, the All 1's Flip-Flop will remain in the set condition for the term of the twenty-third word and the setting of the Add 1 Flip-Flop 1860 will be delayed for one bit period. In all cases, other than when the circulating number is 255, the Add 1 Flip-Flop 1860 will be energized at frame 4, word 23, bit 8, phase 0, and where the number to be incremented is 255 and each of the code elements is "1", the setting of the Add 1 Flip-Flop 1860 will be delayed for one bit period until time frame 4, word 24, bit 1, phase 0. It is at this later time that AND Gate 1883 is enabled to set Add 1 Flip-Flop 1860. Thereby, the first or least significant bit of the Scan Gate Number is permitted to recirculate and the succeeding or more significant bits are all changed from "1" to "0". The number 255 is thus changed to the number 1 rather than the number zero.

The Scan Gate Number on Conductor 1856 is transmitted to the remote concentrator control over Conductor 1890 and simultaneously to the trunkor controller over Conductor 1891.

Each trunkor serves a number of trunks which is less than the number of lines served by a concentrator. For example, a trunkor may serve as few as fifteen trunks.

The basic scanning rate wherein each line is scanned once every four frames is adequate to detect supervisory transitions on the trunks. Since the codes representative of line numbers 16 through 255 are not required in a trunkor and would be interpreted as codes in the 1 to 15 group, steps must be taken to prevent transmission of these codes to the trunkor control line. The Trunkor Scan Inhibit Flip-Flop 1830 is set whenever a number larger than 15 is circulating in the Scan Gate Number Shift Register Loop.

The Scan Gate Number circulates through the Scanning Gate Number Shift Register 1851 for four frames of twenty-four time slots or a total of ninety-six times before it is incremented. The Scan Gate Number is always transmitted to the control line during the twenty-fourth word of the first frame. The OR Gate 1832 and the AND Gate 1833 serve to detect whether the circulating number is greater or less than the binary value 15. In bit 4 time of the twenty-third word of the first frame, the four most significant bits of the circulating Scan Gate Number reside in the stages 4, 5, 6, and 7 of the Scan Gate Number Shift Register 1851. If any one of the four most significant bits, namely, the bits having the binary values of 128, 64, 32, and 16, is in the "1" state, the OR Gate 1832 will be enabled. AND Gate 1833 is sampled at phase 0, bit 4, word 23 of the first frame, and if Gate 1832 has been enabled in accordance with the preceding discussion, the Trunkor Scan Inhibit Flip-Flop 1830 will be set to the "1" state. As will be seen with respect to the description of the arrangements of Fig. 8, setting of Flip-Flop 1830 inhibits transmission of Scan Gate Numbers 16 through 255 to the trunkor control line. The Trunkor Scan Inhibit Flip-Flop 1830 is reset upon the occurrence of the first phase 0 pulse of the twenty-fourth word of the fourth frame.

During the first twenty-three time slots of each frame, Line Gate Numbers, either the number of the line being served in the time slot or the Line Gate Number 00 representative of the fact that the time slot is idle, are transmitted from the central office to the remote concentrator and during the twenty-fourth time slot, the Scan Gate Number of the line to be scanned is similarly transmitted to the remote concentrator.

Line Gate Numbers circulate in the memory loop which includes the delay line 1050, the shift register stages 1051 through 1055 and 1351 through 1354. The first or least significant bit of a Line Gate Number is set into the eleventh stage 1351 of the Line Gate Number Shift Register at time $8_2$ of each time slot. At time $1_0$ of each word, the state of the eleventh stage 1351 is sampled and its state is transmitted over the control line to the remote concentrator. The Line Gate Number Output AND Gate 803 is enabled for all times other than the twenty-fourth word of the first frame. The state of the eleventh stage is thereby extended from Conductor 1356 through Gate 803, OR Gate 801, and Conductor 714 to the Control Output AND Gate 702. The AND Gate 702 is enabled at phase 0 time of each bit and serves to phase the signals transmitted over the control line to the remote concentrator.

During the twenty-fourth word of the first frame, AND Gate 804 is enabled. This inhibits the Line Gate Number Output Gate 803 and enables the Scan Gate Number Output Gate 802. The first or least significant bit of the Scan Gate Number is set into the eighth stage 1870 of the Scan Gate Number Shift Register at time $8_2$ of every word. Accordingly, the state of the eighth stage 1870 is available at time $1_0$ of each word period at Conductor 1856, which is one of the inputs to the Scan Gate Number Output Gate 802. The first bit of the Scan Gate Number reaches the input of Gate 802 at the same instant that the first bit of the Line Gate Number reaches the input of Gate 803. During the twenty-fourth word of the first frame, the Scan Gate Number is gated through AND Gate 802, OR Gate 801, and in proper phase is passed through the Control Output Gate 702.

The Trunkor Scan Inhibit Conductor 828 is connected to the "1" conductor of the Trunkor Scan Inhibit Flip-Flop 1830 only in the case of turnkor controllers. As previously described, the Trunkor Scan Inhibit Flip-Flop 1830 is set to its "1" state whenever the Scan Gate Number exceeds the binary value 15. In the case of the trunkor controller, there is a connection between the "1" Output Conductor 1892 of the Time Slot Inhibit Flip-Flop 1830 and the time slot inhibit conductor such as 828. Although Conductor 828 is shown in the subject concentrator controller, there is no connection between it and the time slot inhibit flip-flop and it is shown only to portray the arrangement which would exist in trunkor controllers. The following description is given with respect to elements of the concentrator controller; however, this description is only by way of explanation and would apply only to the trunkor controller. Setting of Flip-Flop 1830, indicating a Scan Gate Number larger than the binary value 15, energizes Conductor 828 which inhibits the Scan Gate Number Control Gate 804. Similarly, AND Gates 814, 815, and 820 are inhibited by the setting of Flip-Flop 1830 to prevent false responses during a matching process which is fully discussed later.

*Detection of supervisory line transitions*

A line which is scanned may have previously been idle or busy and when it is scanned, it may be found either in the on-hook or off-hook condition. If a line was idle just preceding the time it was scanned, its Line Gate Number will not be included in the numbers circulating in the Line Gate Number Memory Loop comprising the delay line 1050 and the associated fourteen stage shift registers. However, if the line was served in one of the first twenty-three time slots, its number will be circulating in the Line Gate Number Memory Loop. When a line is scanned and found to be in the on-hook state it may be that the line has been idle for some considerable period of time or possibly a subscriber has just now disconnected. Similarly, if a line is found to be in the off-hook state, it may be that the line has been busy for a considerable period of time or that a subscriber is initiating a request for service. Therefore, in order to determine the appropriate action to be taken with regard to a particular scanner response, the prior state of the scanned line must be known and combined with the current state. Partial information as to the prior state is indicated by noting whether or not the Line Gate Number of the scanned line is circulating in the Line Gate Number Memory Loop.

As explained with respect to the operation of the concentrator of Figs. 4, 5, and 6 and the timing diagram of Figs. 29 through 32, although the Scan Gate Number is transmitted from the central office concentrator controller to the remote concentrator during the twenty-fourth time slot of frame 1, the scanner response reaches the central office as the eighth bit of the twenty-third word of a succeeding frame. In each time slot, the Scan Gate Number circulating in the Scan Gate Number Shift Register 1851 is compared with the Line Gate Number which will be transmitted to the remote concentrator in the immediately succeeding time slot. For example, in Time Slot 20, the Scan Gate Number circulating through Shift Register 1851 will be compared with the Line Gate Number which will be transmitted in word 21, and similarly during the twenty-first time slot, the Scan Gate Number will be compared with the Line Gate Number which will be transmitted in the twenty-second time slot. The serial comparison of the number circulating in the Scan Gate Number Shift Register and in the Line Gate Number Memory Loop is made in the mismatch circuit comprising AND Gates 810 and 811 and OR Gate 809. The occurrence of the bit 7 phase 2 pulse in each time slot enables AND Gate 808 to reset the Mismatch Flip-Flop 807. If, in the succeeding time slot, a mismatch between the Scan Gate Number and the Line Gate Number with which the Scan Gate Number is being compared occurs, either Gate 810 or 811 will be energized to set Flip-Flop 807.

The first or least significant bit of the Scan Gate Number is set into the seventh stage of the Scan Gate Number Shift Register 1851 at time $W_{7_2}$, and, at this same instant, the first bit of the Line Gate Number for the immediately succeeding time slot is set into the second stage 1052 of the Line Gate Number Memory Shift Register. Thereafter, as the Scan Gate Number proceeds in the Scan Gate Number Memory Loop and as the Line Gate Number proceeds through the Line Gate Number Memory Loop, the successive bits of the Scan Gate Number and of the Line Gate Number will appear at the output conductors of the seventh stage of the Scan Gate Number Shift Register and the output conductors of the second stage of the Line Gate Number Shift Register, respectively. The One Output Conductor 1835 of the seventh stage of Shift Register 1851 is one of the inputs to AND Gate 810, and the Zero Output Conductor 1059 from the second stage of the Line Gate Number Shift Register is the other input to AND Gate 810. Similarly, the Zero Output Conductor 1836 of the seventh stage of the Scan Gate Number Shift Register and the One Output Conductor 1060 of the second stage of the Line Gate Number Shift Register provide the input to AND Gate 811. If a mismatch occurs between the Scan Gate Number being circulated in the Scan Gate Number Shift Register 1851 and the Line Gate Number for the immediately succeeding time slot, either AND Gate 810 or AND Gate 811 will be energized to set the Mismatch Flip-Flop 807. Setting of the mismatch flip-flop indicates that the line number being scanned is not in the memory in the time slot under consideration. However, if the mismatch flip-flop is unset at bit 7, phase 0 time, the Match Flip-Flop 805 will then be set to indicate that the line being scanned is in the memory.

As previously described, Scanner Response Flip-Flop 813 is reset during frame 1 of each scanning cycle, and during the immediately succeeding second or third frames, the scanner response is received from the remote concentrator. If the scanned line is in the on-hook condition, the scanner response flip-flop will remain in the reset condition; however, if the line is in the off-hook state when scanned, Flip-Flop 813 will be set to the "1" state.

The Line Gate Number of a subscriber being served circulates in the Line Gate Number Memory Loop. Therefore, the number scanned may or may not be in the circulating Line Gate Number Memory, and the line scanned may either be in the off-hook or in the on-hook state. Four situations are possible with these two variables which can each assume one of two states. The four situations which may occur are namely:

(1) Scanner number not in memory, scanned line in the on-hook condition (S'M'). (This is an idle line not requesting service.)

(2) Scanned number not in memory, scanned line in the off-hook condition (SM'). (This is probably a request for service.)

(3) Scanned number in memory, scanned line in the off-hook condition (SM). (This is a served line continuing its demand for service.)

(4) Scanned number in memory, scanned line in the on-hook condition (S'M). (This is probably a disconnect signal or a supervisory flash.)

Only three of the above four possible combinations are of particular interest since in the first condition, namely the situation wherein an idle line remains idle, the system need not take any positive action. The state of the scanned line is indicated by the state of the Scanner Response Flip-Flop 813 and whether the scanned number is or is not in the memory is indicated by the state of the Match Flip-Flop 805. The last bit of the circulating Scan Gate Number is shifted into the seventh stage of the Shift Register 1851 at time $7_2$; therefore, the matching function to detect whether or not the line number is in the memory is completed at this time.

The three Flip-Flops 816, 817, and 818 are selectively energized in accordance with the state of the line and whether or not the scanned number is in the memory. The S'M Flip-Flop 816 indicates that the line is in the on-hook state and that the scanned number is in the memory. The SM Flip-Flop 817, when energized, indicates that the line is off-hook and that the scanned number is in the memory, and the SM' Flip-Flop 818, when in the set condition, indicates that the line is off-hook and the scanned number is not in the memory.

The enablement of AND Gate 814 serves to set the S'M Flip-Flop 816. The input conductors to Gate 814 comprise the phase 0 Conductor 850, the zero output conductor of the Scan Response Flip-Flop 813, the "1" Output Conductor 827 of the Flip-Flop 805, and the Matched Conductor 826. Whenever a mismatch occurs between the Scan Gate Number and the Line Gate Number obtained from the Line Gate Number Shift Register, the Mismatch Flip-Flop 807 is set to its "1" state which inhibits the AND Gate 851. However, if the Scan Gate Number and the Line Gate Number with which it is being compared match, the mismatch flip-flop will remain in the reset state and Gate 851 will be enabled for the bit 7 period of the time slot in which the match occurs during the first and fourth frames. Enablement of AND Gate 851 sets the Memory Flip-Flop 805 and energizes the Matched Conductor 826. The S'M Flip-Flop 816 is set to its "1" state at phase 2 of bit 7 of the time slot in which the match is found.

Similarly, AND Gate 815 is enabled at phase 2, bit 7 time if the scanned line is off-hook and the Scan Gate Number is in the memory.

If the scanned line is off-hook and the line is not in the memory, a request for service is indicated. Under these conditions, an idle time slot must be found and the Scan Gate Number of the line requesting service must be written in the seized time slot in the Line Gate Number Memory. An idle time slot, as will be explained later, is detected by examination of the Call Progress Words circulating in the Call Progress Word Memory. The Idle Time Slot Conductor 1121 is energized whenever an idle time slot is indicated.

AND Gate 820 is enabled during frame 4 of the scanning cycle if the line is off-hook, the scanned number is not in the memory, and the time slot is idle, thereby setting Flip-Flop 819. When set, Flip-Flop 819 enables the Insert AND Gates 822 and 836 to connect the One and Zero Output Conductors 831 and 832, respectively, of the third stage of the Scan Gate Number Shift Register 1851 through Conductors 1061 and 1066 to the Input Gates 1067 and 1068 of the sixth stage 1054 of the Line Gate Number Shift Register.

*Circulating memories*

The Line Gate Number Memory Loop comprises the delay line 1050 and the fourteen bit shift register represented by the shift register stages 1051 through 1055 and 1351 through 1354. As in other shift register and memory devices within the system, information is inserted into the register at phase 0 time and information is advanced in the register by phase 2 pulses.

Serial information is taken from the Line Gate Number Shift Register at three stages. The first output at the second shift register stage 1052 is connected via Conductors 1059 and 1060 to the Mismatch AND Gates 810 and 811.

At the second output point, serial information is taken on a one rail basis from the eleventh stage via Conductor 1356. The first or least significant bit of the Line Gate Number is transferred to the eleventh stage 1351 at time $8_2$ and therefore is available at the Stage Output Conductor 1356 at time $1_0$. Conductor 1356 is connected to the control line to the remote concentrator via AND Gate 803, OR Gate 801, Conductor 714, and AND Gate 702.

Two stages later, at the output of the thirteenth stage 1353, information is again taken on a one rail basis via Conductor 1358. As will be discussed later, information on Conductor 1358 is available to the receive portion of the manual control.

A new Line Gate Number may be inserted at the input of the tenth stage 1055 of the Line Gate Number Shift Register. Information is brought in on a two rail basis via Conductors 2111 and 2110 and AND Gates 1031 and 1032, respectively. AND Gates 1031 and 1032 are energized under control of the Insert Line Word Conductor 2125.

Whenever a request for service is detected, the number of the scanned line requesting service is inserted in the Line Gate Number Memory Loop via the Input Gates 1067 and 1068 which lead to the sixth stage 1054 of the Line Gate Number Shift Register. The least significant bit of the Scan Gate Number is set into the third stage of the Scan Gate Number Shift Register at time $3_2$, and similarly at time $3_2$ the least significant bit of the Line Gate Number circulating in the memory is shifted into the sixth stage 1054 of the Line Gate Number Shift Register. At time $4_0$, immediately succeeding the instant at which the least significant bit of the Scan Gate Number was set into the third stage of the Scan Gate Number Shift Register, the state of the third stage of the Register 1851 is inserted via AND Gates 1067 and 1068 into the sixth stage 1054. It should be noted that the enablement for AND Gates 1067 and 1068 is by phase 0 pulse on Conductor 1069.

It is often necessary to erase the Line Gate Number circulating in the memory for a particular time slot. For example, if a suspected request for service is detected by an indication that a scanned number is not in the memory and the line scanned is found in the off-hook condition and on the immediately succeeding scan it is found that the scanned number is in the memory but that the scanned line is in the on-hook state, the memory should be cleared of the scanned number as this was obviously a false request for service. Line Gate Numbers are erased through enablement of AND Gate 1359, whose output is connected to the reset conductor of the eleventh stage 1351 of the Line Gate Number Shift Register. The first bit of a Line Gate Number is shifted into the eleventh stage at time $8_2$ and at the same time, the Erase Conductor 1355 is energized and is maintained energized for one whole word period. So long as AND Gate 1359 is enabled, the eleventh stage 1351 will be reset upon the occurrence of each phase 0 pulse. Accordingly, regardless of the number in the memory, for the word period during which AND Gate 1359 is enabled, the binary code 00000000 will be inserted.

The Junctor Gate Number Circulating Memory comprises the shift register having the fourteen stages represented by 1001 through 1005 and 1301 through 1306 and the delay line 1000. Junctor Gate Numbers are represented by five bit binary codes. The total loop delay in the Junctor Gate Number Memory is maintained at twenty-four eight bit words as are the Line Gate Number Memory and the Call Progress Word Memory. The remaining three bits in each Junctor Gate Number Word Period may be employed to enlarge upon the Junctor Gate Number, or alternatively other information may be sandwiched between Junctor Gate Numbers. For example, if it is desirable to provide parity checking the three parity bits necessary for the three circulating words, namely, Line Gate Number, Junctor Gate Number, and Call Progress Word could be readily sandwiched between Junctor Gate Numbers.

As explained with respect to Fig. 16, the five bit Junctor Gate Number is employed on a parallel basis for operating junctor crosspoints; therefore, the Junctor Gate Number is made available on a parallel basis at the output of stages 1004, 1005, stage 8 (not shown), and stages 1301 and 1302.

The same information is available on a serial basis to the manual control from the output of the sixth stage 1004 of the Junctor Gate Number Shift Register, connection being via Conductor 1523.

New Junctor Gate Numbers are serially inserted under manual control at the input to the second stage 1002 of the Junctor Gate Number Shift Register. Information is inserted on a two rail basis via Conductors 2111 and 2110, which, as previously discussed, are also used in inserting new Line Gate Numbers into the Line Gate Number Memory Loop. Conductors 2111 and 2110 are connected to the set and reset terminals of the second stage 1002 via AND Gates 1012 and 1011, respectively. Gates 1011 and 1012 are energized under control of the Insert Junctor Word Conductor 2124.

The Call Progress Word Memory Loop comprises the delay line 1100 and the fourteen stage shift register represented by stages 1101 through 1106 and 1401 through 1405. The Call Progress Word is a code representative of the current progress of a telephone call. Call Progress Words are generally employed on a parallel basis and new Call Progress Words are similarly inserted in the circulating memory on a parallel basis. The Call Progress Word is an eight bit binary word and it is arranged so that the first bit of the Call Progress Word Code is set into the tenth stage 1403 at time $7_2$, which marks the end of the seventh bit period. During the immediately succeeding bit 8 period, the eight bit code which resides instages 3 through 10 of the Call Progress Word Shift Register is employed in the Call Progress Word Decoder-Coder. This eight bit code is combined in the arrangements of Figs. 33, 34, and 35 with other elements of information regarding the call to provide a new Call Progress Word. The combining translation is completed before the occurrence of pulse $8_0$; therefore, a new Call Progress Word may be inserted in stages 3 through 10 of the shift register during bit $8_0$ time. At time $8_2$, the entire new word is advanced one stage so that the first bit is shifted into the eleventh stage, not shown in Fig. 14, at time $8_2$. This corresponds to the time at which the first bit of the Line Gate Number and the first bit of the Junctor Gate Number are shifted into the eleventh stages of their respective shift registers.

A new Call Progress Word may be inserted on a serial basis at the second stage 1102 via AND Gates 1107 and 1108. These AND gates are enabled under control of the Insert Progress Word Conductor 2123. The Call Progress Word is made available to the call Progress Word Decoder-Coder 1157 via the eight Conductors 1111 through 1114, and 1411 through 1414. The operation of the decoder-coder can best be understood by reference to Figs. 33 and 34 wherein the details are shown.

In addition to the Call Progress Word, there are several other input conductors to the Decoder-Coder 1157. The following is a table of the other input conductors along with their significance.

| Conductor | Symbolic Label | Description |
|---|---|---|
| 1161 | SM | Scanned line off-hook; Scanned number in memory. |
| 1162 | S'M | Scanned line on-hook; Scanned number in memory. |
| 1163 | SM' | Scanned line off-hook; Scanned number not in memory. |
| 1234 | D' | Dispatching circuit busy. |
| 1570 | ACK | Acknowledge. |
| 3503 | TSS | Time slot selected. |

In addition to the generation of new Call Progress Words, the Decoder-Coder 1157 provides output signals to enable a plurality of memory cells which are employed in the accomplishment of various work operations in the system.

The following is a table of the various memory cells and their functions:

| Memory Cell | Symbolic Label | Function |
|---|---|---|
| 1151 | GBT | Gate busy tone. |
| 1152 | GR | Gate ringing. |
| 1153 | TK | Talk. |
| 1154 | GZL | Gate zero level. |
| 1452 | EGN | Erase gate number. |
| 1455 | SA | Service alert. |

As discussed with respect to the insertion of a Scan Gate Number in the Line Gate Memory during an idle time slot, it was indicated that the Idle Time Slot Conductor 1121 is energized each time an idle time slot occurs in the memory. Further, it has been priorly shown that a new Line Gate Number is inserted at the sixth stage 1054 of the Line Gate Number Shift Register via AND Gates 1067 and 1068. The new address is gated through 1067 and 1068 at phase 0 time and the first or least significant bit of the Scan Gate Number is shifted into 1054 at time $4_0$. Accordingly, the first bit of the code representative of the idle time slot is shifted into the sixth stage 1106 at time $3_2$ and changed at time $4_0$.

An idle time slot is detected by examining the Zero Output Conductor 1440 of the second stage 1102 of the CPW shift register period starting with bit 8 and terminating with bit 2. As is the case in all three memory loops, the first bit of a circulating word reaches stage 11 of the memory shift register at time $8_2$ and being an eight bit word, it similarly reaches stage 2 at time $7_2$ of the preceding word period. The termination of the $7_2$ pulse indicates the completion of the bit 7 period and start of the bit 8 period. Therefore, by examining the output of the second stage 1102 during the bit 8 period and the following bit 1 and bit 2 periods, the first three bits of the Call Progress Word may be serially examined. An idle time slot is indicated when the first three bits of the Call Progress Word are all in the "1" state. At time $7_2$, the No-Match Flip-Flop 1441 is reset by the enabling of AND gate 1442. Immediately thereafter, the zero output terminal of the second stage 1102 of the Call Progress Word Shift Register is connected via Conductor 1440 to the AND Gate 1444. For bit periods 8, 1, and 2, OR Gate 1443 is enabled and its output in turn enables AND Gate 1444 for these same periods. If, during the time interval starting with bit 8 and terminating with bit 2, namely, the interval during which the first three bits of the Call Progress Word Shift Register sequentially rest in the second stage 1102 of the Call Progress Word Shift Register, the second stage is reset to the "0" state, indicating other than an idle time slot condition, the Zero Output Conductor 1440 will be energized. This will, in turn, enable AND Gate 1444 and AND Gate 1445 to set the No-Match Flip-Flop 1441. During the bit 3 period, immediately succeeding the period of examination, the Zero Output Conductor 1446 of the No-Match Flip-Flop 1441 is gated through 1447 to the Idle Time Slot Flip-Flop Input AND Gate 1448. If an idle time slot is found, the no-match flip-flop will remain in the "0" state and at time $3_0$, the Idle Time Slot Flip-Flop 1449 will be set to its "1" state to enable the Idle Time Slot Conductor 1121. However, if a zero is encountered in the first three bits of the Call Progress Word, the no-match flip-flop will have been set to its "1" state during the inspection period and the idle time slot flip-flop will not be set during the following bit 3 period.

*Call progress word circuits*

Figure 14:
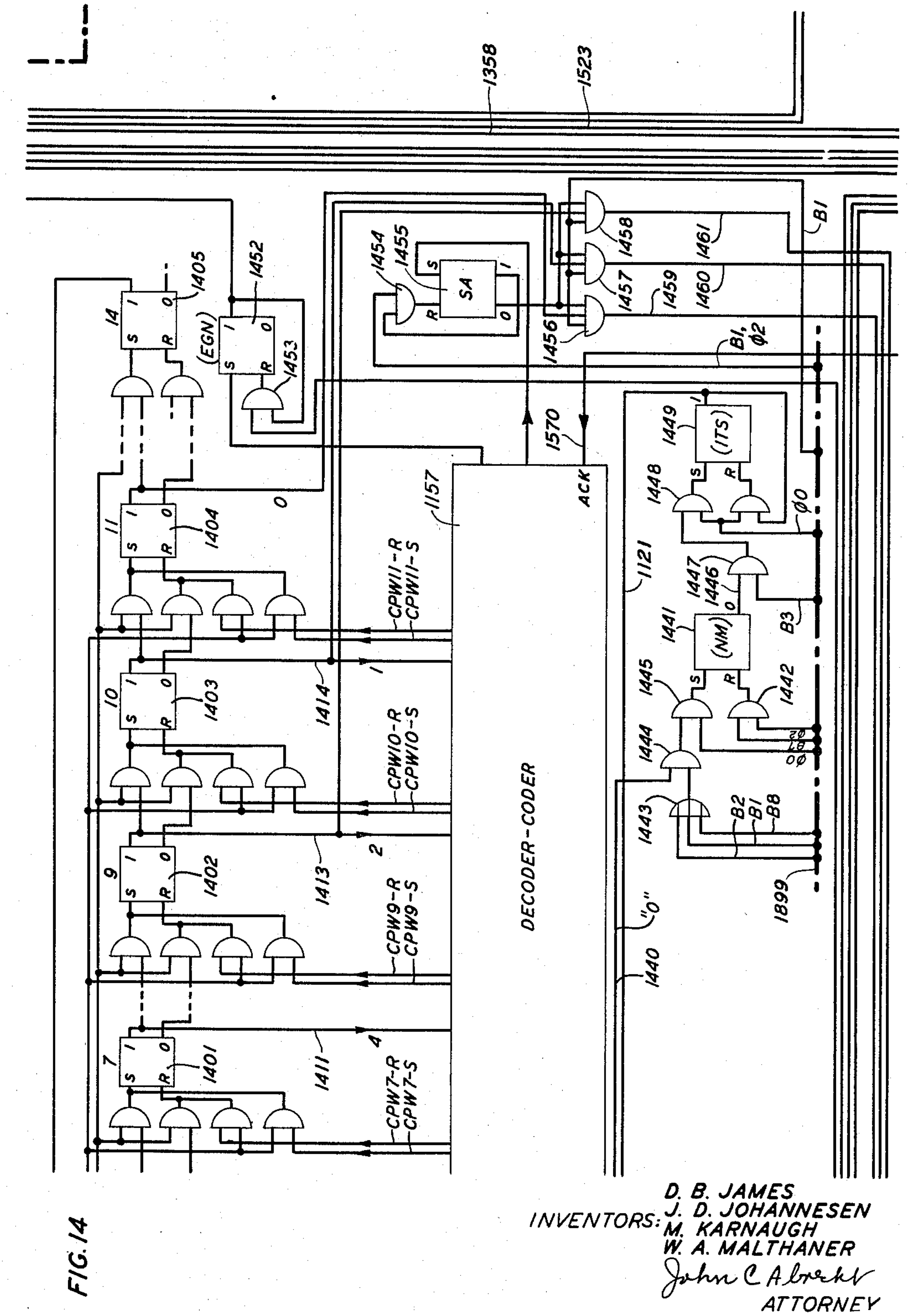
Figure 15:
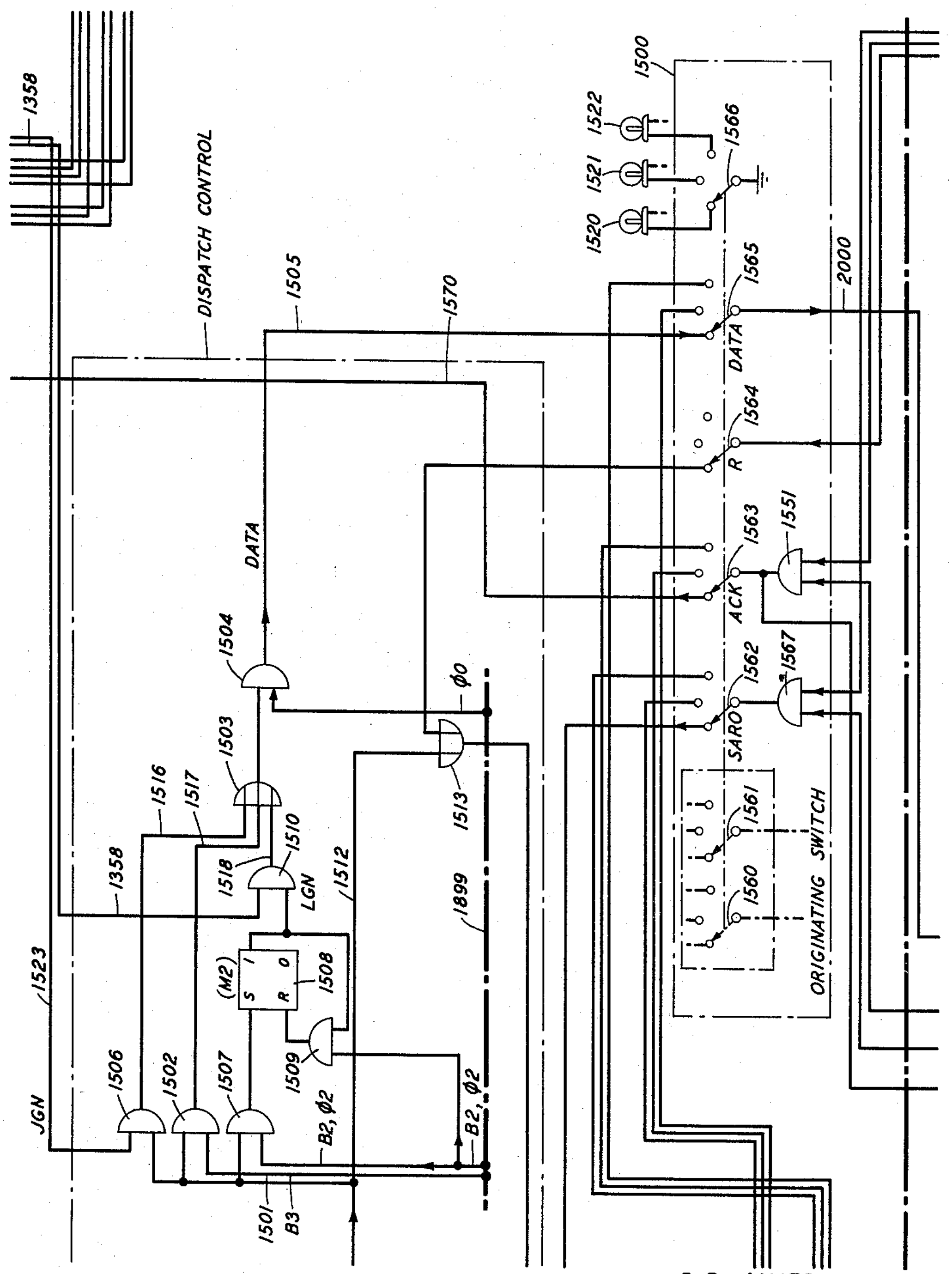

As discussed with regard to Figs. 11 and 14, the Call Progress Word Decoder-Coder 1151 is a combining type translator. Discrete Call Progress Words are employed to indicate the progress of a call through the subject switching system. These Call Progress Words are represented by eight bit binary codes which circulate in the Call Progress Word Memory Loop in step with the Line Gate Number and Junctor Gate Number Words. Fig. 36 is a Call Progress Word State diagram for the subject concentrator controller. Each of the rectangular boxes represents a Call Progress State and is labeled with a Call Progress State Number, a short description of that state, and an eight bit binary code representative of the state. The binary code is written so that for descriptive purposes the first bit of the binary word is the one at the right and progresses toward the last bit from right to left.

Changes from one Call Progress Word State to another are effected by combining the knowledge that a call is in a current state with new knowledge regarding the call either automatically within the concentrator controller or after action by the office control module. In Fig. 36 lines are shown interconnecting certain of the Call Progress State Blocks. These lines have arrows showing the direction of transition and certain of these lines have circles with numbers interposed between boxes. In each instance, the number in the circle is prefaced with "T" which indicates an automatic transition signal. Further, on each of these lines, there is a legend which is near the originating box. The method of reading the state diagram can best be understood by way of example. Let us assume that a time slot was in the $C_1$ state, that is, in the normal on-hook or idle condition, and on a subsequent scan it was found that a subscriber's line was in the off-hook condition but not in the memory. In Fig. 36 the box labeled "$C_1$, normal on-hook, 00000111," is connected to the $C_2$ state box by a line having a circle labeled "$T_1$" and a mark "SM′" on the line near the $C_1$ box. This symbolic representation indicates that if a time slot was priorly in the $C_1$ state, and on a subsequent scan a line was found to be in the off-hook state, but not in the memory as indicated by the note SM′, a $T_1$ signal would result at the idle time slot time. The $T_1$ transition signal is effective to establish the $C_2$ or suspect-request-for-service state in the Call Progress Word Circulating Memory as the scanned line is assigned to the time slot. Where state blocks are connected by a line carrying a diamond shaped symbol, an office control action is indicated. In the exemplary system, office control actions are effected by an operator.

Figure 35:
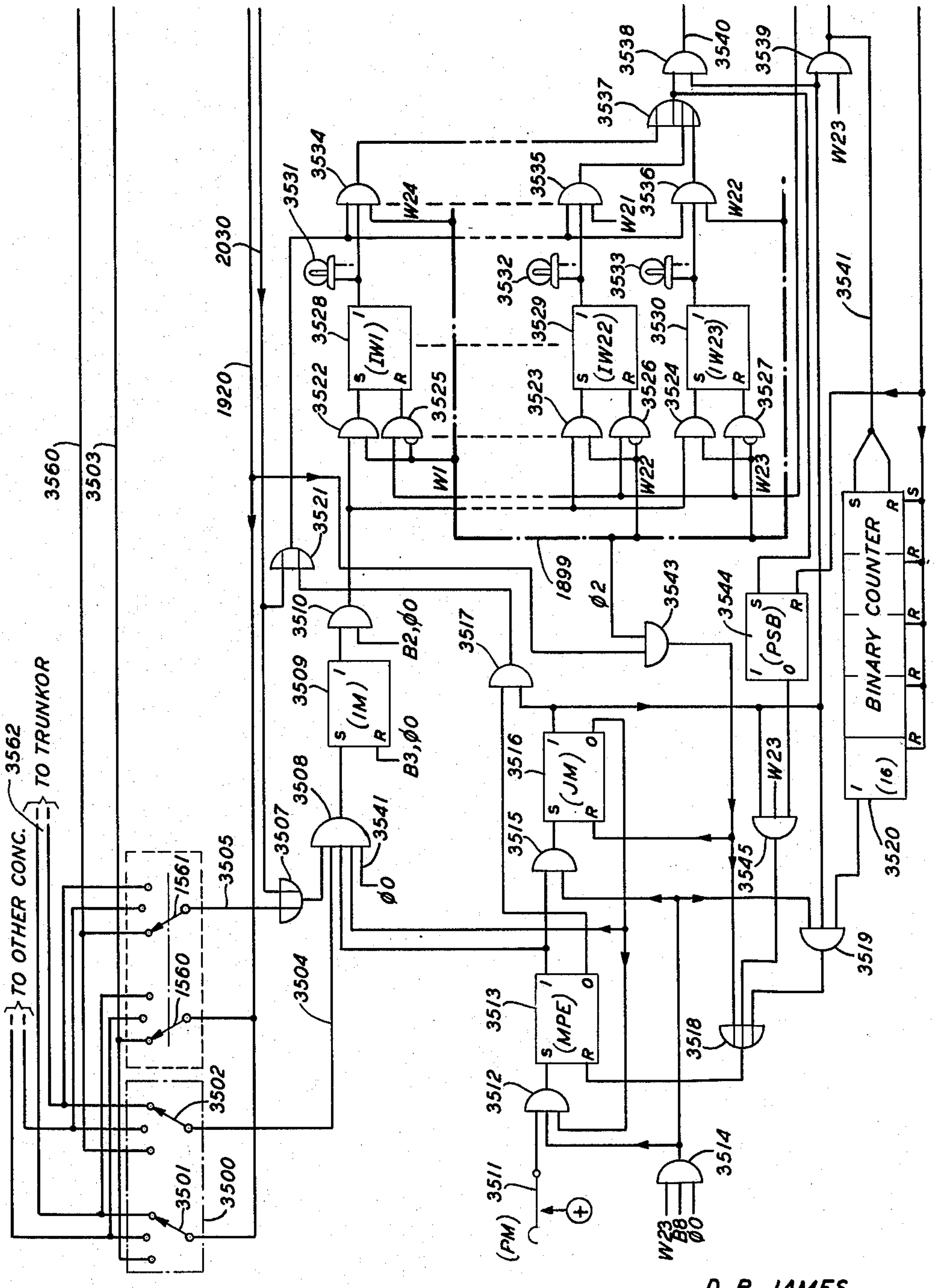

The details of the Call Progress Word Decoder-Coder and connections to the remainder of the concentrator central office controller are shown in Figs. 33 through 35. The fourteen stage shift register of Figs. 11 and 14 is represented by the stages 1 through 11 and 14 of Fig. 33. Figs. 33 and 34 have been simplified and thereby made more readable by the employment of an airline type schematic diagram.

At time $7_2$, the first bit of a Call Progress Word is shifted into the tenth stage of the Call Progress Word Shift Register; therefore, for the entire bit 8 period starting with the termination of the $7_2$ pulse, and ending with the termination of the $8_2$ pulse, the eight bit Call Progress Word will reside in stages 3 through 10 inclusive of the CPW shift register. The Call Progress Word is coded in a three-out-of-eight code to represent the Call Progress Word States. Internal to the combining translator are conductors individual to the various Call Progress States, and these conductors are energized whenever a call is found to be in that state.

The Call Progress Words are read in parallel from stages 3 through 10 of the shift register during the bit 8 period. During this bit period, one of the conductors labeled "$C_1$" through "$C_{10}$", "$C_{16}$", "$C_{17}$", "$C_{19}$", "$C_{23}$", "$C_{24}$", and "$C_{26}$" will be energized. Each of the shift register stage output conductors is labeled with a number representative of the Call Progress Word Bit which is being read from that stage during the bit 8 period. For example, the one output conductor from stage 10 is labeled "1" and the one output conductor from stage 9 is labeled "2." Similarly, the one output conductors from stages 8 through 3 in declining order are labeled "3" through "8", respectively. The one output conductor of stage 11 is marked "0" and this indicates that the first bit will not be in stage 11 until the immediately succeeding bit 1 time. The operation of the three-out-of-eight translator can be understood with reference to an example in Figs. 33 and 34 wherein it is seen that AND Gate 3325, whose output is labeled "$C_{17}$", is enabled by the simultaneous energization of Conductors 1, 2, 7, and bit 8. This indicates that $C_{17}$ is represented by the binary code wherein the first, the second, and the seventh bits are in the one state. This is verified with reference to Fig. 36 wherein it is seen that the binary code representative of state $C_{17}$, hang-up verified, is represented by the binary code 11000010. Reading from right to left therein, 1's are in the first, second, and seventh bit places.

The second cable 3351 in Fig. 33 has several inputs apart from the state codes which result from the above-described translation. These additional input conductors to the second cable are namely the Busy Conductor 1234 which indicates that the dispatch control circuit is not presently free; the SM, S′M, and SM′ conductors which indicate the various possible combinations of line scanner and number-in-memory conditions, the Acknowledge Conductor ACK which, as will be described later, is a signal from the manual office module control, the bit 1 conductor which is energized for the entire bit 1 period, the bit 8 conductor, and the time slot selected conductor.

In accordance with the state diagram of Fig. 36, the various state conductors are combined in AND gates 3370 through 3388 with the just-enumerated external connections to provide the transition signals $T_1$ through $T_4$, $T_6$ through $T_{13}$, $T_{15}$, $T_{22}$, $T_{23}$, $T_{27}$, $T_{33}$, $T_{34}$, $T_{35}$, and $T_{36}$. Energization of the transition conductors in turn selectively enables via Cable 3353 the various OR Gates 3301 through 3316 to selectively set and reset Call Progress Word Shift Register stages 3 through 10 in accordance with the desired new Call Progress Word.

There are six memory cells, namely, GR (gate ringing tone), TK (talk), GZL (gate zero level), GBT (gate busy tone), SA (service alert), and EGN (erase gate number). The first four memory cells are selectively set in accordance with the input Call Progress Word State in the CPW decoder-coder at bit 8 time, while the latter two will be set in accordance with transition signals as shown in Fig. 34. The Memory Cells 3402 through 3405 are all reset at bit 7, phase 2 time of each word. It should be noted that only one of these memory cells is in the "1" state at any given time, and that during each time slot, exactly one of the four will be operated. If a time slot is in the idle condition, the GZL Memory Cell 3405 will be operated; if a line is in the talk position, the TK Cell 3404 will be operated;

if ringing is in progress, the GR Memory Cell 3403 will be operated; and if the called line is found to be in the busy condition, the GBT Memory Cell 3402 will be operated.

The Erase Gate Number Memory Cell 3470 provides means for erasing from the Line Gate Number Memory Loop the Line Gate Number of a subscriber who has gone off-hook to indicate a request for service, and immediately returned to the on-hook state, and for removing a subscriber's Line Gate Number from the circulating memory if the subscriber has hung up.

In the progress of a call, situations arise wherein the services of the office control module are required. In these instances, the SA Memory Cell 3451 is energized. Setting of the SA memory cell enables AND Gates 3461 through 3463 during bit 1 time to gate the first three bits of the Call Progress Word through to the office control module. These three bits are encoded to selectively provide eight distinct alerting codes.

*Trunkor circuits*

Figure 24:
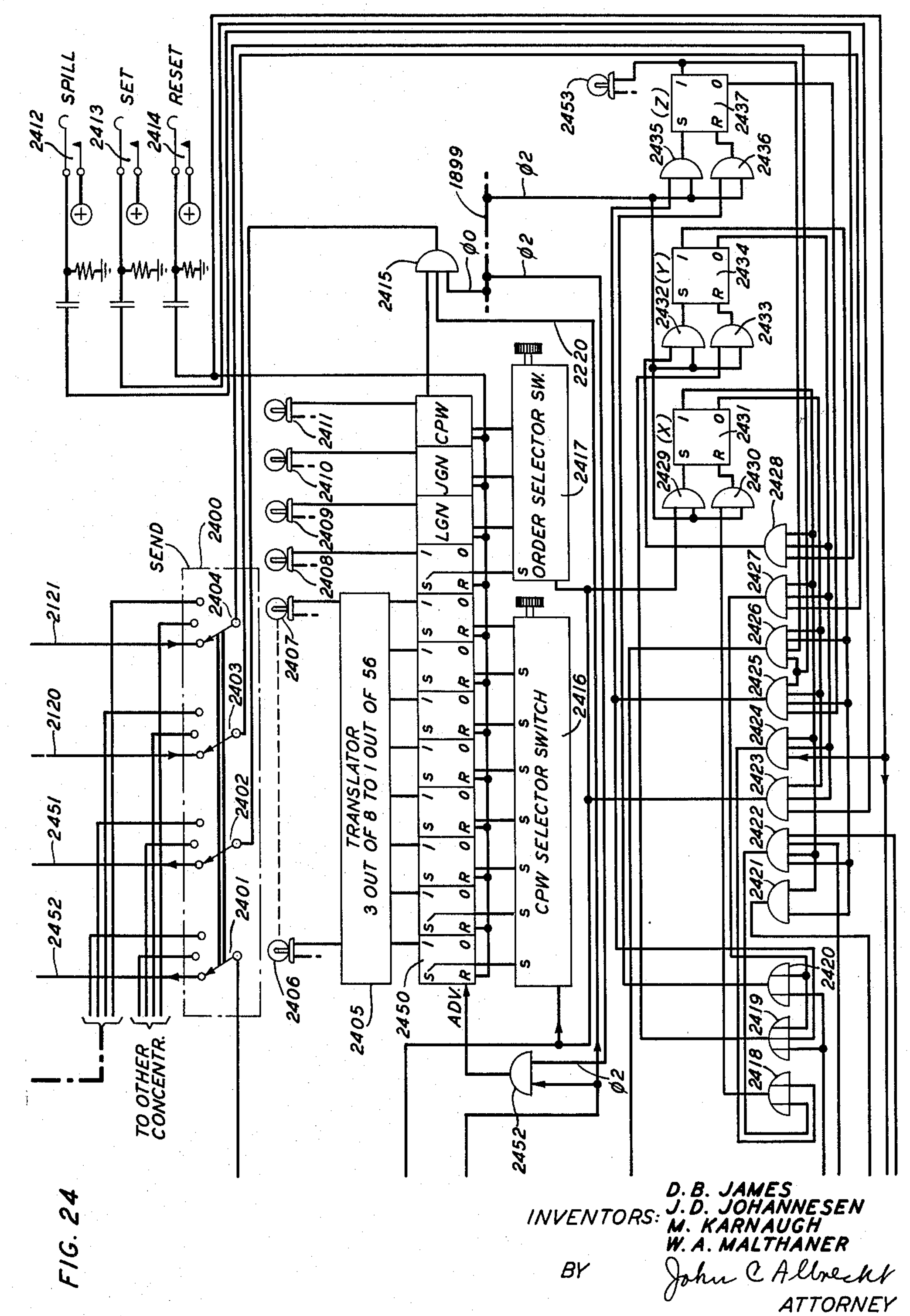
Figure 25:
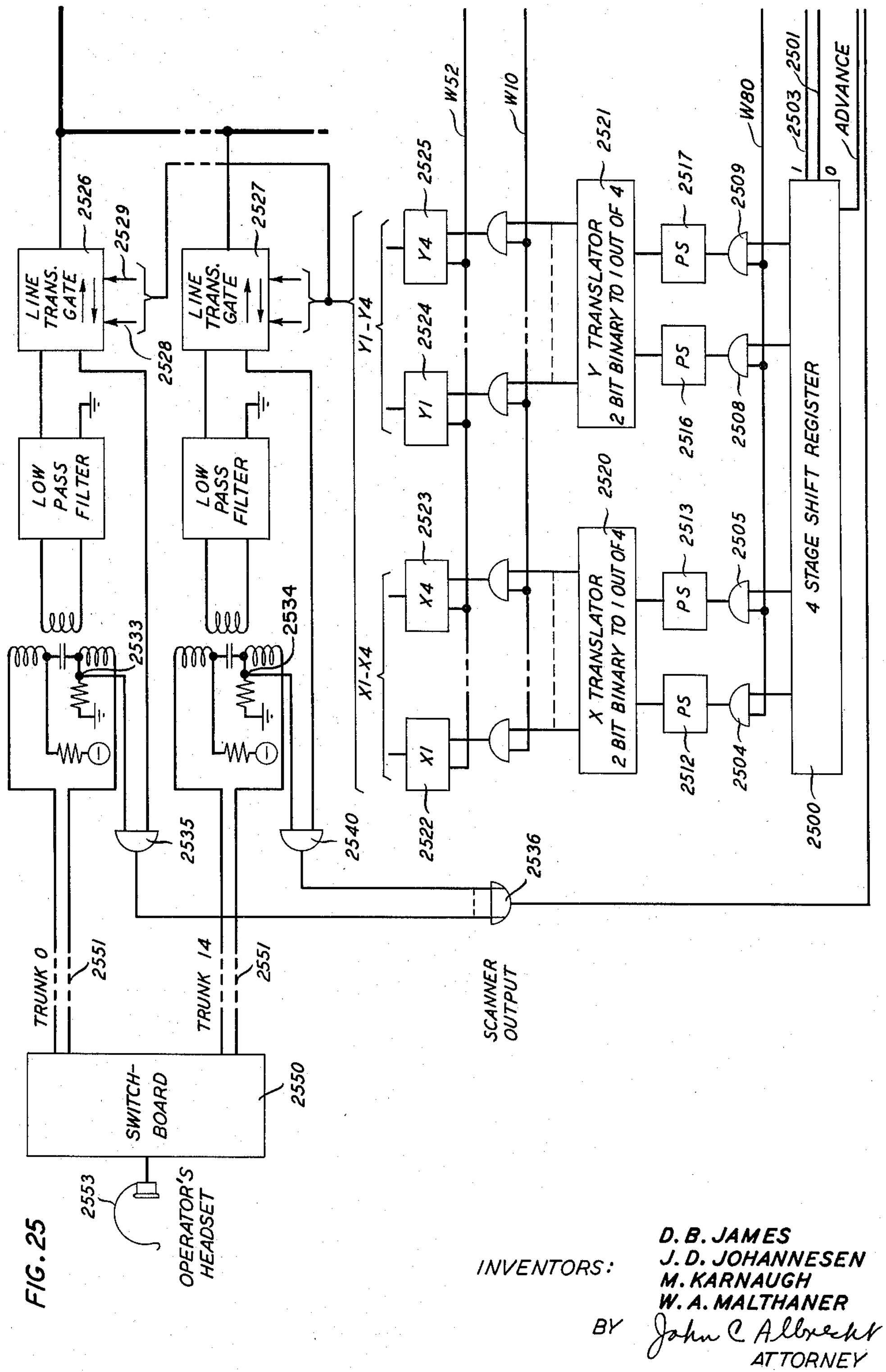
Figure 26:
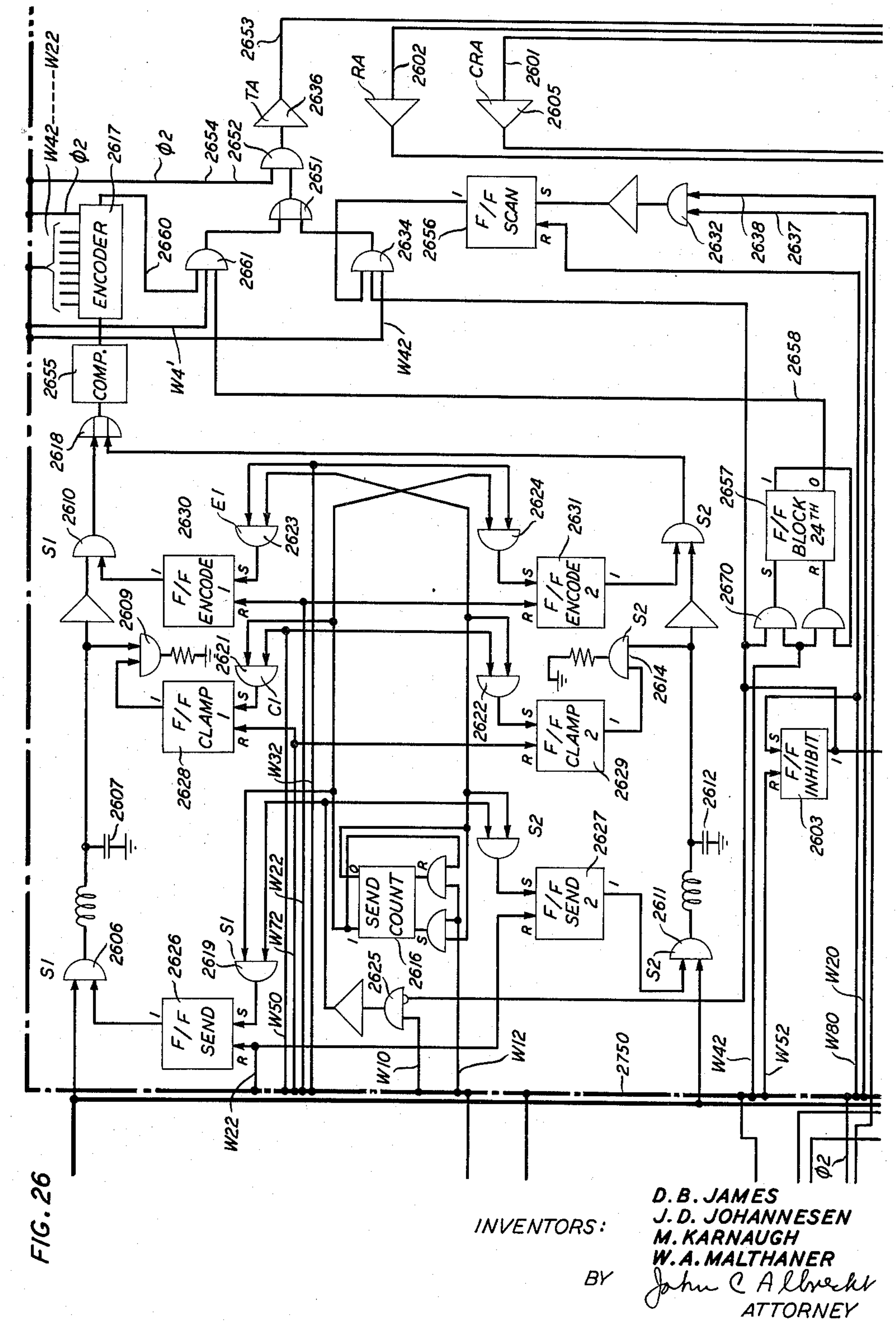
Figure 27:
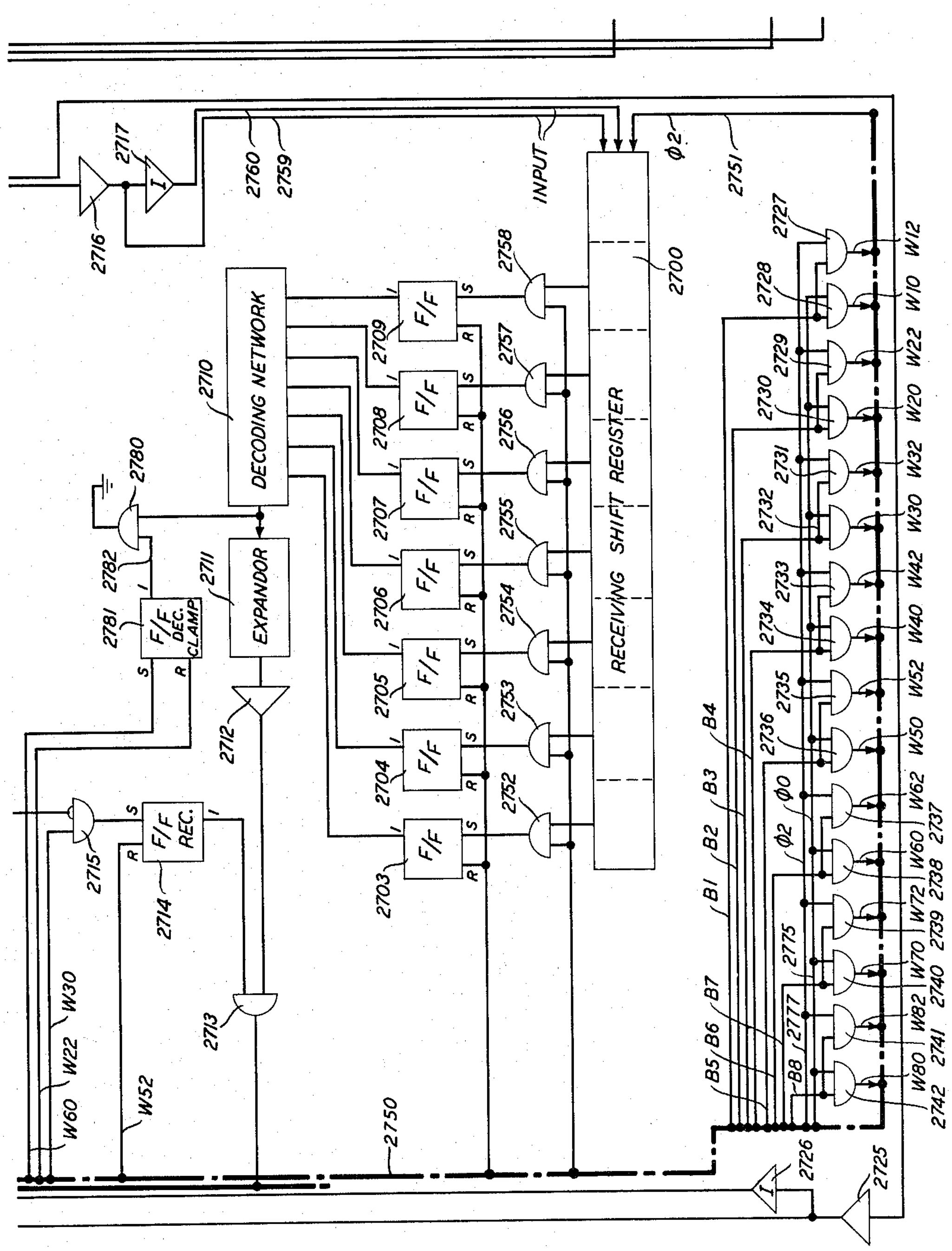
Figure 28:
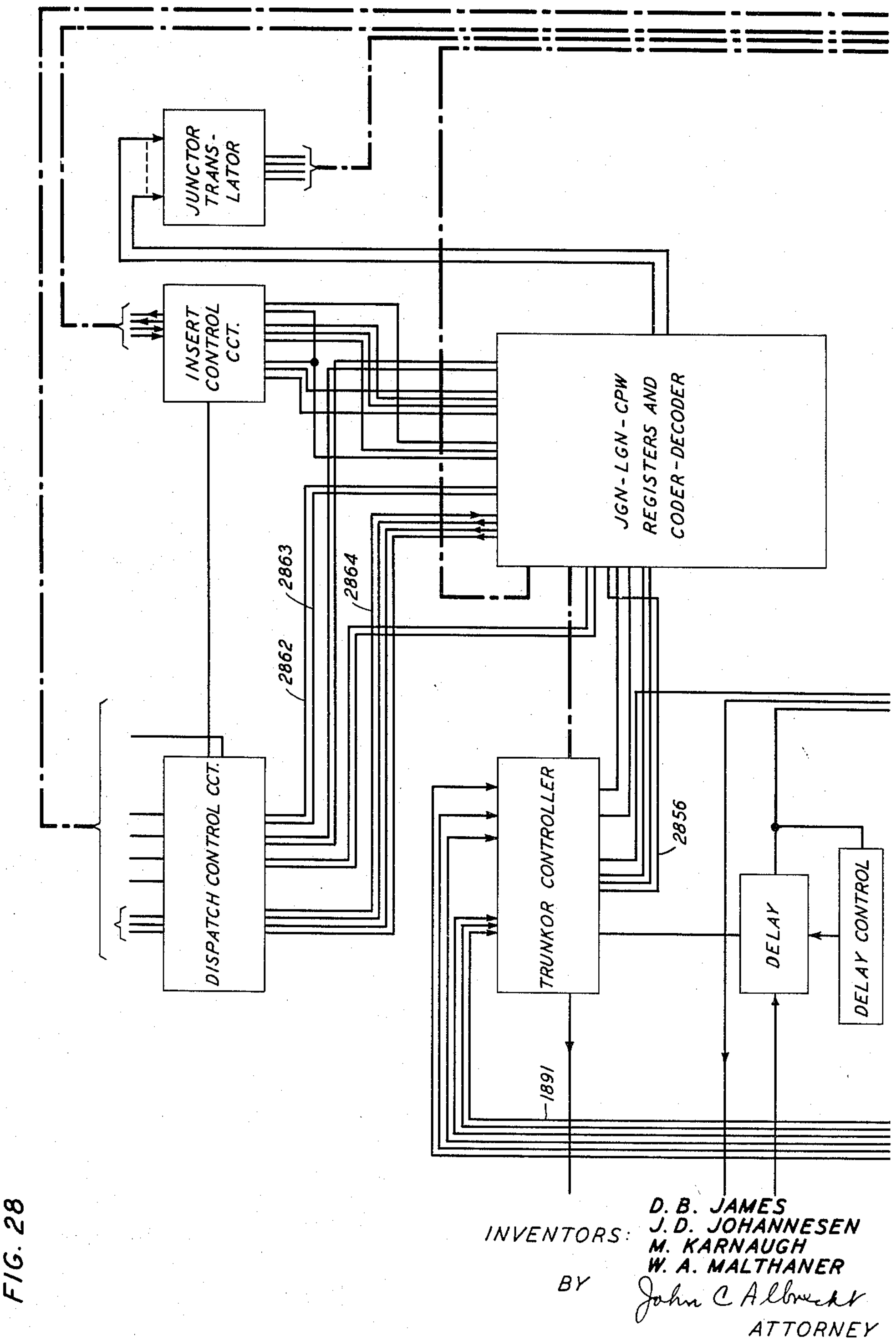

Before proceeding to a discussion of the manual control of Figs. 19 through 22 and 24, mention must be made of the trunkor shown in Figs. 25 through 27 and the trunkor controller of Fig. 28.

The trunkor of Figs. 25 through 27 is substantially the same as the remote concentrator of Figs. 4 through 6; however, there are certain differences, and these will be described at this time. There are many circuit elements of the concentrator which find counterparts in the trunkor. Where there is a correspondence of elements, the labels assigned these elements in the concentrator have been carried forward to the trunkor circuitry; however, these labels have been altered to designate the figure in which the element occurs. For example, in Fig. 4 the first line gate is designated 426, and in Fig. 25 the first line gate is designated 2526. Similarly, the address shift register is labeled 400 in Fig. 4 and 2500 in Fig. 25. Many of the labeled elements in Figs. 25, 26, and 27 are not mentioned specifically in this discussion; however, these designations have been made to show the correspondence of elements in the trunkor and in the concentrator. In Fig. 28, there is shown in block diagram form the control circuitry for the trunkor of Figs. 25, 26, and 27. These arrangements are not shown in detail and an understanding is taken from the description of the central office controls for the concentrator of Figs. 4, 5, and 6. The trunkor serves trunks rather than subscribers' lines; therefore, the subscribers' lines of Fig. 4 are replaced by the trunks represented by 2551 and 2552 and the subscribers' stations of Fig. 4 are replaced by the Manual Switchboard 2550 and the Operator's Headset 2553. Signaling and supervision from the switchboard to the central office or to the trunkor is on a direct current loop basis, while signaling from the trunkor to the switchboard is on a ring down basis. Since loop signaling is employed from the switchboard to the central office, scanning to detect supervisory states can be accomplished in the same manner as that employed in the remote concentrator. However, since a trunkor serves only a small number of trunks, possibly fifteen as shown in this one illustrative embodiment, the Trunk Gate Number Translators 2520 and 2521 are reduced to two bit binary to one-out-of-four codes and the translator output gates and Associated Flip-Flops 2522 through 2525 are reduced in number to a total of four X Flip-Flops and four Y Flip-Flops.

The arrangements of Fig. 26 are substantially like those of Fig. 5; however, since the trunkor is normally located at the central office, the frame correct detecting feature is omitted and there are only two possible responses to the central office over the send line 2653. These responses are namely the output of the Encoder 2617 and the scan response from Gate 2634.

In Fig. 27, the slave clock and the eight 1's detector have been omitted and the signals derived in the remote concentrator through these arrangements are generated in the trunkor with the aid of timing pulses originating as described in the apparatus of Fig. 18. In Fig. 27, the AND Gates 2727 through 2742 are selectively energized by combinations of the bit 1 through bit 8 pulses and the phase 0 and phase 2 pulses. In these gates, the bits $1_0$, $1_2$, $2_0$, $2_2$, etc. through $8_2$ are generated.

The eight 1's signal which is employed in the remote concentrator to set the inhibit Flip-Flop 503 is not available in the trunkor to set the inhibit Flip-Flop 2603 of the trunkor circuit; therefore, the $W_{80}$ pulse is substituted as this occurs in the same time relation that the eight 1's signal occurs in the remote concentrator.

Timing Cable 2750 is derived from Timing Cable 1899 by the addition of the timing pulses produced by AND Gates 2727 through 2742. In addition, Cable 2750 includes a W4' signal which is derived from the bit 4 Conductor 1803 and is an inverted version of bit 4. The W4' conductor is energized for all periods other than the bit 4 period.

*Office control circuits*

As previously indicated, the establishment and disestablishment of calls through the subject system is by way of manual actions in this one specific illustrative embodiment. Before describing the operator control circuits in this embodiment, however, we shall indicate how automatic control circuits could be utilized instead.

In Fig. 1A, the office control module wherein automatic control is effected is shown as the Office Control Module 104A. In this arrangement, the Scan Number Generator 114A and the Clock Pulse Source 115A are the counterparts of 114 and 115 of the Office Control Module 104 of Fig. 1 and the Common Control 113A performs the functions of the Manual Control 113 and the various steps of the operator. Prior art telephone switching systems have employed a variety of common control circuit arrangements which may be utilized. For example, the common control arrangement of application Serial No. 688,386 of Budlong-Drew-Harr, filed October 7, 1957, has sufficient flexibility to permit its adaptation to the task of controlling the switching and transmission circuits of this invention.

*Service alert*

Returning now to the specific embodiment of our invention disclosed herein, the use of a Call Progress Word to indicate the state of a call in the system has been discussed and the Call Progress Word Coder-Decoder has been described in detail. Certain of the Call Progress Words, for example, a request for service or a disconnect signal, are termed service alert signals, and, upon the occurrence of one of these service alerts, a signal is given to the operator indicating the concentrator or trunkor in which the alert occurred and in accordance with the service alert code indicates the desired action. As described with respect to Figs. 33 and 34, the Call Progress Word resides in stages 3 through 10 of the Call Progress Word Shift Register 3310 during bit 8 time of each word. At this time, the first bit of a Call Progress Word resides in stage 10 and the last bit in stage 3. The first three bits of the Call Progress Word are employed in the coding of the service alert signals. Accordingly, if a service alert is detected, the Service Alert Flip-Flop 3451 is enabled during the bit 8 period, and, during the immediately succeeding bit 1 period, the "1" output conductors from the eleventh, tenth, and ninth stages of the Call Progress Word Shift Register 3310 are gated through AND Gates 3452, 3453, and 3454 to the arrangements of Fig. 12.

The SA or Service Alert Flip-Flop 3451 is set upon the occurrence of the T3, T12, or T13 transition signals which are associated with a request for service or a verified hang-up condition indicating a request for a disconnect, as shown in Fig. 36.

A service alert is a signal to the operator that action is required with respect to a particular call and in the case of automatic control the service alert signals would comprise signals to the common control initiating the action of common control.

Specifically with respect to Figs. 11 and 14 which are discrete to the concentrator of Figs. 4, 5, and 6, Service Alert Flip-Flop 1455 is set during bit 8 period if a service alert is detected by the action of Call Progress Word Coder-Decoder 1151. During the immediately succeeding bit 1 period, the "1" output conductors from stages 1402, 1403, and 1404 of the Call Progress Word Shift Register are gated through AND Gates 1456, 1457, and 1458 to Conductors 1459, 1460, and 1461. During bit 1 time, the service alert codes on Conductors 1459, 1460, and 1461 are transmitted from the Call Progress Word Coder-Decoder of Figs. 11 and 14 to Fig. 12. The signals on these conductors selectively set the Service Alert Flip-Flops 1204 through 1206, and in accordance with the setting of these flip-flops, a three bit binary code indicative of the service alert signal is transmitted to the Translator 1222 via Conductors 1231, 1232, and 1233. For each three bit binary code input signal to Translator 1222 one of the eight lights represented by 1223 and 1224, is energized. The Translator 1222 is discrete to the concentrator of Figs. 4, 5, and 6; the Translator 1225 is assigned to the trunkor of Figs. 25 through 27; and the Translator 1226 is assigned to another concentrator not shown.

*Service alert readout*

Having received a service alert signal, the operator first sets the Originating Selector Switch 1500 to associate the manual control with the concentrator or trunkor requesting service and then momentarily operates the Service Alert Readout Key (SARO) 2011. This sets Flip-Flop 2009 which initiates a matching process whereby the three bit code stored in Flip-Flops 1204 through 1206 is compared with the Call Progress Word Code in each of the time slots in the concentrator in which the request originated. The matching process is accomplished through the Flip-Flops 1217 and 1221 and the attendant logic circuitry. The matching process is performed between the code elements stored in Service Alert Flip-Flops 1204 through 1206 and the first three bits of the Call Progress Word of the time slot immediately succeeding the current time slot. For example, the Call Progress Word for the current time slot resides in stages 3 through 10 of the Call Progress Word Shift Register at time bit 8 of each word and the first two bits of the Call Progress Word of the immediately succeeding time slot reside in stages 2 and 1, respectively, while the remaining six bits reside in the delay line 1100. A comparison is made between the state of the second stage 1102 of the Call Progress Word Shift Register and the code stored in the Flip-Flops 1204 through 1206. The first bit of the service alert code is in Flip-Flop 1204 and the last in Flip-Flop 1206. Accordingly, at bit 8 time, a comparison is made between the state of Register 1204 and the state of the second stage 1102. Further, at bit 1 and bit 2 times, a comparison is made between the state of Registers 1205 and 1206 with the state of 1102 at these times. If a mismatch occurs at any of these three times OR Gates 1214 and 1215 will both be energized, which will in turn energize AND Gate 1216 to set the No Match Flip-Flop 1217. The No Match Flip-Flop 1217 is reset at bit 7, phase 2 time, which immediately precedes the time at which the first comparison is made. The comparison process is completed at bit 2, phase 0 time; therefore, the No Match Flip-Flop 1217 remains reset during the time slot in which the service alert occurred. Conductor 1240, which is enabled via SARO Switch 1562, AND Gate 1567 and Flip-Flop 2009, enables AND Gate 1218 so that the M1 Flip-Flop 1221 is operated at bit 2, phase 2 time if a match has occurred.

Operation of the SARO Key 2011 affects transmittal of three items of information from the concentrator controller to the receive portion of the manual control. These items are: (1) The time slot in which the service alert occurred; (2) The Line Gate Number of the subscriber requiring service; and (3) In other than requests for service, the Junctor Gate Number associated with the subscriber.

The code elements of these information items are sent in serial form. The start of information flow is indicated by an initial "1" which occurs during bit 3 time, and this is followed by a seven bit Junctor Gate Number, the last two of which are not used in this embodiment, and an eight bit Line Gate Number.

The SARO Flip-Flop 2009 enables AND Gate 1218 so that the M1 flip-flop is set at bit 2, phase 2 time if a match has occurred. The M1 flip-flop will remain operated for an entire word period as it is reset at the immediately succeeding bit 2, phase 2 time by the enablement of AND Gate 1220. Immediately after the setting of the M1 flip-flop, the bit 3 pulse on Conductor 1501 enables AND Gate 1502 to provide a signal through OR Gate 1503 and AND Gate 1504 to the Data Conductor 1505 and in turn through Switch 1565 of Manual Selector Switch 1500 to Data Conductor 2000. The initial "1" on the Data Conductor 2000 in conjunction with a bit 3 pulse on Conductor 2002 and the energization of Conductor 2003, to indicate the set condition of the SARO flip-flop, enables AND Gate 2001 which in turn sets the Start Flip-Flop 2004. While set, the Start Flip-Flop 2004 enables AND Gate 2040 to provide advance puses to the Receiving Shift Register 2016 and in conjunction with the proper timing pulses causes the setting and resetting of the Gate Time Slot Flip-Flop 2008. The advance pulses will shift the initial "1" and the bits of the information which follow through the receiving shift register as they arrive at the first stage of the register over Data Lead 2000, as will be hereinafter described. The Gate Time Slot Flip-Flop 2008 which is set at the next succeeding bit 1, phase 2 time, and reset at the following bit 4 time, will in turn enable the AND Gates 2020 through 2022 during the succeeding time slot period. This succeeding time slot period is the one during which the first bit of the Call Progress Word, Line Gate Number, and Junctor Gate Number passes from its initial position in the eleventh stage and that the following stages of each respective shift register into the associated memory delay line, and is the time slot "address" associated with this memory information. Energization of the appropriate one of the Gates 2020 through 2022 by a word or time slot pulse from Counter 1804 will set a corresponding one of the Flip-Flops 2024 through 2026 to energize an associated light, thereby displaying the time slot "address."

Having set one of the flip-flops represented by 2024 through 2026, one of the output AND gates such as 2031 through 2033 will be enabled during each succeeding reoccurrence of the appropriate word period and in turn OR Gate 2034 will be enabled. The signal at the output of OR Gate 2034 is transmitted over Conductors 2035 and 2036.

The signal on Conductor 2036 is gated through AND Gate 2012 at bit 8 time of the same word period in which one of the AND Gates 2031 through 2033 is enabled. The output signal from Gate 2012 on Conductor 2015 is transmitted through the Acknowledge Gate 1551 after the operation of Flip-Flop 2051, and then through the Acknowledge Switch 1563, and Conductor 1570 as an acknowledgment signal to the Call Progress Word Coder-Decoder 1151. As explained with respect to Figs. 33 and 34, the acknowledgment signal combines with Call Progress Words and other external signals to provide transition signals for the generation of new Call Progress Words. The acknowledgment signal at the output of Gate 1551 is also returned on Conductor 2014 to reset the SARO Flip-Flop 2009, thereby de-energizing AND Gates 1551, 1567, and 2038. The signal at the output of OR Gate 2034 is also transmitted to the arrangements of Figs. 19 and 35 via OR Gate 2036 and Output Conductor 2030. The signal on Conductor 2030 is in the form of a pulse which persists for the entire word period preceding the "address" time slot in which the service alert request originated. The employment of this signal in Figs. 19 and 35 will be understood fully with respect to the description of these arrangements.

After receiving the first bit of information, namely the initial "1" start pulse in response to the service alert match, the data comprising the Junctor Gate Number, and Line Gate Number associated with the service alert must be gated to the Shift Register 2016.

During the word period in which a match is found between the code stored in Service Alert Flip-Flops 1204 through 1206 and the code stored in the Call Progress Word Memory Loop, the NM Flip-Flop 1217 will remain in the reset condition and the M1 Flip-Flop 1221 will be set.

The setting of the M1 Flip-Flop 1221 in addition to enabling AND Gate 1502 to provide the previously mentioned initial "1" signal also enables AND Gates 1506 and 1507. The second input to the Junctor Gate Number Gate 1506 is the Junctor Gate Number Conductor 1523, which carries the output signal from the sixth stage of the Junctor Gate Number Shift Register. Accordingly, the Junctor Gate Number is conveyed serially from the Junctor Gate Number Memory Loop through Gates 1506, 1503, 1504, and Conductor 1505 to the Data Switch 1565 and then to Data Conductor 2000. The first bit of the Junctor Gate Number immediately succeeds the initial "1" on the Data Conductor 2000. The input AND Gate 2038 is enabled so long as the SARO Flip-Flop 2009 remains in the set condition; therefore, the Junctor Gate Number on Conductor 2000 is serially inserted in the Shift Register 2016 and shifted through this register by the advance pulses from AND Gate 2040.

The M1 Flip-Flop 1221 remains in the set condition for an entire word period starting and ending at bit 2, phase 2 time, and, therefore, the JGN Gate 1506 remains enabled for the same word period. At the end of this time the M1 Flip-Flop 1221 is reset, the M2 Flip-Flop 1508 is set, and at the next bit 2, phase 2 time it is reset. Thereby Flip-Flop 1508 enables the Line Gate Number Gate 1510 for an entire word period starting and ending with bit 2, phase 2 time. The Junctor Gate Number was taken from the sixth stage of the Junctor Gate Number Shift Register and the Line Gate Number is taken from the thirteenth stage of the Line Gate Number Shift Register. The first bit of the Junctor Gate Number reaches the sixth stage of the Junctor Gate Number Shift Register seven-bit periods preceding the time at which the first bit of the Line Gate Number reaches the thirteenth stage 1353. Accordingly, the enablement of the Line Gate Number AND Gate 1510, one word period after the JGN Number Gate 1506 was enabled, will place the first bit of the LGN number seven bits behind the first element of the JGN word on Data Conductor 2000

The Input AND Gate 2038 remains operated and the Line Gate Number is shifted into the Shift Register 2016 immediately behind the JGN number.

When the initial "1" which precedes the Junctor Gate Number reaches the sixteenth stage of the Shift Register 2016, the Conductor 2041 will be energized to enable AND Gate 2050 and thereby to operate ACK Flip-Flop 2051 at phase 0 time. Conductor 2041 will also enable AND Gate 2042 and thereby at phase 2 time reset the Start Flip-Flop 2004. When 2004 is reset, AND Gate 2040 is disabled to stop further advance of the signals in the Shift Register 2016.

As previously described, information is sent to the manual control in the following order: the initial "1", the seven bits of the Junctor Gate Number, and the eight bits of the Line Gate Number. Since the last three bits of each eight bit Junctor Gate Number will always be in the "0" state in this particular illustrative embodiment, the first bit of the Line Gate Number is arranged to appear on the data conductor at the time the eighth bit of the Junctor Gate Number would normally appear. In the Shift Register 2016, there are only two "0" state shift register stages between the end of the Junctor Gate Number and the start of the Line Gate Number. When the initial "1" has been shifted from the Shift Register 2016 and the advance of information through the shift register has been halted, the codes representative of the Junctor Gate Number and Line Gate Number may be processed in the Translators 2043 and 2044 to provide input signals to the respective display panels. The Junctor Gate Number is displayed in Two Decimal Digit Displays 2045 and 2046 and a Suffix Display 2052. The Line Gate Number is displayed in decimal digit form in the Hundreds, Tens and Units Displays 2047, 2048, and 2049.

Shifting of the initial "1" from the Shift Register 2016 via Conductor 2041 not only stops the advance of information through Shift Register 2016, but also enables AND Gate 2050 to set the Acknowledge Flip-Flop 2051. When set, the acknowledge flip-flop disables AND Gate 1567 to stop the transmission of data from Fig. 15 and enables AND Gate 1551 to permit the acknowledgment signal on Conductor 2015 to be transmitted to the Call Progress World Coder-Decoder via the Acknowledgment Switch 1563 and Conductor 1570. The acknowledgment signal indicates the receipt of a time slot identity, a Junctor Gate Number, and a Line Gate Number. In the case of a request for service, the Junctor Gate Number will be all "0's" indicating that a junctor has not been assigned to the displayed Line Gate Number. However, in all other instances, a specific Junctor Gate Number will be displayed.

*A call through the system*

Figure 8:
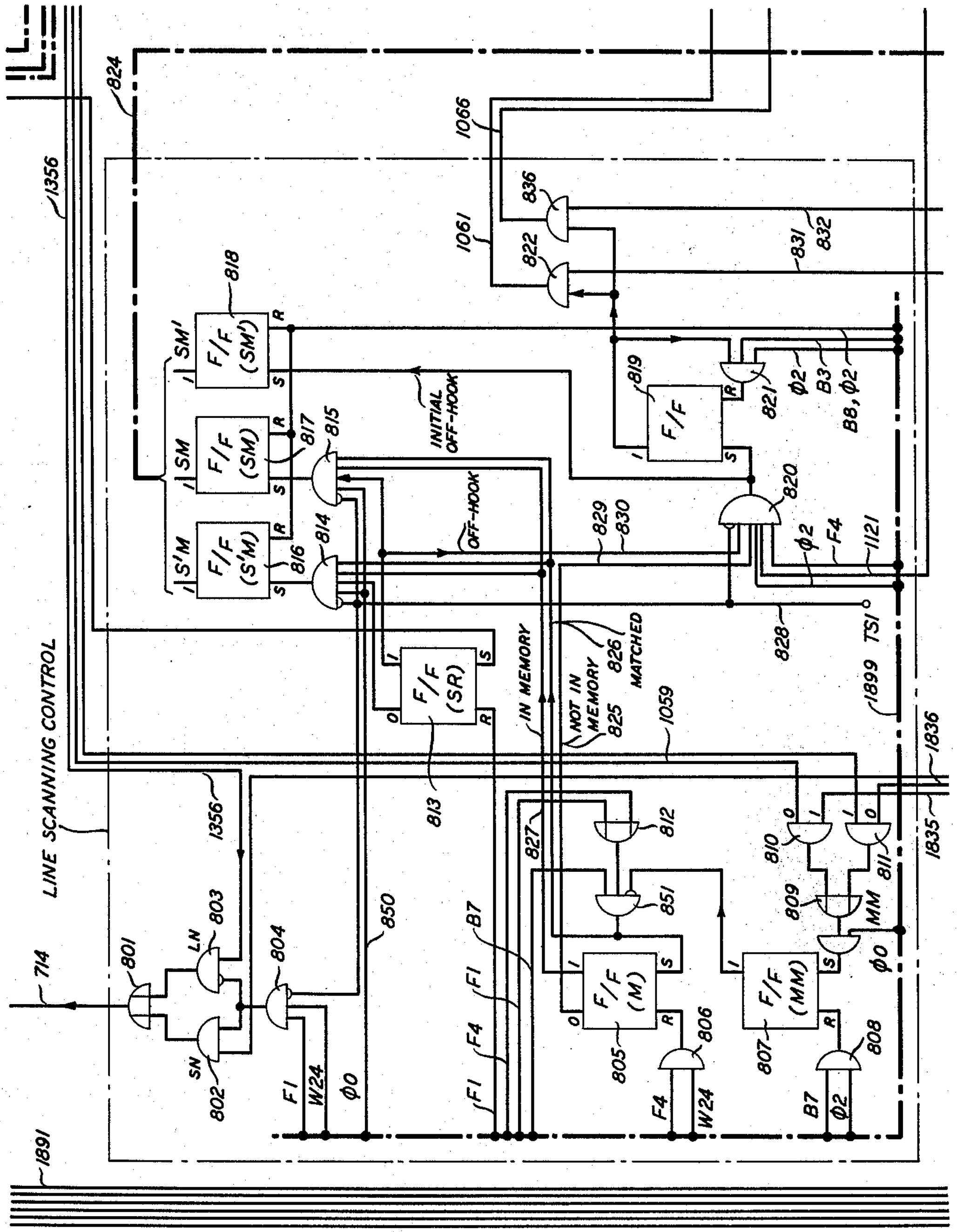

The manual control can best be understood by way of example wherein it is assumed that a call originates in a concentrator and a connection is to be established to a subscriber's line in another concentrator. As an aid to understanding the operation of a concentrator controller under manual control the time diagrams of Figs. 37 through 42 have been included. Although specific reference is not made to these diagrams in the following discussion the information contained therein supplements the following discussion. In Figs. 39 through 42, certain actions have been indicated as occurring in specific numbered frames, while in other instances, actions are shown as occurring in frames N, N+1, N+2, M, M−1, M+1, and M+2. These letter designations of the frames in which the actions occur are arbitrarily assigned and merely represent the relative order in which action occurs. In the manual control of this system, the following work operations must be performed in the case of a request for service:

(1) Service alert readout to display the Line Gate Number of the subscriber requesting service and the time slot assigned by the arrangements of Fig. 8 to this service request;

(2) Detect the identity of all time slots which are simultaneously idle both in the concentrator at which the request occurred and in the trunkor associated with the manual control;

(3) Identify and select a junctor which is idle in one of the time slots noted above in step 2, preferably a junctor idle in the time slot assigned to the service request if this time slot is also idle in the terminating trunkor;

(4) Establish a connection between the originating subscriber and the operator by inserting the appropriate Line and Trunk Gate Numbers, Junctor Gate Numbers and Call Progress Words in the concentrator and trunkor memories in the selected time slot;

(5) Determine the number of the called subscriber from the originating subscriber;

(6) Release the connection between the operator and the originating subscriber;

(7) Determine the time slots which are simultaneously idle in the originating and terminating concentrators;

(8) Identify and select a junctor which is idle in one of the above common idle time slots, again preferably a junctor which is idle in the time slot already assigned to the originating subscriber;

(9) Establish a ringing connection between the originating and terminating subscribers by inserting the appropriate Line and Junctor Gate Numbers and Call Progress Words in the circulating memories; and

(10) Establish a talking connection between the originating and terminating subscribers upon detection of an answer by the terminating subscriber. In this case no action is required at the originating concentrator controller, and at the terminating concentrator controller an automatic transition (T35) provides a new Call Progress Word for the time slot in which the terminating subscriber is served.

The following sequence applies to disestablishment of a call:

(1) Service alert readout to display the Line Gate Number, the Junctor Gate Number, and the time slot assigned to the subscriber requesting a disconnect;

(2) Determination of the concentrator connected to the associated subscriber not requesting disconnect; and (3) Release of the originating and terminating subscribers' lines, the junctor connecting these lines, and the time slot in each concentrator by erasing the Line and Junctor Gate Numbers and writing the appropriate (idle) Call Progress Word in the circulating memories.

By way of example, it will be assumed that subscriber 10 originates a request for service and that a connection is to be made to a subscriber in a second remote concentrator, not shown in the drawing.

Figure 37:
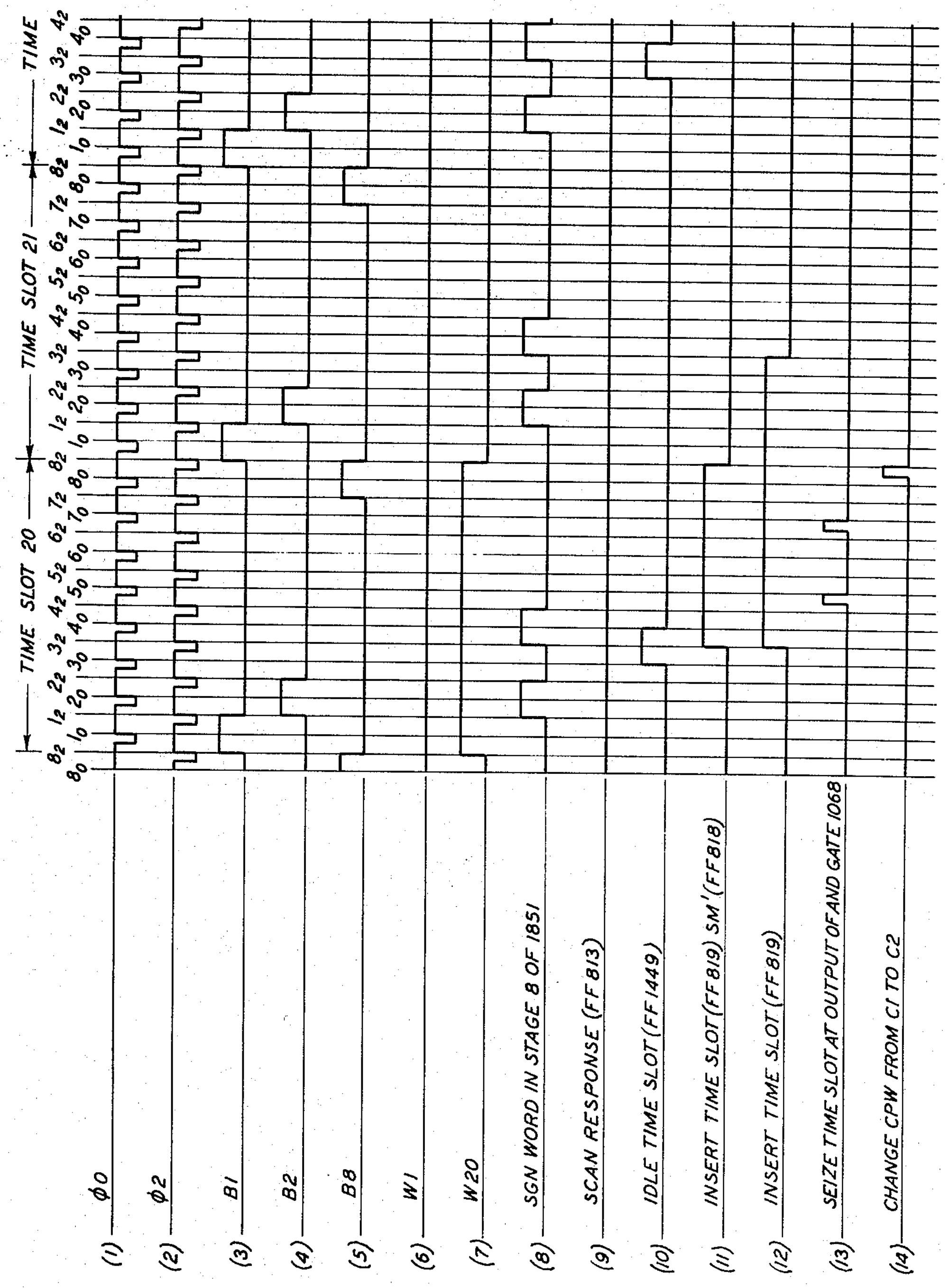
Figure 38:
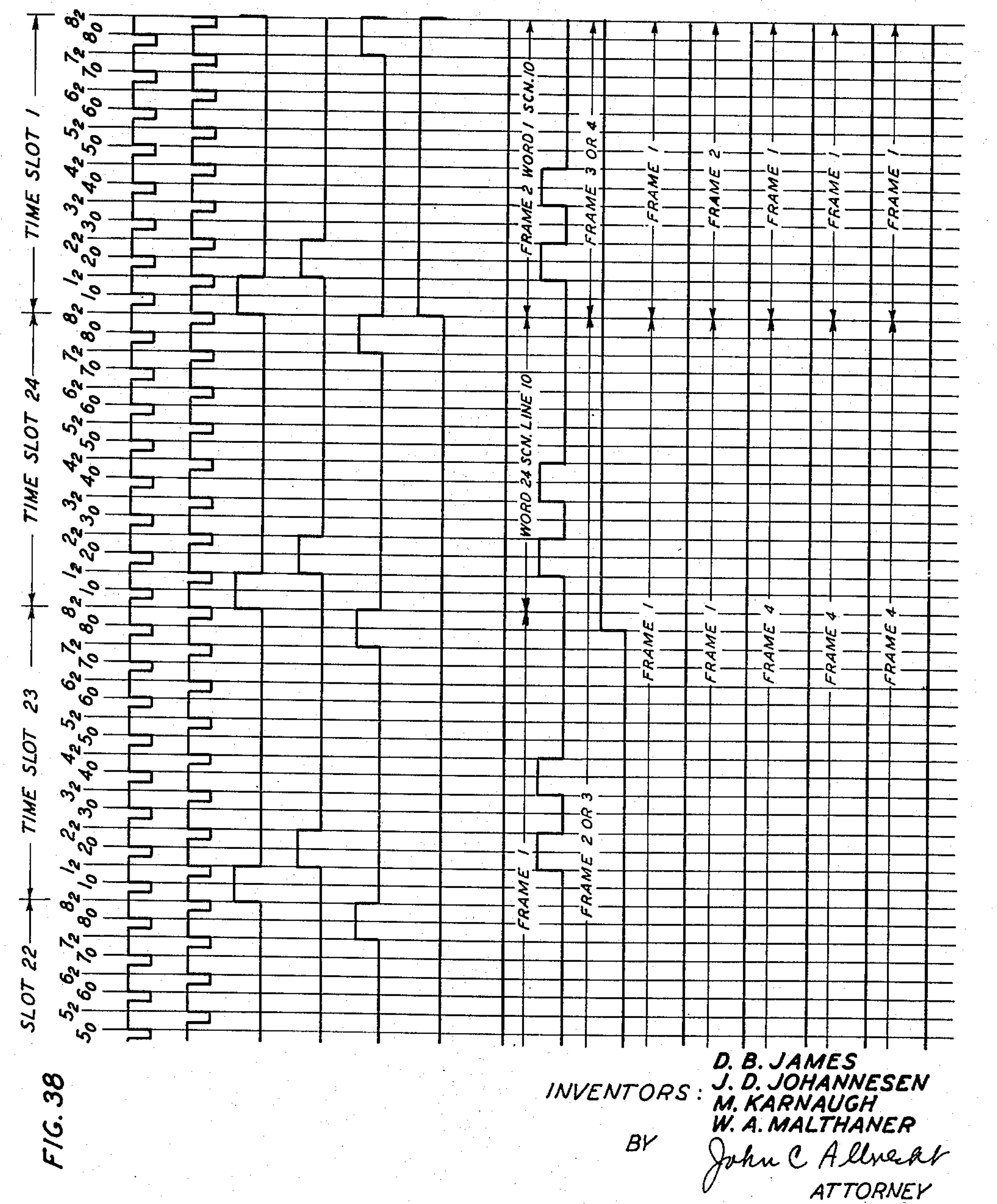
Figure 39:
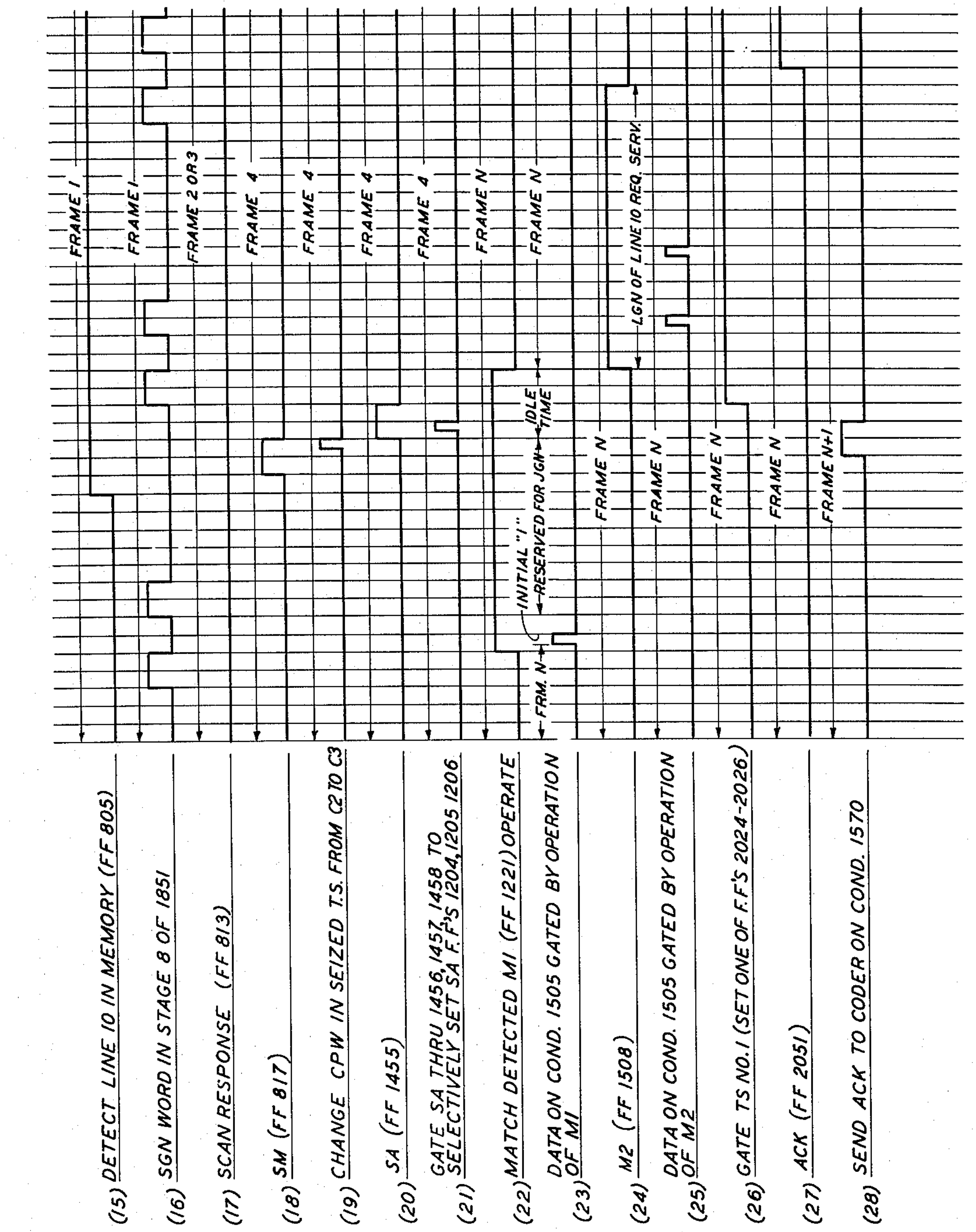
Figure 40:
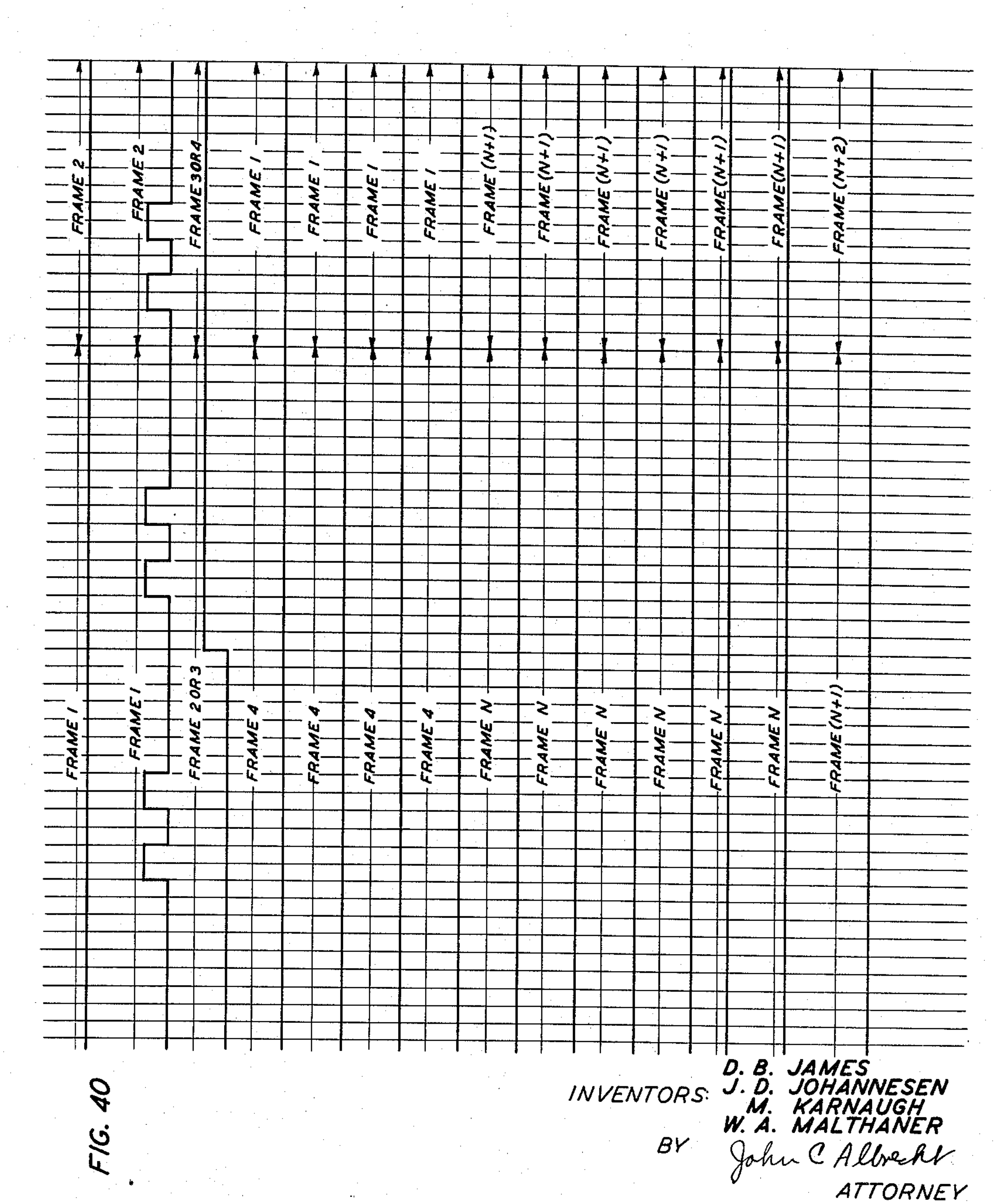
Figure 41:
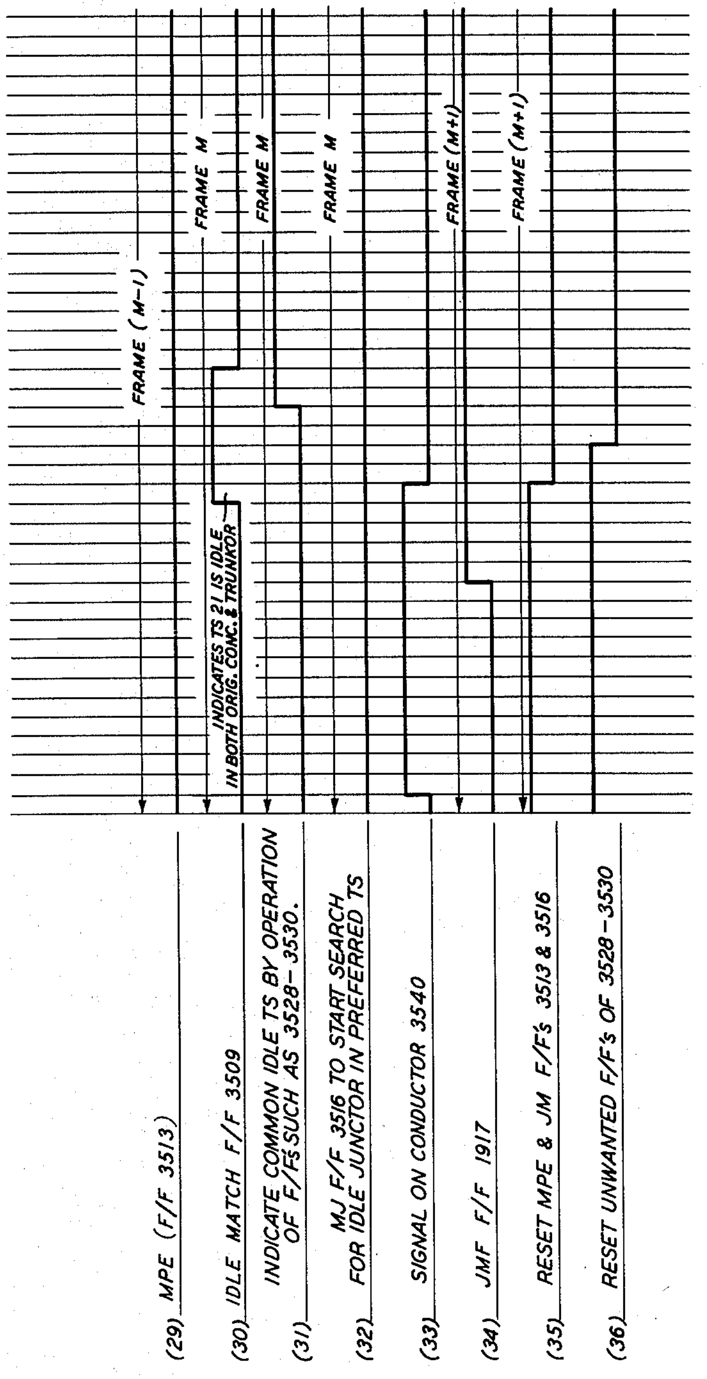
Figure 42:
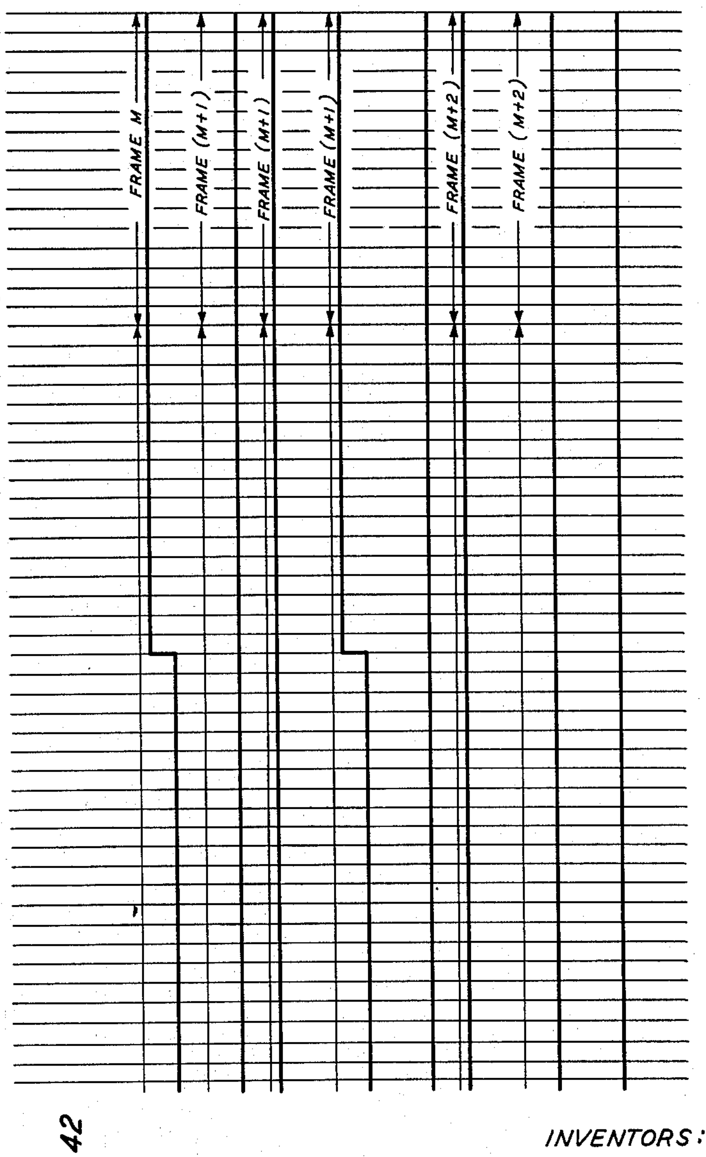
Figure 43:
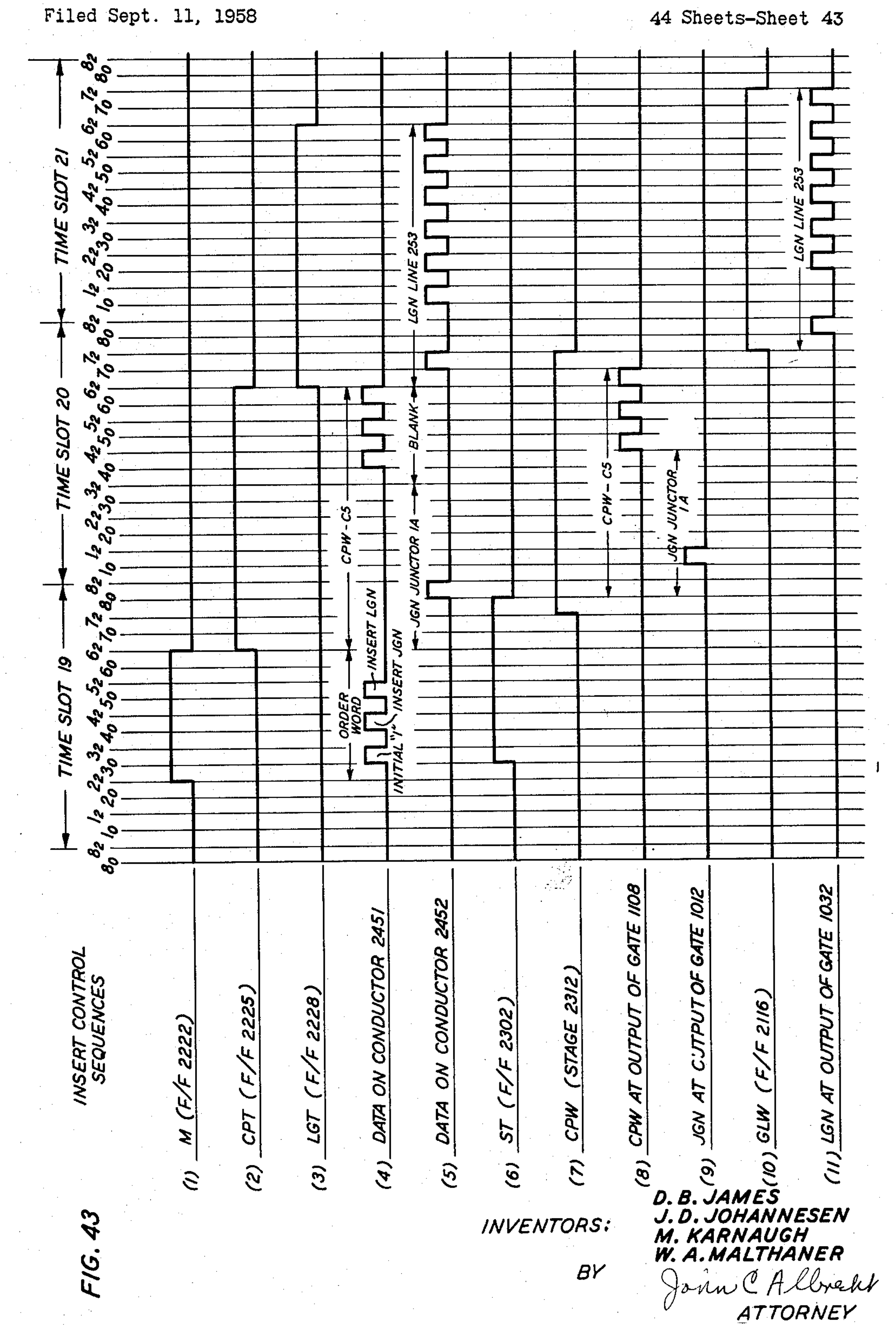
Figures 44, 45, 46, 47, 48:
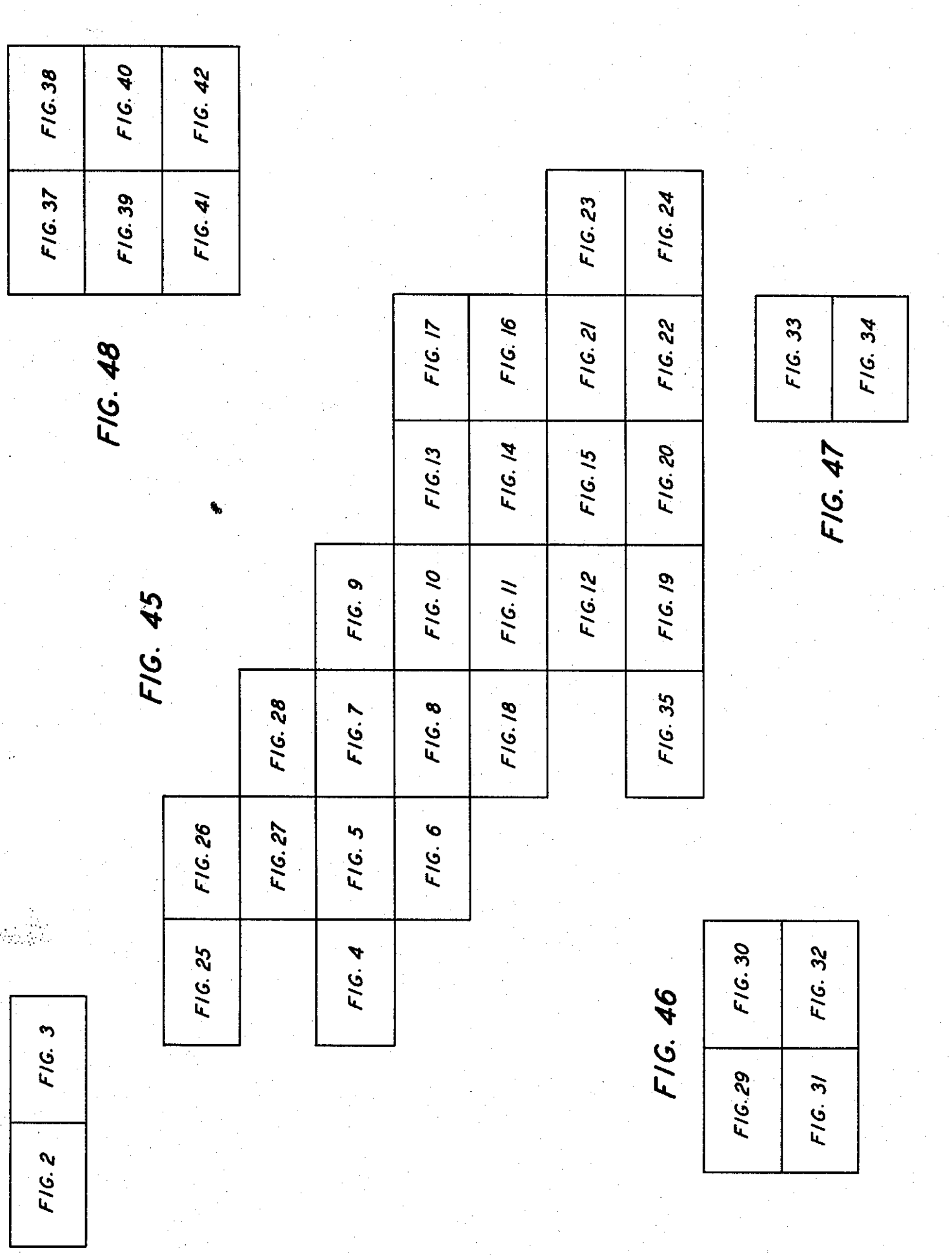

At a particular point in time, the binary code representsive of the Line Gate Number of subscriber 10 will reside in the Scan Gate Number Shift Register 1851. The Scan Gate Number is arranged so that the first or least significant bit resides in the eighth stage 1870 while the most significant bit resides in the first stage 1851. Line 8 of Figs. 37 and 38 shows the Scan Gate Number for line 10 as it occurs at stage 8 of the Scan Gate Number Shift Register 1851. As seen in Fig. 38, an eight bit Scan Gate Number passes through the eighth stage 1870 during frame 1, word 24, bits 1 through 8, and, as previously explained, this word is serially gated via Conductor 1856, AND Gate 802, OR gate 801, Conductor 714, and Output Gate 702 to the remote concentrator via Conductor 501.

Occurrence of the serial binary code for subscriber 10 on Conductor 501 effects interrogation of the Scan Point 433 and, assuming subscriber 10 to be in the off-hook condition when scanned, a response will be generated at the output of the Scanner Gate 436. As previously explained with respect to the operation of Figs. 4, 5, and 6, the scanner response will be transmitted to the Send Line 553 at time $N_{42}$ which is the time reserved for the eighth bit of the twenty-third PCM word. Depending on the physical and electrical separation between the remote concentrator and the central office, the scan response will reach the central office one or two frame periods after the first bit of the Scan Gate Number is transmitted to the line 501. The occurrence of the scan response at Conductor 715, which is the input to the Scan Response Gate 932, is shown in row 9 of Figs. 37 and 38. Assuming the delays to be such that the scan response is gated through 933 at frame 3, word 23, bit 8, phase 0, the Scan Response Flip-Flop 813 will be set at this time in response to the output signal from Gate 933.

Having found the line to be in the off-hook condition, it must also be determined whether this subscriber is currently served as indicated by its Line Gate Number being priorly recorded in the memory or if this is a request for service as indicated by the Line Number not being priorly in the memory. As previously described with respect to Fig. 8, a matching operation is conducted whereby during the first frame a comparison is made in AND Gates 810 and 811 between the Scan Gate Number of the line about to be scanned and the Line Gate Numbers in the first twenty-three time slots of the concentrator memory, and Flip-Flop 805 is operated if the line is found in the memory. During frame 4 after the scan response has been obtained, the match between Scan and Line Gate Numbers is repeated, and, if the line number was priorly in the memory, one of Flip-Flops 816 and 817 is operated at the time of the match according to the scan result. In accordance with our assumption, subscriber 10 has made an initial request for service; therefore, his line number will not be found in the memory during either matching operation, and, instead, during frame 4 the off-hook scan response will be combined with the not-in-memory condition to operate Flip-Flop 818 upon the occurrence of an idle time slot in the memory.

In Fig. 36, it is seen that prior to the request for service, idle time slots, or word-time addressed memory locations, are in the C1 state. Operation of the SM' Flip-Flop 818 generates a T1 transition to place the time slot in the C2 state, that is, a suspected request for service, and to enter the number of the line requesting service in the memory.

Having detected a request for service, an idle time slot must be seized, the Line Gate Number of the subscriber requesting service must be written in the circulating memory in the seized time slot, and the Call Progress Word for the C2 state must be inserted in the CPW circulating memory. As noted in the description of Fig. 14, upon detection of an idle time slot, the Idle Time Slot Flip-Flop 1449 is set, energizing the ITS Conductor 1121 to gate the Scan Gate Number circulating in Shift Register 1851 through AND Gates 822 and 836 and AND gates 1067 and 1068 to the Line Gate Number Shift Register. The insertion of the Line Gate Number in the sixth stage 1054 of the LGN shift register is shown at line 10 of Fig. 37. It should be noted that the SM' Flip-Flop 818 is set only after an idle time slot is found, therefore, the Line Gate Number is inserted only in an idle time slot and the attendant change of Call Progress Word from the C1 to the C2 state occurs only in the selected idle time slot. Placing the Call Progress Word in the C2 state indicates that a request for service is suspected on the line whose number is now associated with this time slot memory location.

At a subsequent point in time, the Scan Gate Number for line 10 again appears at the output of AND gate 802 during the first frame of a scanning sequence, and as previously described with respect to Fig. 8, the number for line 10 is found to be in the memory during this first frame. Subsequently, a scan response is received which again indicates that line 10 is in the off-hook condition. As previously described, the arrangements of Fig. 8 cooperate to operate Flip-Flop 817 which indicates that the line just scanned is in the off-hook condition and that this number is recorded in the circulating Line Gate Number Memory at the location indicated by the time of operation of the flip-flop.

Assuming that a service alert is not priorly present in the subject concentrator, the Service Alert Flip-Flops 1204 through 1206 are all in the reset condition and the Busy Conductor 1234 is not energized. That is, the dispatch circuit of this particular concentrator is assumed to be in the idle state.

As seen in Fig. 36, a T3 transition changes the time slot from the suspect-request-for-service or C2 state to the request-verified or C3 state. A T3 transition occurs when a C2 state is detected with the simultaneous occurrence of an SM signal and a Busy' signal. At this point, Busy' is employed to indicate that the Busy Conductor 1234 is de-energized.

As previously noted and as shown in Fig. 34, a T3 transition signal is one of the signals effective to set the Service Alert Flip-Flop 3451 and thereby to gate the service alert code through AND Gates 1456, 1457, and 1458 to the Service Alert Flip-Flops 1204 through 1206. This causes one of the service alert lights such as 1223 and 1224 to be energized.

Having noted the service alert, the operator sets the Originating Selector Switch 1500 to the first position to associate the manual control with the concentrator in which the service alert occurred. The SARO Key 2011 is manually operated to set the SARO Flip-Flop 2009 and thereby initiate the previously described sequence whereby the time slot in which the service request occurred is identified by energization of one of the Flip-Flops 2024 through 2026 and the Line Gate Number of the line requesting service is entered in stages 2 through 9 of the Shift Register 2016.

After transmission of data from the circulating memories to the receive portion of the manual control has been completed, the ACK Flip-Flop 2051 will be set, and this, in conjunction with an output signal from AND gate 2012 at the proper time, will energize the Acknowledge Output AND Gate 1551, and thereby energize the Acknowledge Conductor 1570.

In Fig. 36, a T4 transition occurs after information regarding a line which is in the C3 state has been fully transmitted to the manual control. The T4 transition results when a C3 current state combines with an acknowledge signal on Conductor 1570 as shown in Fig. 33.

Having reached the C4 state, which indicates that the request for service is verified, the next transition is one initiated by the operator. From the C4 state, two separate paths may be followed. In the first path the transition is made from the C4 to the C5 state when the connection is effected between the subscriber requesting service and the operator at the manual control using the time slot in which the service request arose, and in the second path a manual transition may change the Call Progress Word from the C4 state back to the C1 state if it is determined that the call must be transferred to a new time slot in order to reach the operator.

Before ordering a connection to the operator, an idle path between the originating subscriber and the operator must be found. Accordingly, the Terminating Switch 3500 is set to the trunkor position and the Path Match Key 3511 is momentarily energized to set the Match Path Enable Flip-Flop 3513. An idle time slot is indicated when the Call Progress Word for that time slot is in the C1 state, therefore, a time slot is simultaneously idle in the originating concentrator and the trunkor when the C1 conductors from the concentrator and from the trunkor are simultaneously energized. In this example, the C1 Conductor 3560 from the Call Progress Word Coder-Decoder 1151 enters the manual control through the Selector Switch 1561 and Conductor 3505. The C1 Conductor 3562 from the coder-decoder associated with the trunkor enters the manual control through Switch 3502 and Conductor 3504. While the search for common idle time slots is in progress, the Match Path Enable Flip-Flop 3513 will be in the "1" state and the Junctor Match Flip-Flop 3516 will be in the "0" state. Under this condition the Path Match AND Gate 3508 will be energized at phase 0 time if the C1 conductors from the originating concentrator and terminating trunkor are both energized. The Call Progress Word, as previously noted with respect to Figs. 33 and 34, is read during bit 8 time of the word time immediately preceding its word time "address." Therefore, the matching of C1 conductors is performed at bit 8 time, and since the Phase Zero Conductor 3541 is one of the inputs to the AND Gate 3508, the Idle Match Flip-Flop 3509 will be set at bit 8, phase 0 time. This flip-flop is reset at bit 3 time; therefore, when set, it remains set for three bit periods so that it is operated during the initial part of the "address" word time. During the time the Idle Match Flip-Flop 3509 is set one of the Flip-Flops 3528 through 3530 will be selectively set in accordance with the identity of the time slot "address" found to be idle. For example, if the first time slot is found to be idle in both the originating concentrator and trunkor, the IW1 Flip-Flop 3528 will be set, and, if the twenty-second time slot is found to be idle, the IW22 Flip-Flop 3529 will be set. This is accomplished in the following manner: at bit 2, phase 0 time AND Gate 3510 is enabled and its output signal partially enables the AND Gates 3522 through 3524. The AND Gates 3522 through 3524 each have a second input comprising the W1 through W23 Conductors. Therefore, the AND Gates 3522 through 3524 are selectively enabled during the word period in which common idle time slots are detected.

Setting of one of the Flip-Flops 3528 through 3530 identifies a common idle time slot, energizes one of the Associated Lights 3531 through 3533, and partially enables one of the Gates 3534 through 3536.

In the originating concentrator the C1 Conductor will be de-energized during the time slot assigned to the service request, since, as previously described, the Call Progress Word places that time slot in the C4 state. However, since it is preferable to connect the originating subscriber and the operator in the time slot first assigned to the service request, steps must be taken to energize the IW-Flip-Flop associated with this time slot. This is accomplished through a signal on the Conductor 2030, which is enabled for the word duration of the time slot assigned to the service request. For example, if the service request were assigned to Time Slot 21, the AW21 Flip-Flop, not shown, would be set, and during the Word 20 Period its associated output gate would be enabled to provide a signal through OR Gates 2034 and 2036 to Conductor 2030. Accordingly, even though the C1 Conductor 3560 from the originating concentrator is de-energized during the bit 8 period preceding the time slot assigned to the service request, the OR gate 3507 will be energized by Conductor 2030 during this period and AND Gate 3508 will be enabled at the bit 8 time, as is the case in any common idle time slot.

The Match Path Enable Flip-Flop 3513 was set at word 23, bit 8, phase 0, and one frame later at the same time the Junctor Match Flip-Fop 3516 is set. Accordingly, during the first frame after the Path Match Key 3511 is operated, the Match Path Enable Flip-Flop 3513 will be in the set condition and the Junctor Match Flip-Flop 3516 will be in the reset condition. At the end of one frame period all of the common idle time slots will have been identified and a search can be initiated to find an idle junctor in a common idle time slot. The search for common idle time slots is terminated at word 23, bit 8, phase 0 when the Junctor Match Flip-Flop 3516 is set by the enablement of AND Gate 3515. The setting of 3516 de-energizes its zero output conductor and thereby disables AND Gate 3508.

The search for an idle junctor is started in the preferred time slot, i.e., the time slot assigned to the service request. Accordingly, during the preferred time slot the states of the junctors are examined to find one which is idle. If this searching process fails to find a junctor which is idle in the preferred time slot, a subsequent search is initiated to determine whether or not a particular junctor is idle in one of the non-preferred common idle time slots, and the junctors are sequentially so scanned in each of the common idle time slots until an idle junctor is found.

The search for an idle junctor in the preferred time slot is initiated when both Flip-Flops 3513 and 3516 are in the set state.

There is associated with each concentrator controller and with each trunkor controller a junctor matching circuit such as 1913. Since a junctor may be busy in any time slot in any of the concentrators or trunkors, a simultaneous search is made in all concentrators and trunkors to detect an idle junctor. The junctor matching circuit such as 1913 compares on a two-rail basis the Junctor Gate Numbers circulating in the Junctor Gate Number Memory with Junctor Gate Numbers obtained from the Shift Register 1900.

It might be well to review the arrangements of Figs. 16 and 17 to obtain an understanding of the junctor numbering plan. It is assumed in Fig. 17 that there are fifteen junctor pairs and, as priorly discussed, each concentrator may be an originating or terminating concentrator with respect to a particular junctor pair and the connection between the concentrator and junctor pair, for these conditions is termed an A or B connection, respectively. A five-bit code is employed to identify the control conductors to the junctor gates, and in this code four bits identify the junctor pair and a fifth, or least significant bit, specifies the A or B connection. Even binary numbers are employed to specify the junctor pair number; therefore, the binary code must be incremented by 2 to advance from one junctor number to the succeeding junctor number. For example, the binary code for number 22 is employed to identify the A connection for Junctor Pair 11 and the binary code for the number 23 identifies the B connection for Junctor Pair 11. For the idle junctor selection process only the four most significant bits of the Junctor Gate Numbers are compared, as it is not essential to know whether the junctor is employed in the A or B connection, but rather it is sufficient to know that one of the members of a junctor pair is busy in the particular time slot.

As previously outlined, the search for an idle junctor is started in the preferred time slot, i.e., the one assigned to the service request, with Flip-Flops 3513 and 3516 both set. Also, Conductor 2030 is energized as previously described from one of Flip-Flops 2024 to 2026 on each occurrence of the time slot pulse preceding the preferred time slot. The time slot pulse on Conductor 2030 enables Conductor 3540 for the duration of this preferred word time by passing through OR Gate 3521, one of AND Gates 3534 to 3536, OR Gate 3537, and AND Gate 3538. Conductor 3540 enables AND Gate 1901 so that phase 2 advance pulses are supplied to JSN Shift Register 1900 and enable AND Gate 1902 so that the Junctor Gate Number recirculated into 1900 is also transmitted to all junctor matching circuits such as 1913. Initially the Shift Register 1900 is preset to contain binary code 2 to identify the first usable Junctor Pair 1. Binary code 0 is not used since it corresponds to no junctor. Thereafter the number stored in the shift register is advanced through the register and the ADD 2 Circuit 1950 with or without alteration, dependent upon the external enabling signals to the ADD 2 circuit on Conductor 1951. The first occurrence of preferred time slot enablement at the output of OR Gate 3537 sets Flip-Flop 3544 so that the search for a junctor idle in that time slot continues. If, however, a time slot 23 pulse occurring after the operation of Flip-Flop 3516 finds Flip-Flop 3544 normal, an output is produced at AND Gate 3545 which indicates that the time slot assigned to the service request alert is not idle in the terminating trunkor so that there is no preferred time slot. If this is the case, the output of AND Gate 3545 resets Flip-Flop 3513 through OR Gate 3518 to immediately initiate the selection process for an idle junctor in the common idle but not preferred time slots as described hereinafter.

Before a service request is answered, the Reset Key 2055 is operated and this prepares the manual control for the receipt of new information from the concentrator controller. Included in the actions taken at the time the Reset Key 2055 is operated are the presetting of Shift Register 1900 to code 2, the presetting of the binary counter 3520 to its "1" count, and the resetting of Flip-Flop 3544. The binary counter 3520 is employed to indicate when all fifteen junctor pairs have been checked for busy during the preferred time slot. As long as the JM Flip-Flop 3516 is in the set condition, AND Gate 3539 will be enabled upon the occurrence of each word 23 pulse. The word 23 pulse energizes Conductor 3541 to increment the binary counter 3520 by one count and Conductor 1951 to energize the ADD 2 circuit so that the Junctor Gate Number circulating in Shift Register 1900 is incremented by two. The ADD 2 Circuit 1950 is similar to the arrangements of the ADD Circuit 1857 in Fig. 18. However, the ADD Circuit 1857 is selectively either an ADD 1 or an ADD 2 circuit. As previously noted, the number circulating in Shift Register 1851 is incremented by one count whenever the number stored therein is other than 255 and the circuit serves to increment the count by two and thereby omit the binary number zero whenever the number in the shift register is 255. The number in the Shift Register 1900 circulates from one frame and then at word 23 of each frame the number is incremented by two and the new number then circulates for another frame. The output of the JGN Shift Register 1900 is via Conductor 1912. The signals on Conductor 1912 are gated through AND Gate 1902 during the preferred time slot only, since the time of gating is controlled by Conductor 2030, and these signals are changed from one-rail to two-rail signals after passing through OR Gate 1904. That is, the single-rail output from 1904 is split via two paths, the first being a direct path to AND Gate 1906 and the second path being an indirect path through Logical Inverter 1921 to AND Gate 1905. The search for an idle junctor is made by comparing the Junctor Gate Number circulating in 1900 with the Junctor Gate Number in the memory in the succeeding time slot "address." For example, during Time Slot 15 the Junctor Gate Number in Shift Register 1900 is compared with the Junctor Gate Number which is in the memory for Time Slot 16. This is accomplished by comparing the output of Shift Register 1900 with the output from the Third Stage 1003 of the Junctor Gate Number Shift Register. The first or least significant bit of the Junctor Gate Number which is generated in the manual control is shifted into the first stage of Shift Register 1900 at bit 8, phase 2 time and at this same moment the first bit of a Junctor Gate Number is shifted into the Third Stage 1003. The signals from the Shift Register 1900 and from the Junctor Gate Number Memory are matched at AND Gates 1905 and 1906, and if a mismatch occurs, indicating that this particular junctor number is not in the circulating memory in the subject time slot, the AND Gate 1908 will be enabled and the NJM Flip-Flop 1909 will be set. Enablement of AND Gate 1908 may occur at any bit time; however, during the idle junctor selection process only enablements occurring on bits 2 to 5 are of interest. A mismatch occurring at bit 1 time is ignored by Resetting Flip-Flop 1909 at the end of the bit 1 interval, i.e., at bit 1, phase 2 time. Mismatches occurring later than bit 5 time are ignored by examining the output of Flip-Flop 1909 only at bit 5, phase 2 time in AND Gate 1910. However, if a match occurs, Gate 1908 will not be enabled and Flip-Flop 1909 will not be set at the bit 5, phase 2 time.

If Flip-Flop 1909 remains in the reset condition, a match has been found indicating that the junctor is busy in this particular time slot and the Junctor Match Flip-Flop 1911 will be set at bit 5, phase 2 time. The Zero Output Conductor 1915 of Flip-Flop 1911 is connected in an AND circuit with similar output conductors from other figures, such as 1913 associated with other concentrator controllers and trunkors. If a bit 6, phase 0 time, none of the junctor match flip-flops such as 1911 have been set, an idle junctor is indicated and AND Gate 1916 will be enabled to set the Junctor Match Found Flip-Flop 1917. Any junctor match flip-flop, such as 1911, that is set at bit 5 time of one time slot, will be reset at bit 8 time so that a new match may be made in a subsequent time slot. Since the match was made between the serial Junctor Gate Number on Conductor 1912 and the number in the Junctor Gate Number Memory for the succeeding time slot, the idle junctor number will have shifted into Stages 1 through 5 of the Shift Register 1900 during the time slot in which the junctor is indicated to be idle. Upon finding an idle junctor, action is taken to display the number of the idle junctor and to stop the searching process. The setting of the Junctor Match Found Flip-Flop 1917 enables AND Gate 1919 so that at bit 8 time a pulse is delivered to Conductor 1920 which passes through AND Gate 3543 at phase 2 time to reset Flip-Flops 3513 and 3516, thereby terminating the idle junctor search. The pulse on Conductor 1920 is also transmitted through Terminating Switch 3500 to the Call Progress Word Coder-Decoder of the terminating trunkor controller and through Originating Switch 3501 to the Call Progress Word Coder-Decoder of the originating concentrator controller. In the trunkor controller this signal will cause Transition T36 as shown in Fig. 36, changing the Call Progress State from C1 to C26 at this selected time slot address. If the time slot so selected is the one assigned to the service request alert, no action will take place in the concentrator controller; but if a new time slot has been selected, the signal from Conductor 1920 will cause the same transition from State C1 to C26 to take place in the concentrator memory. At the bit 1, phase 0 time immediately succeeding the operation of Junctor Match Found Flip-Flop 1917, AND Gate 1952 provides an output pulse to Conductor 1953 to effect the resetting of all the IW1 through IW23 Flip-Flops 3528 through 3530 except that flip-flop representative of the common idle time slot in which the idle junctor is found. For example, where the common idle time slot in which a junctor is found to be idle is Time Slot 1, the Reset AND Gate 3525 will be inhibited at word 1 time and therefore the IW1 Flip-Flop will not be reset. However, other AND Gates such as 3526 and 3527 will not be inhibited and the signal on Conductor 1953 will reset such IW flip-flops as were priorly set.

Also, setting of Flip-Flop 1917 energizes the Light 1918 indicating that a junctor has been found and energizes the Displays 1930 and 1931. The Displays 1930 and 1931 are the tens and units display for the idle Junctor Gate Number. Only the junctor number without any specification of A or B is displayed, as both A and B connections must be idle.

Therefore, having found an idle junctor in the preferred time slot, all IW Flip-Flops such as 3528 through 3530 are set, with the exception of the flip-flop associated with the preferred time slot, and the number of the selected junctor idle in the preferred time slot is displayed in 1930 and 1931. Energization of Conductor 1953 resets Flip-Flop 3513 and the Junctor Match Flip-Flop 3516 and this, in turn, disables AND Gate 3538. Disablement of 3538 and attendant de-energization of Conductor 3540 disables AND Gate 1901, through which the advance pulses to the Junctor Number Shift Register 1900 were gated. Accordingly, upon finding an idle junctor, as indicated by setting of the Junctor Match Found Flip-Flop 1917, the junctor number shift register will be halted with the five Junctor Gate Number Bits residing in Stages 1 through 5 of Shift Register 1900.

It has been assumed that the time slot assigned to the service request in the originating concentrator was also idle in the trunkor associated with the manual control and that a junctor was found idle in that time slot. If this situation with respect to an idle junctor does not obtain, the binary counter 3520 is incremented for fifteen successive frames using a new junctor number in each frame cycle, and upon reaching the count of sixteen without an idle junctor having been found, the AND Gate 3519 and the OR Gate 3518 are enabled to reset the Match Path Enable Flip-Flop 3513. At this point Flip-Flop 3513 is in the reset state and Flip-Flop 3516 is in the set state, thereby energizing AND Gate 3517 and OR Gate 3521 so that the circuit is arranged to initiate a search for an idle junctor in one of the non-preferred common idle time slots. Furthermore, if the common idle time slots registered in Flip-Flops 3528 to 3530 do not include the time slot assigned to the service request alert, Flip-Flop 3544 will be operated on the first frame of the idle junctor selection process, Flip-Flop 3513 will be reset, and the search for an idle junctor in a non-preferred common idle time slot will be initiated immediately as previously described. In this process a Junctor Gate Number is recirculated without alteration through Shift Register 1900 during each word time preceding a common idle time slot for an entire frame, and during this time it is noted whether or not this number is in the memory in one of the common idle time slots. If a junctor is found to be idle in a common idle time slot, as indicated by the fact that its number is not in the originating or terminating memories, the searching process will be terminated as previously described and displays will be energized to indicate the common idle time slot in which the idle junctor was found and the number of the junctor.

We have now completed Step 3 in the work operations to be performed in the case of a request for service. Step 4 specifies the establishment of a connection between the originating subscriber and the operator by inserting the appropriate Line and Trunk Gate Numbers, Junctor Gate Numbers, and Call Progress Words in the concentrator and trunkor memories in the selected time slot. The insertion of information in the circulating memories is by way of the arrangements of Figs. 21 through 24. The manual insertion controls of Figs. 22 and 24 are selectively associated with a concentrator or trunkor by the SEND Switch 2400. In our illustrative call, the Switch 2400 is set to associate the SEND controls with the concentrator of Figs. 4 through 11, and Figs. 13 and 14. The switches of Figs. 22 and 24 are employed as follows:

(1) Time Slot Selector Switch 2207 is manually set by the operator to the common idle time slot in which a junctor has been found, as indicated by the energization of one of the Lights 3531 through 3533;

(2) The Line Gate Number Selector Switch 2208 is manually set by the operator to specify in this instance the Trunk Gate Number of one of the trunks of the Switchboard 1 through 15 which the operator has decided to use in answering this particular service alert;

(3) Junctor Gate Number Selector Switch 2209 is set by the operator to specify the number of the junctor to be used, as indicated by the Displays 1930 and 1931;

(4) The Call Progress Word Selector Swith 2416 is manually set to specify one of the various manual transitions indicated in Fig. 36; and (5) The Order Selector Switch 2417 is manually set to indicate what elements of information are to be inserted in the circulating memories.

If it is assumed that an idle junctor has been found in the preferred time slot, the Line Gate Number in the originating concentrator controller memory in the time slot assigned to the origination need not be changed. However, the Call Progress Word will have to be updated from the C4 to the C5 state to indicate the connection to the operator, and a Junctor Gate Number will have to be inserted to effect the connection between the concentrator and trunkor in the assigned time slot. However, if the time slot assigned to the origination was not simultaneously idle in the trunkor or if there was not an idle junctor in the preferred time slot, then the line gate number for the originating line and the Call Progress Word indicating that the line is in the CONNECTED TO OPERATOR or C5 state will have to be inserted in the newly selected common idle time slot in which a junctor is idle as indicated by one of the Lights 3531 through 3533. If the call is so transferred to a new time slot, the concentrator memory at the old time slot address must, of course, be returned to normal by prior operations of the manual insertion controls. If we assume, as shown in the timing diagrams of Figs. 37 through 41, that Time Slot 21 is found to be a common idle time with a junctor also idle and that the service alert was assigned to that time slot in the originating concentrator, we are prepared to up-date the Call Progress Word in the originating concentrator controller and to insert the Junctor Gate Number. Accordingly, Switch 2207 is set to the Time Slot 21 position, the Junctor Gate Number Selector Switch 2209 is set to the position indicated by the Displays 1930 and 1931 with the least significant bit for the A connection added, the Call Progress Word Selector Switch is set to the C5 state, and the Order Word Selector Switch 2417 is set to set the JGN and CPW stages of Shift Register 2450 and coincidentally the PAR stage of Shift Register 2450 so that the order word has an odd number of active bits for use in checking the transmission of the order to the concentrator controller.

With Selector Switches 2207, 2208, 2209, 2416, 2417, and 2400 set to the positions just described and with Reset Key 2414 having been momentarily operated after the previous insertion operation to clear the circuits of Figs. 22 and 24, Set Key 2413 is momentarily operated to set into Shift Registers 2210, 2211, and 2450 the data and orders previously selected by the setting of the selector switches. At the start of the insertion process Flip-Flops 2431, 2434, and 2437 are in their reset state. During the insertion process they are operated in various combinations and through Gates 2418 to 2428 control the sequence of data setting, initial data transmission to a concentrator or trunkor controller, acknowledgement of data reception, automatic second trial data transmission, if required, and alarm on second trial error. Operation of the set key with Flip-Flops 2431 and 2434 reset energizes AND Gate 2423 to set the data into the shift registers and to operate Flip-Flop 2431 as an indication that the setting operation has been completed. The setting of the shift registers is translated and displayed on the associated lights so that the operator may monitor and check these settings.

The operator then momentarily operates Spill Key 2412, which with Flip-Flop 2431 set and Flip-Flop 2434 reset operates Flip-Flop 2434. With Flip-Flops 2431 and 2434 both set Conductor 2229 at the output of AND Gate 2421 is energized, enabling AND Gate 2219 to prepare upon the operation of Flip-Flop 2222 for the data transmission to Figs. 21 and 23. Time Slot Selector Switch 2207 is shown in the illustrative embodiment in position 21 and thereby produces an output pulse for word time 20 on Conductor 2230 for use in Fig. 20 in connection with hang-up service alerts and produces an output pulse for word time 19 on Conductor 2231 to further enable AND Gate 2219. Accordingly, at word 19, bit 2, phase 2 time Flip-Flop 2222 is set by an output pulse from Gate 2219 to start the transmission of data. Flip-Flop 2222 is then reset at the following bit 6, phase 2 time. During the time that Flip-Flop 2222 is set the order word in Shift Register 2450 is transmitted serially to the insert circuit shown in Fig. 23. Flip-Flop 2225 is set simultaneously with the reset of Flip-Flop 2222 and is reset a word time later at bit 6, phase 2 time. During this word time the Call Progress Word in Shift Register 2450 is transmitted serially following the order word, and simultaneously over a separate conductor the junctor gate number in Shift Register 2211 is also transmitted to the insert circuit. Flip-Flop 2228 is set at the same time that Flip-Flop 2225 is reset, and Flip-Flop 2228 is similarly reset a word time later at bit 6, phase 2 time. During the word time in which Flip-Flop 2228 remains set the Line Gate Number originally in Shift Register 2210 is transmitted to the insert circuit serially following the Junctor Gate Number.

To accomplish these transmissions Flip-Flops 2222 and 2225 energize Conductor 2220 through OR gate 2217. Conductor 2220 enables AND Gate 2452 so that the information in Shift Register 2450 is advanced toward AND Gate 2415 at phase 2 times and Conductor 2220 also enables AND Gate 2415 so that the information connected to it from the shift register is transmitted at phase 0 times through Switch 2402 to Conductor 2451 and then to the insert circuit of Fig. 23. In a similar manner Flip-Flops 2225 and 2228 energize Conductor 2232 through OR Gate 2216. Conductor 2232 enables AND Gate 2215 so that the information in Shift Registers 2210 and 2211 is advanced toward AND Gate 2212 at phase 2 times, and Conductor 2232 also enables AND Gate 2212 so that the information connected to it from Shift Register 2211 is transmitted at phase 0 times through Switch 2401 to Conductor 2452 to the insert circuit.

Figure 21:
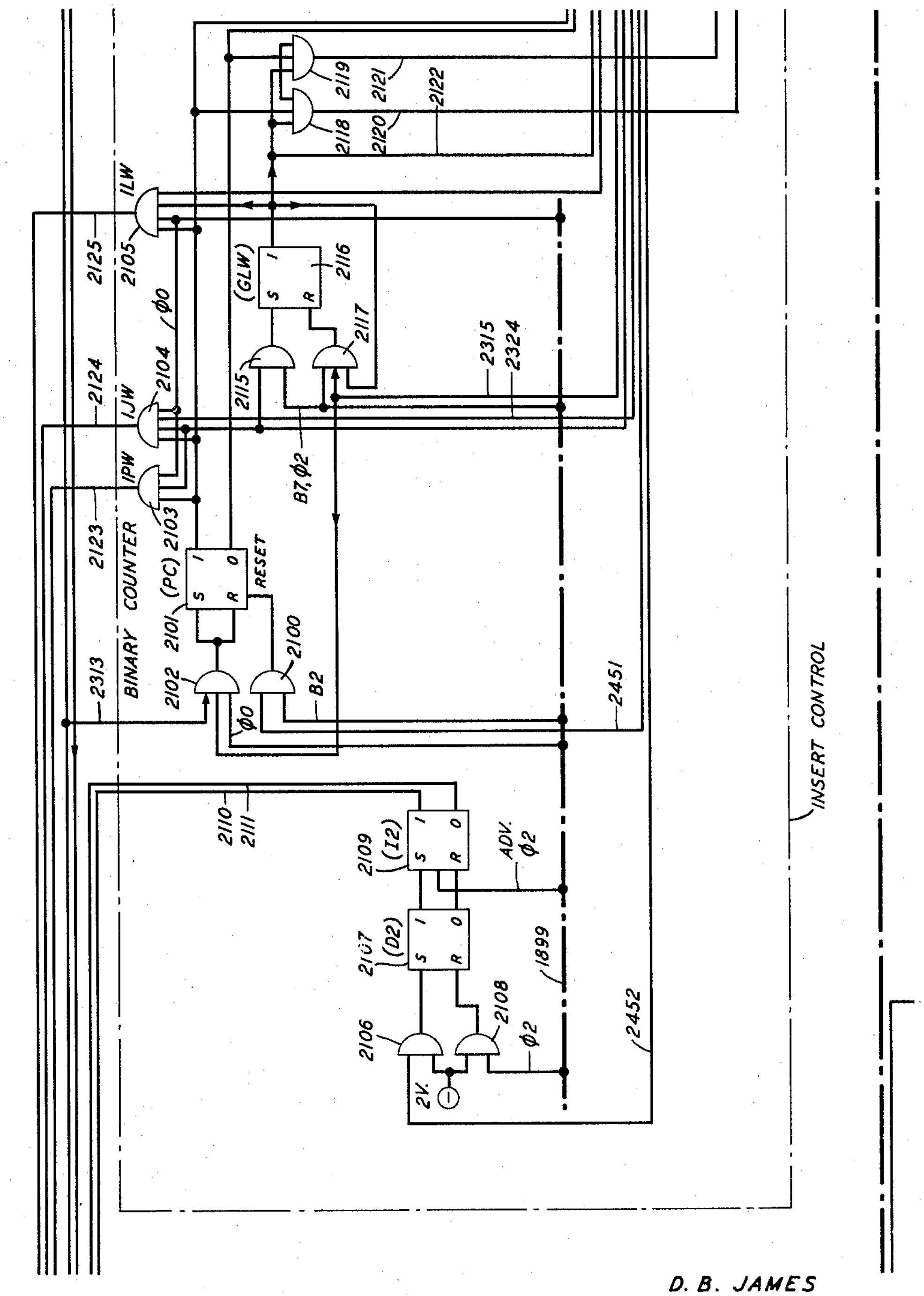
Figure 22:
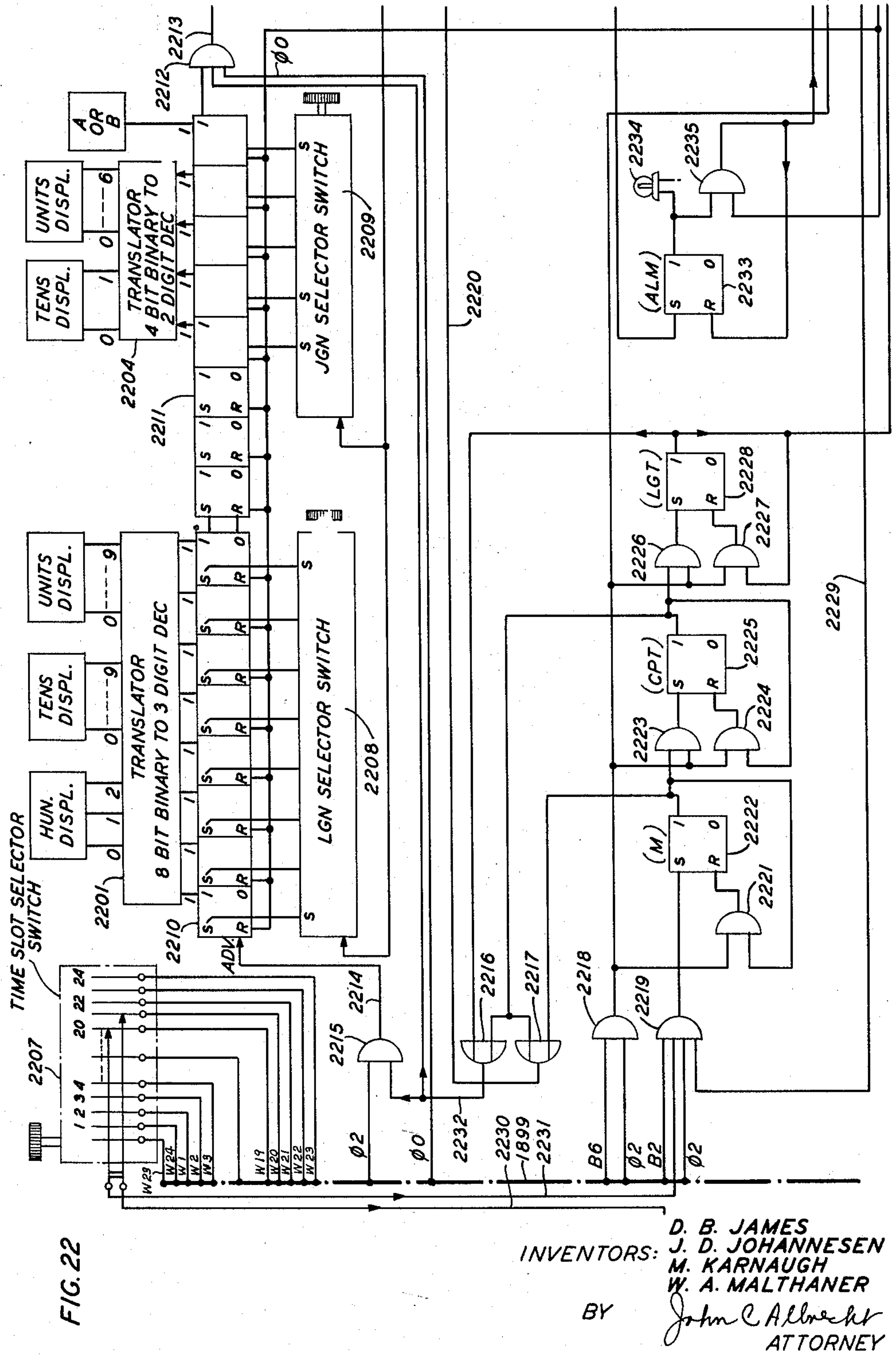
Figure 23:
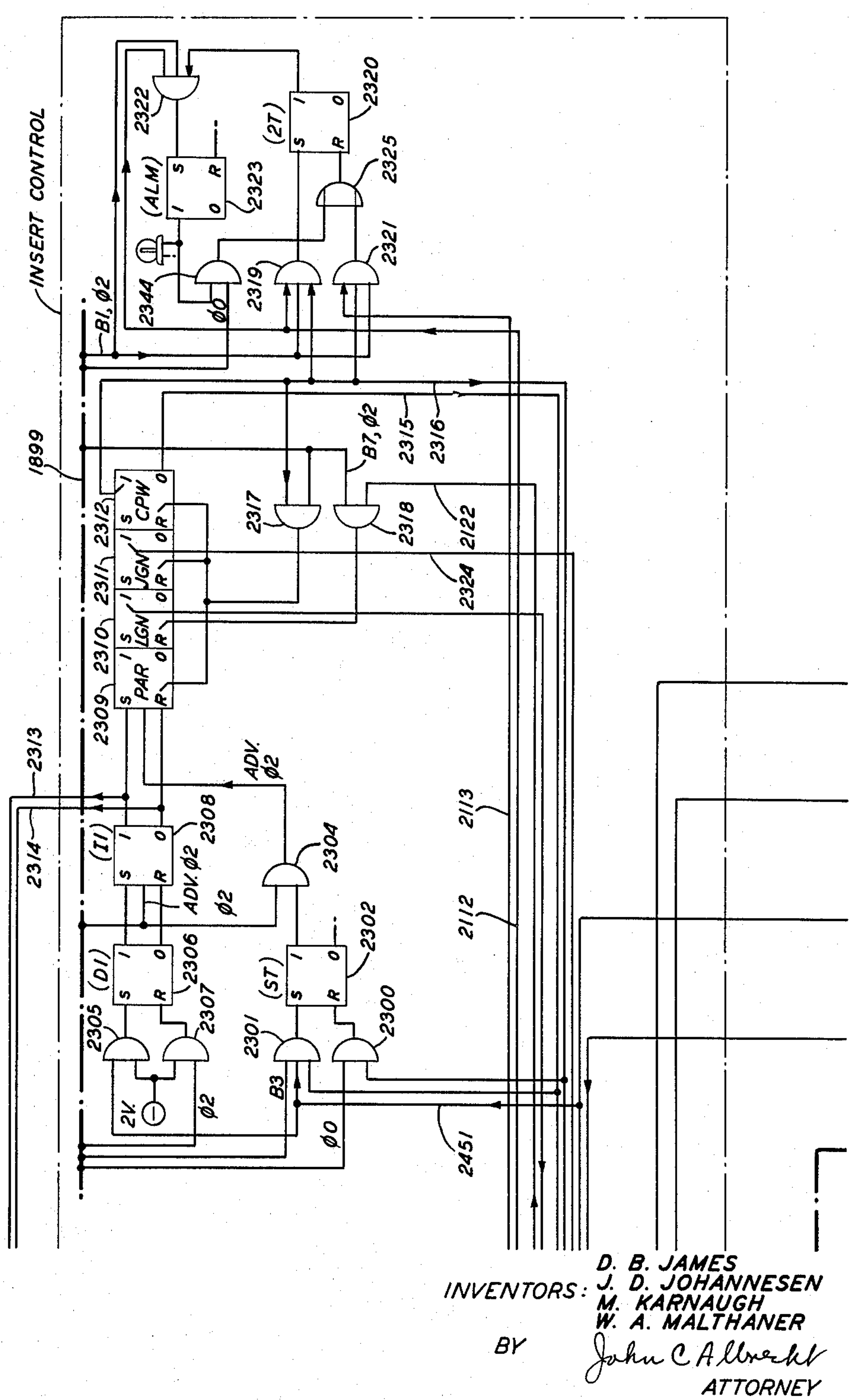

During the memory insertion process to be described with respect to Figs. 21 and 23 the parity of the order word is checked, energizing Conductor 2120 if the check is satisfied or Conductor 2121 if an error is detected. Flip-Flop 2228, when set indicating that the final data items are being transmitted to the insert circuit, energizes AND Gate 2422 so that Flip-Flop 2431 is reset through OR Gate 2418, preparing the circuit for the parity check acknowledgment. With Flip-Flop 2434 set and Flip-Flop 2431 reset Conductor 2120, if energized, resets Flip-Flop 2434 through AND Gate 2427 and OR Gate 2419, terminating the insertion process. However, Conductor 2121, if energized, sets Flip-Flop 2437 through AND Gate 2425 and resets Flip-Flop 2434 through Gate 2425 and OR Gate 2419. Light 2453 associated with Flip-Flop 2437 is thereby energized as an indication to the operator that a repetition of the insertion process is required.

With Light 2453 energized the operator repeats the procedure previously described of operating Reset Key 2414; setting or checking Selector Switches 2207, 2208, 2209, 2416, 2417, and 2400; operating Set Key 2413 and Spill Key 2412. Transmission to the insert circuit is repeated as previously described with Flip-Flops 2431, 2434, 2222, 2225, and 2228 operating in the same manner as before but in this case with Flip-Flop 2437 continuously set. At the end of transmission, Conductors 2120 and 2121 are again alternatively energized to indicate, respectively, a satisfactory or an unsatisfactory check. A satisfactory check result energizes AND Gate 2427 to reset Flip-Flop 2434 via OR Gate 2419 and to reset Flip-Flop 2437 via OR Gate 2420, thereby de-energizing Light 2453 and terminating the insertion process. An unsatisfactory check result, on the other hand, energizes AND Gate 2426 to set Flip-Flop 2233 and, in turn, energizes Light 2234. Light 2234 is an alarm lamp which indicates that maintenance action is required. The circuit may be returned to normal by operating Reset Key 2414 which, with Flip-Flop 2233 set, energizes AND Gate 2235 to reset 2233 directly, Flip-Flop 2434 through OR Gate 2419, and Flip-Flop 2437 through OR Gate 2420.

Operation of the insert control of Figs. 21 and 23 starts with the appearance of serial data bits on Conductor 2451. An initial "1" bit, which serves both as a start signal and as an order to insert a new Call Progress Word in the concentrator controller memory, occurs at bit 3 time. This initial "1" through AND Gate 2100 resets Binary Counter 2101, which will be used for a parity check on the insert order; through AND Gate 2301 sets Flip-Flop 2302 which thereafter provides phase 2 advance pulses to the shift register comprising stages 2309 to 2312;

and through AND Gate 2305 sets Flip-Flop 2306. Flip-Flops 2306 and 2308 are primarily delay and one-rail to two-rail converting stages of a shift register through which the insert order and the Call Progress Word pass. The initial "1" in Shift Register Stage 2306 is advanced to stage 2308, and stage 2306 is reset at the next phase 2 time. Subsequent bits of the order word on Conductor 2451 enter stage 2306 at phase 0 times and are advanced through stage 2308 to stages 2309 to 2312 at phase 2 times. The condition of stage 2308 is not only passed on to stage 2309 but is also communicated on a two-rail basis to Conductors 2313 and 2314. Conductor 2313 enables AND Gate 2102 whenever stage 2308 contains a "1", and this gate is then energized at phase 0 times to drive Binary Counter Stage 2101 to determine the parity of the order word.

The order word comprises four bits always arranged to contain an odd number of "1's" and each "1" reverses the condition of Counter Stage 2101 during the time it is in Shift Register 2308. The bits of the order word are then advanced through Shift Register Stages 2309 to 2312, and when the initial "1" reaches Stage 2312, Conductor 2315, which is normally energized, becomes de-energized, thereby disabling AND Gate 2102 so that subsequent "1" signals on Conductor 2313 do not affect stage 2101. With the initial "1" in stage 2312, Conductor 2316 is energized to reset Flip-Flop 2302 so that no further advance pulses are applied to stages 2309 to 2312. Thus, the order word remains thereafter in a fixed position in these stages and may be used to steer the subsequent flow of data over Conductors 2451 and 2452. With the order word stored in stages 2309 to 2312, stage 2101 is in the set condition if this order word, as received, contained an odd number of "1's" and is in the reset condition if the order word received contained an even number of "1's", and AND Gate 2118 or 2119 is partially enabled in accordance with these respective conditions.

Signals representing the Call Progress Word to be inserted in the controller memory flow serially over Conductor 2451 immediately following the order word, and pass through Shift Register Stages 2306 and 2308 to energize Conductors 2313 and 2314 on a two-rail basis. Conductors 2313 and 2314, in turn, enable AND Gates 1108 and 1107, respectively, so that the new Call Progress Word will be inserted into the second stage 1102 of the Call Progress Word Shift Register in the memory loop of Figs. 11 and 14 if Conductor 2123 is energized by phase 0 pulses. If Counter 2101 is set, indicating that the parity of the order word is satisfied, Conductor 2123 is energized at phase 0 times through AND Gate 2103, which is also enabled by stage 2312 which contains the insert Call Progress Word Order Bit. In the illustrative example, the first Call Progress Word Bit is at the final stage of Shift Register 2450 during bit 7 time of word 19 time and Conductor 2451 is accordingly energized by AND Gate 2415 at bit 7, phase 0 time. The same initial bit appears on Conductors 2313 and 2314 at word 19, bit 8 time, together with a phase 0 pulse on Conductor 2123, and the Call Progress Bit enters the memory shift register at the second stage 1102 so that at word 21, bit 1 time the Call Progress Word will be in its desired position in the fourth through eleventh stages of the memory shift register.

The bits of a Junctor Gate Number to be inserted in the controller memory appear on Conductor 2452 at the same time that the corresponding bits of the Call Progress Word are appearing on Conductor 2451. In a similar manner to that employed for the Call Progress Word, the Junctor Gate Number Signals pass through delay and one-rail to two-rail Converting stages 2107 and 2109 of a shift register and energize Conductors 2110 or 2111, dependent, respectively upon whether the bit signal is a "1" or a "0." Conductors 2110 and 2111 enable AND Gates 1012 and 1011 at the second stage 1002 of the shift register in the Controller Junctor Gate Number Memory Loop if Conductor 2124 is energized from AND Gate 2104 at phase 0 times, thereby inserting a new Junctor Number into stage 1002 of the memory loop shift register. AND Gate 2104, in turn, is enabled if Counter 2101 is in the PARITY SATISFIED state, and stages 2311 and 2312 of the order word register are set, enabling Conductor 2324 as an indication that a new Junctor Word is to be ordered into the memory. The last bit of both the new Call Progress Word and the new Junctor Gate Number, if any, enters the respective shift registers at bit 7, phase 0 time and in the illustrative example during word 20 time. At bit 7, phase 2 time AND Gate 2317 is energized to reset Order Word Register Stages 2309, 2311, and 2312, thereby de-energizing AND Gates 2103 and 2104 so that the phase 0 pulses on Conductors 2123 and 2124 are discontinued.

At the same bit 7, phase 2 time AND Gate 2115 is energized to set the Gate Line Word Flip-Flop 2116. Flip-Flop 2116 is reset at the next bit 7, phase 2 time and thus partially enables AND Gate 2105 for a word interval. AND Gates 2118 and 2119 are also enabled by Flip-Flop 2116 so that Conductor 2120 or 2121 is energized in accordance with the condition of Counter 2101. The results of the parity check on the order word as to parity satisfied or not satisfied are thus transmitted to the SEND circuit of Fig. 24 on Conductors 2120 or 2121, respectively, and are acted upon as previously described. The Insert Line Word AND Gate 2105 is enabled at phase 0 upon the operation of Flip-Flop 2116 if Counter 2101 indicates a satisfied parity check and if Order Word Stage 2310 is set indicating that a new Line Gate Number is to be inserted in the controller memory. When so enabled, AND Gate 2105 energizes Conductor 2125 thereby providing phase 0 pulses to AND Gates 1032 and 1031 at the Tenth Stage 1055 of the shift register in the controller Line Gate Number Memory Loop.

The bits of the Line Gate Number to be inserted in the controller memory appear on Conductor 2452 immediately following the bits of the Junctor Gate Number. They pass through Shift Register Stages 2107 and 2109 to energize Conductors 2110 and 2111 on a two-rail basis with the first bit of the Line Gate Number appearing at bit 8 time and in the illustrative example during word 20 time. The phase 0 pulse on Conductor 2125 inserts this bit into the tenth stage of the memory shift register so that at bit 1 and word 21 time of the illustrative example it will be in the desired position, stage 11, in the memory. At bit 7, phase 2 time as Flip-Flop 2116 is reset, AND Gate 2318 is also energized to reset stage 2310 of the order word register, thereby restoring this register to its normal reset condition.

If during a first trial memory insertion process as just described, the condition of Counter 2101 indicates that the parity check is not satisfied, AND Gate 2319 is partially enabled by Conductor 2112. With stage 2313 reset AND gate 2319 is energized during word 20, at the following bit 1, phase 2 time and Second Trial Flip-Flop 2320 is set. In this case, as previously described with respect to the SEND control circuits, a repetition of the memory insertion process will be made by the operator. If during this second trial the parity check is satisfied, AND Gate 2321 will be energized to reset the Second Trial Flip-Flop 2320. However, if on the second trial the parity check is again unsatisfied, Alarm Flip-Flop 2323 will be set through AND Gate 2322 and at the immediately following phase 0 time Flip-Flop 2320 will be reset through AND Gate 2344 and OR Gate 2325. Flip-Flop 2323, when set, energizes its associated lamp as an alarm indication at the controller. Flip-Flop 2323 is reset after maintenance effort by manual control means, not shown.

In this one specific illustrative embodiment the number of the called line is orally passed from the originating subscriber to the operator. In an automatic system of the type contemplated by the arrangements of Fig. 1A, a register would be provided to receive subscriber-originated destination signals as is well known in many modern switching systems, and the establishment of the call between the originating subscriber and the terminating subscriber would be automatically completed under commands from the common control such as 113A.

Having orally received the number of the called subscriber, the operator is now prepared to find an idle path between the originating and terminating subscribers. It is assumed at this point that the operator has a ready reference to idle and busy subscribers in the system. In the illustrative system, circuit arrangements for scanning to determine the supervisory state of a subscriber line and for matching a specific data word against data words of the same class in the circulating memories to determine its presence or absence have been described. It is obvious that in an automatic system similar circuit arrangements could be employed to provide such idle-busy line and trunk information to the Common Control 113A.

If the called subscriber line is idle, a path between the calling and called subscribers comprising an idle junctor in a common idle time slot is selected as previously described with the calling subscriber to operator connection. By use of the SEND circuit of the manual control and the INSERT circuit of the trunk or controller, the Trunk and Junctor Gate Numbers, and Call Progress Word in the trunk or circulating memory pertaining to this call are removed, thus releasing the path between the calling subscriber and the operator. The path between the calling and called subscribers is then established for ringing and talking in a similar manner by inserting the proper Line and Junctor Gate Numbers and Call Progress Words into the circulating memories of the calling and called concentrator controllers at the selected time slot position. This completes the ten steps in the previously enumerated outline of work operations required to establish a call.

Later, when one of the connected subscribers disconnects a hang-up service alert will be indicated by the energization of one of the lights such as 1223 through 1224 in the concentrator controller in which the disconnect request originated. As in other service alerts, the operator associates the RECEIVE portion of the manual control with the desired concentrator or trunkor by means of the Originating Switch 1500 and then operates the Service Alert Readout Key 2011 to detect the time slot in which the disconnect occurred, the Line Gate Number of the line requesting the disconnect, and the Junctor Number employed in this time slot. The process of bringing this information from the circulating memories to the receive displays is the same as was described in the case of a request-for-service service alert. However, in this instance a Junctor Gate Number is also displayed. Having recognized a disconnect signal, steps must be taken to locate the other end of the connection. In these arrangements either the originating or terminating subscriber may request the disconnect, and steps to locate the other subscriber are similar in either case.

In the process of locating the other end the Junctor Gate Number stored in Shift Register 2016 and displayed on Indicators 2045 and 2046 is compared with the Junctor Gate Numbers in all concentrator and trunkor controller memories by means of arrangements such as 1913. This process is started by the momentary operation of Locate-Other-End Key 1955 which sets Flip-Flop 1958 and is similar to the process previously described in connection with path selection for finding an idle junctor in the preferred common-idle time slot. The match enablement to AND Gate 1910 in this case is provided from AND Gate 1957, rather than from AND Gate 3538, thereby restricting the junctor match to the time slot in which the hang-up service alert occurred. The Junctor Gate Number in this case is obtained from Shift Register 2016 through a group of AND gates which are sequentially enabled during bit 1 to bit 5 times to provide the number serially on Conductor 2097 at the output of OR Gate 2096. This serial junctor gate number is transmitted through AND Gate 1956 and OR Gate 1904 to the various junctor matching arrangements such as 1913. All five bits of the Junctor Gate Number are employed in this matching operation, since in this case Flip-Flop 1909 is reset at bit 8, phase 0 time, rather than at the bit 1, phase 0 time employed during path selection. Furthermore, the connection between the least significant bit of the Junctor Gate Number in Register 2016 and Conductor 2097 is so arranged that the A junctor number of a junctor pair is transmitted to 2097 if the B number of the junctor pair is in Register 2016, and vice versa. During this process only one flip-flop such as 1911 will be operated, and only its associated light such as 1914 will be energized; since the arrangements of 1913 are individual to a concentrator or trunkor, the energized light will identify the other end of this conversational path on which a hang-up service alert has occurred.

Once the other end of the connection has been found, the operator, again by means of the manual controls of Figs. 22 and 24, may release the time slot in the originating and terminating concentrators.

The operations of the system with respect to a call from a subscriber in one remote concentrator to a subscriber in a second remote concentrator have been explained by way of example in the preceding description. For a call from one subscriber in a remote concentrator to a second subscriber in the same remote concentrator the operations are similar. However, one time slot must be assigned to the calling subscriber and a second time slot to the called subscriber, and arrangements must be provided for interchanging the pulse code modulation speech signals between these time slots. In one embodiment this interchange may be accomplished by establishing a connection from the calling subscriber to the concentrator and a junctor to terminals which connect to a special trunk circuit at a trunkor in one time slot and in a second time slot a connection from the called subscriber to the same trunk terminals. The trunk circuit in this case comprises merely a capacitor to ground at the trunk gate. As described in copending patent application of D. B. James and J. D. Johannesen Serial No. 702,149, filed December 11, 1957, a decoded analog voltage sample representative of the speech amplitude signal of one subscriber is temporarily stored on the capacitor for recoding and transmission to the second subscriber and is, in turn, replaced by a voltage sample from the second subscriber which is subsequently transmitted to the first subscriber.

The type of time slot interchange obtained through the arrangements disclosed in the above noted James and Johannesen copending patent application may be advantageously employed in the subject system to effect time slot frogging between concentrators. That is, with such arrangements it is possible to serve a subscriber in a first concentrator in a first time slot and connect this subscriber through such intermediate trunk arrangements to a subscriber in a second concentrator in a later time slot. Such arrangements may be advantageously employed in the event of switching network blocking to provide more efficient utilization of the central office switching network.

In addition to the various speech connections shown in the figures and described, it is to be understood that many other types of connections are possible in systems in accordance with our invention. Connections, for example, may be established on a voice frequency basis with other offices of this or existing types through a trunkor such as shown in Figs. 25 to 28. Connections may also be established on a pulse code modulation basis with other office modules of the same type by way of junctor pairs, interconnecting of the switching network in Fig. 17 of this module with the similar switching network in the other modules.

It is to be further understood that there has been shown but one specific illustrative embodiment of our invention and that many variations may be made without departing from the spirit and scope of the invention. For example, the manual controls employed herein may be readily replaced with common control arrangements such as are well known in the art. Further, the trunkor, although shown as being located at the central office with the concentrator and trunkor controllers, could well be located some distance from the central office if timing arrangements such as are employed in the concentrator were also employed in the trunkor. Also, although the description has related to connections in which a subscriber uses a single time slot, it must be understood that a circuit having greater bandwidth could be established between two distant points by the arrangements of this invention by assigning more than one time slot to such a connection. For example, if one were to assign two time slots equally spaced in time to such a connection, a transmission path having approximately twice the bandwidth would be provided, while if four time slots each equally spaced in time were assigned to such a connection, a transmission path having a bandwidth of approximately four times the single time slot arrangement would be achieved.

What is claimed is:

1. In a communication system, a plurality of subscriber lines, a time division switching network for establishing connections to said lines in distinct time slots of a repetitive cycle, a concentrator connecting said lines to said network, means for establishing a connection through said concentrator to said network in a particular time slot, and means in said concentrator for converting amplitude modulated signals from said lines to pulse code modulation signals for transmission to said network in said time slot.

2. The combination defined in claim 1 further comprising means in said concentrator for converting pulse code modulated signals from said network to amplitude modulated signals for transmission to said lines in said time slots.

3. In a communication system, a plurality of subscriber lines, a time division switching network for establishing connections to said lines in distinct time slots of a repetitive cycle, means for converting amplitude modulated signals from said lines to pulse code modulated signals, and means for transmitting said pulse code modulated signals through said network in a particular time slot.

4. In a communication system, a plurality of subscriber lines, a time division switching network for establishing connections to said lines in distinct time slots of a repetitive cycle, means for establishing a connection between a subscriber line and said network in a particular time slot, and means for converting amplitude modulated signals from said line to pulse code modulated signals for transmission through said network in said time slot.

5. The combination defined in claim 4 further comprising means for converting pulse code modulated signals from said network to amplitude modulated signals for transmission to said lines in said distinct time slots.

6. In a communication system, a plurality of subscriber lines, a central office, means in said office defining a plurality of distinct time slots in a repetitive office cycle, a concentrator connecting said lines to said central office, means for establishing a connection from a particular line to said central office through said concentrator in a particular time slot, and means in said concentrator for transmitting pulse code modulation signals to said office in response to signals from said subscriber lines.

7. In a communication system, a plurality of subscriber lines, a central office, means in said central office defining a plurality of time slots in a repetitive office cycle, and means for establishing a connection between any one of said lines and said central office in particular one of said time slots, said last-mentioned means including a concentrator connected between said lines and said central office, memory means in said central office, and control means in said concentrator responsive to signals from said memory means.

8. In a communication system, the combination as set forth in claim 7 further comprising means in said concentrator for converting amplitude modulated signals from said one line to pulse code modulated signals for transmission to said central office in said particular time slot assigned in said memory means to said one line.

9. In a communication system, the combination as set forth in claim 8 further comprising means in said concentrator for converting pulse code modulated signals from said central office to amplitude modulated signals for transmission to said one line in said particular time slot assigned in said memory means to said one line.

10. A communication switching system comprising a plurality of lines, a time division multiplex central office, a pulse code modulation time division multiplex line concentrator interconnected between said lines and said central office, concentrator control means in said central office including memory means, and means interconnecting said concentrator and said concentrator control means for the transmission of signals from said central office to said concentrator to control the establishment of a connection to a subscriber line in a particular time slot of the time division multiplex central office.

11. A communication switching system in accordance with claim 10 wherein said concentrator further includes means for converting signals from said subscriber line to pulse code modulated signals for transmission to said central office in said particular time slot.

12. A communication system as set forth in claim 11 further comprising means for converting pulse code modulated signals from said central office to amplitude modulated signals for transmission to said subscriber line in said particular time slot.

13. A communication switching system including a plurality of subscriber lines, a time division multiplex central office, a plurality of pulse code modulation time division multiplex line concentrators connected between said lines and said central office, concentrator control means in said central office individual to each of said concentrators and including memory means, and transmission means interconnecting said concentrators and said concentrator control means for the transmission of signals from said central office to said concentrators to control the establishment of connections to said subscriber lines in particular time slots of the time division multiplex central office.

14. In a communication system, a plurality of lines, a time division switching network for establishing connections to said lines in distinct time slots of a repetitive cycle, a concentrator interposed between said lines and said switching network, information transmission means connecting said concentrator and said switching network, means for establishing connections through said concentrator to said transmission means in particular time slots, and means in said concentrator for converting amplitude modulated signals from said lines to pulse code modulated signals for transmission to said switching network in said particular time slots.

15. A communication system as set forth in claim 14 further comprising means in said concentrator for converting pulse code modulated signals from said switching network to amplitude modulated signals for transmission to said lines in said particular time slots.

16. A communication system in accordance with claim 14 wherein said information transmission means comprises first and second unidirectional transmission means, said first means arranged for transmission of information from said concentrator to said switching network and second transmission means arranged for transmission of information from said switching network to said concentrator.

17. A communication system comprising a plurality of lines, a time division switching central office including means for defining a plurality of distinct time slots in a repetitive cycle, a concentrator, transmission means connecting said concentrator to said central office and having an inherent electrical delay, and means for establishing connections through said concentrator between said lines and said transmission means in particular time slots in said repetitive cycle, the particular time slots in said concentrator being delayed with respect to the same time slots in said central office by a time interval equal to the delay of said transmission means.

18. In a communication system, a plurality of subscriber lines, a central office, means in said central office defining a plurality of time slots in a repetitive office cycle, a time division switching network in said central office for establishing connections between subscriber lines of said plurality, a concentrator interposed between said subscriber lines and said central office, control means in said central office including a plurality of memory means and means for reading information from said memory means, means for transmitting information read from said memory means to said concentrator, and control means in said concentrator responsive to information from said memory means for establishing a connection through said concentrator.

19. A communication system as set forth in claim 18 wherein said memory means comprises circulating memory means.

20. A communication system as set forth in claim 19 wherein said circulating memory means comprises a delay line and a shift register.

21. A communication system as set forth in claim 18 wherein said control means in said central office further comprises means responsive to certain of said information read from said memory means for controlling said time division switching network.

22. In a communication system a plurality of subscriber lines, a central office, means in said central office defining a plurality of time slots in a repetitive office cycle, a time division switching network in said central office for establishing connections between said subscriber lines of said plurality, a concentrator interposed between said subscriber lines and said central office; information transmission means connected between said concentrator and said switching network; control means in said central office including memory means, means for reading information from said memory means, a plurality of pulse code modulation pulse sources representative of distinct tones, and first gating means responsive to information read from said memory means for connecting said sources to said transmission means.

23. In a communication system in accordance with claim 22 further comprising second gating means responsive to information read from said memory means for isolating said information transmission means and said switching network when one of said first gating means is energized.

24. A communication system in accordance with claim 22 wherein said pulse code modulation tone sources include a signal source representative of a discrete framing signal and wherein said system further comprises means for connecting said framing signal tone source to said transmission means, and means in said concentrator responsive to said framing signal for establishing a reference time in said remote concentrator.

25. In a communication system, a plurality of subscriber lines, a time division switching network for establishing connections to said lines in distinct time slots of a repetitive cycle, a concentrator interposed between said lines and said switching network, transmission means connecting said concentrator and said switching network, said means having a transmission delay and control means for adjusting the delay of said transmission means.

26. A time division communication system comprising a plurality of subscriber lines, means defining a plurality of distinct time slots in a repetitive office cycle, means for establishing a connection in one of said time slots between said calling line and a called one of said lines, said last-mentioned means including a plurality of junctors and junctor gates, means for detecting the state of each of said junctors in said time slots to identify a junctor which is idle in said one time slot, memory means, means for inserting into said memory in said one time slot identification of said calling subscriber said called subscriber, and said idle junctor, and means connecting said memory to said junctor gates for connecting said calling and called subscribers through said selected junctor in subsequent repetitive office cycles.

27. A time division communication system comprising means defining a plurality of distinct time slots in a repetitive office cycle, a plurality of lines, a plurality of junctors and associated junctor gates, a remote line concentrator connected to said lines transmission means connecting said concentrator to said junctor gates, a first memory containing the identity of a line to be connected to said concentrator in a predetermined time slot, means for applying the output of said first memory to said concentrator, a second memory containing the identity of a junctor to be connected to said transmission means in said particular time slot, means for applying the output of said second memory to said plurality of junctor gates, and a third memory containing information as to the state of said particular time slot.

28. A time division switching system comprising a central office, a remote line concentrator, a plurality of lines connected to said remote line concentrator, clock means in said central office for defining a repetitive office cycle of distinct time slots, for defining a plurality of bit times in each time slot, and for defining two phases of each bit time, slave clock means in said remote line concentrator for generating pulses defining a plurality of bit times at the same frequency as said bit times in said central office, commutation and gating means in said remote concentrator responsive to pulses from said slave clock for synthesizing said repetitive cycle of distinct time slots at said remote concentrator, means for transmitting coded information signals from said central office to said remote line concentrator, and means in said remote line concentrator responsive to said coded information signals for regulating said slave clock means.

29. The combination as set forth in claim 26 wherein each of said lines has an assigned address represented by a distinct code combination of bit pulses and wherein said coded information signals transmitted from said central office to said line concentrator comprise codes representative of said line addresses, and further comprising means in said concentrator responsive to said line addresses for establishing connections to said line.

30. The combination as set forth in claim 27 further comprising means in said central office for transmitting a particular signal in a particular time slot in said office cycle from said central office to said remote line concentrator, and means in said remote concentrator responsive to said particular signal to assure time regulation of said commutation means.

31. In a communication switching system the combination comprising a time and space division switching network including a plurality of communication paths, a plurality of junctors, a plurality of junctor gates for selectively connecting said paths to said junctors, central office means including means for defining distinct time slots in a repetitive cycle, memory means wherein codes representative of particular ones of said junctor gates are stored, means for reading said codes from said memory means during said distinct time slots, and means responsive to signals from said reading means in selected ones of said time slots for enabling said particular ones of said junctor gates.

32. The combination defined in claim 31 wherein said memory means comprises a circulating memory means.

33. The combination defined in claim 31 wherein said circulating memory comprises a delay line and a shift register.

34. In a communication switching system the combination comprising a plurality of lines each having a fixed address, a time division central office including means for defining distinct time slots in a repetitive cycle, for defining distinct frames comprising a plurality of said distinct time slots and for defining scanning cycles comprising one or more of said frames; memory means wherein codes representative of the addresses of lines to be scanned are stored; means for incrementing the codes stored in said memory means by a count of one at the end of each of said scanning cycles; a concentrator interposed between said lines and said central office; first and second information transmission means connected in opposite sense between said concentrator and said central office; control transmission means connected in the same sense as said first transmission means and arranged to transmit information from said central office to said concentrator; means for reading the address codes from said memory means; means for serially transmitting the output signals from said reading means to said control transmission means; means in said concentrator responsive to said signals on said control transmission means for generating scanner output signals representative of the supervisory state of the lines scanned; and means in said concentrator for transmitting said scanner output signals to said central office over said second information transmission means.

35. The combination defined in claim 34 further comprising means for inhibiting said means for incrementing by a count of one whenever said incrementing process would result in an undesired code, and means for incrementing the code stored in said memory by a count of two whenever said inhibiting means is energized.

36. The combination defined in claim 34 wherein said central office further comprises means for establishing connections through said concentrator between particular ones of said lines and said first and second transmission means in selected ones of said time slots, said means for establishing connections including second memory means wherein codes representative of the lines to be connected are stored, third memory means wherein codes representative of the service state of the distinct time slots are stored, means for reading the codes from said second and third memory means, and means responsive to said scanner output signals and said information read from said second and third memory means for maintaining the information in said third memory means in a current state.

37. A time division multiplex line concentrator comprising a plurality of two-wire subscriber lines, bidirectional transmission means; bidirectional line gates individual to said subscriber lines; pulse amplitude modulation to pulse code modulation encoding means connected to said transmission means, a plurality of sending means connected in common to said line gates, each of said sending means comprising an input send gate, a storage capacitor, and an output send gate, said output send gates arranged to connect said capacitors to said encoding means; receiving means connected in common to said line gates, said receiving means including input and output gating means and pulse code modulation to pulse amplitude modulation decoding means; and means for selectively energizing said line gates, said input and output send gates and said receiving gates to convey information from a selected one of said plurality of lines to said encoding means and to convey information from said decoding means to said selected one of said lines.

38. A time division multiplex line concentrator in accordance with claim 37 wherein said means for energizing comprises means for simultaneously energizing a selected one of said line gates and one of said sending means input gates, means for de-energizing said one sending input gate a fixed period of time after said one sending input gate is energized, means for energizing said receiving means output gate a fixed guard period of time after said one sending input gate is de-energized, and means for simultaneously de-energizing said selected line gate and said receiving output gate after a discrete receiving transfer period has elapsed.

39. A time division multiplex line concentrator in accordance with claim 38 wherein said means for energizing includes means for energizing said second sending means input gate prior to the time said first sending means output gate is de-energized.

40. A time division multiplex line concentrator comprising a plurality of two-wire subscriber lines each having a particular address; a common bidirectional transmission means, bidirectional line gates individual to said lines for selectively connecting said lines to said transmission means and for sampling the supervisory state of said subscriber lines; means for selectively energizing said line gates; first and second transmission means arranged for transmission of information in opposite directions; pulse amplitude modulation to pulse code modulation encoding means connected to said first transmission means, first and second sending means for connecting said common transmission means to said second encoding means; each of said sending means comprising an input send gate, a storage capacitor, and an output send gate, said output send gates arranged to connect said capacitors to said encoding means on an alternate basis; receiving means for connecting said second transmission means to said common means, said receiving means including input and output gating means and pulse code modulation to pulse amplitude modulation decoding means, control transmission means connected to said energizing means and responsive to information received over said control transmission means, said information comprising coded signals representative of the addresses of said line gates; a scanner output gate; an encoding output gate; a frame correct output gate; means for selectively energizing said scanner output gate in response to a discrete framing signal on said second transmission means; means for inhibiting said send input gates, said receive output gate, and said encoding output gate when said scanner output gate is enabled, and means responsive to said discrete framing signal for generating a frame correct signal to be transmitted to said second transmission means.

41. In a time division communication switching system, a first plurality of communication paths, a second plurality of communication paths remote from said first plurality, control means for defining a plurality of time slots in a repetitive cycle at said first and second plurality of communication paths, and means for transmitting pulse code modulated signals between selected ones of said first and second plurality of paths in particular time slots common to said first and second plurality of paths.

42. A communication system comprising a plurality of lines, a time division central office including means for defining a plurality of distinct time slots in a repetitive cycle, for defining a plurality of bit times in each time slot, and for defining two phases of each bit time; a concentrator; first and second transmission means connecting said concentrator to said central office, each of said means having an inherent transmission delay; means for transmitting a discrete framing signal from said central office to said remote concentrator over said first transmission means; means in said concentrator responsive to said discrete signal for transmitting a signal over said second transmission means acknowledging receipt of said discrete signal; variable time delay means in circuit with said second transmission means; and means responsive to the time of receipt of said acknowledgment signal relative to the time of transmission of said discrete signal for generating an alarm signal if said acknowledgment signal is not received within prescribed limits of time.

43. In a communication system, the combination comprising a time and space division switching network including a plurality of pairs of lines connected in opposite sense; a plurality of junctors; a plurality of junctor gates for selectively connecting said lines to said junctors; central office means including means for defining distinct time slots in a repetitive cycle; a plurality of first memory means wherein codes representative of particular ones of said junctor gates are stored, each of said memory means discrete to said pairs of lines; means for reading said codes from said memory means during said distinct time slots; means for determining whether a particular junctor is idle in a particular preferred time slot, said means for determining including a second memory means wherein the code representative of said particular junctor is stored; comparison means individual to each of said plurality of first memory means for comparing the codes stored in said second memory means with those stored in said first memory means in said particular time slot; and gating means for providing an output signal whenever said particular junctor is idle in said particular preferred time slot.

44. A communication system in accordance with claim 43 comprising in addition means for incrementing the code in said second memory means by a discrete amount each time the junctor represented by the original code in said second memory is found to be busy in said particular preferred time slot, and means for terminating said incrementing process and for providing a junctor found signal upon occurrence of a signal from said gating means.

45. A communication system comprising a plurality of subscriber lines; a time division central office; a remote concentrator interposed between said subscriber lines and said central office; means in said central office for defining a plurality of time slots in a repetitive cycle; a time division switching network in said central office; control means for establishing connections through said concentrator and said time division switching network in a particular time slot; a plurality of memory means comprising first memory means wherein codes representative of the lines to be connected through said concentrator in a particular time slot are stored, second memory means wherein codes representative of the connections to be established in said time division switching network in said particular time slots are stored, third memory means wherein call progress words representative of the service states of the particular time slots are stored; common memory means wherein codes representative of lines to be scanned are stored; means for transmitting one of said scanning codes to said remote concentrator in a definite one of said time slots; means in said concentrator responsive to said one scanning code for transmitting to said central office a signal representative of the supervisory state of the line scanned; comparison means to determine whether said line being scanned is served in any of said time slots; means for generating a first particular signal if said line is found to be in the off-hook condition and not served in one of the plurality of time slots; means for detecting an idle time slot; means responsive to said first particular signal for inserting the code representative of the line scanned in said first memory means in said indicated idle time slot; and means for inserting a code in said third memory means representative of the call progress word indicating a suspected request for service.

46. A communication system in accordance with claim 45 further comprising means for generating a second particular signal if said scanned line is found to be in the off-hook state and the line gate number representative of the scanned line is stored in said second memory, and means responsive to said second particular signal for inserting in said third memory means a code representative of a verified request for service, which is one of a plurality of service alert codes, if said second particular signal occurs in a time slot in which the call progress word code in said third memory indicates a suspected request for service.

47. A communication system in accordance with claim 46 further comprising register means responsive to said second particular signal for registering a service alert code indicative of a verified request for service, comparison means for comparing the codes stored in said register means with the codes stored in said third memory means, and means responsive to output signals from said comparison means for registering the identity of the time slot in which said service alert occurred.

48. A communication system in accordance with claim 45 including means for reading the call progress word codes from said third memory means, decoding means connected to said reading means, said decoding means for generating a signal on a time slot idle conductor whenever the code read from said third memory means indicates the time slot to be idle, and means for comparing the time slot idle conductors associated with a pair of said third memory means for providing a common idle time slot signal whenever said time slot is indicated to be idle in both of the said third memory means.

49. A communication system comprising a plurality of subscriber lines; a time division central office; a remote concentrator interposed between said subscriber lines and said central office; means in said central office for defining a plurality of time slots in a repetitive office cycle; a time division switching network in said central office; control means for establishing connections through said concentrator and said time division switching network in a particular time slot; a plurality of memory means comprising first memory means wherein codes representative of the lines to be connected through said concentrator in a particular time slot are stored, second memory means wherein codes representative of the connections to be established in said time division switching network in said particular time slots are stored, third memory means wherein the call progress words representative of the service states of the particular time slots are stored, fourth memory means wherein codes representative of lines to be scanned are stored; means for reading codes stored in said memory means; means for transmitting one of said scanning codes to said remote concentrator in a definite one of said time slots; means in said concentrator responsive to said one scanning code for transmitting to said central office a signal representative of the supervisory state of the line scanned; comparison means to determine whether said line being scanned is served in any of said time slots; a pulse code modulation source representative of ringing tone; gating means responsive to information read from said third memory means for connecting said pulse code modulation source to said concentrator in particular time slots; means for generating a particular signal if said scanned line is found to be in the off-hook condition and served in a time slot in which said pulse code modulation source is connected to said concentrator; means responsive to said particular signal for inserting a code representative of the call progress word which indicates an answer in said third memory means; and means for establishing a connection between said concentrator and said time division switching network in said time slot in which said scanned line is served in subsequent repetitive office cycles.

50. A communication system in accordance with claim 49 further comprising means for generating a second particular signal if said scanned line is found to be in the on-hook state and the line gate number representative of the scanned line is stored in said first memory, and means responsive to said second discrete signal for inserting in said third memory means a code representative of a hang-up, which is one of a plurality of service alert codes, if said second discrete signal occurs in a time slot in which the call progress word code stored in said third memory means indicates a talking condition.

51. In a communication switching system, a time division switching network including a plurality of pairs of transmission paths, a plurality of junctors, a plurality of junctor gates for connecting said paths to said junctors, central office means including means for defining distinct time slots in a repetitive cycle, a plurality of control means individual to said pairs of paths, each of said control means comprising a first memory means wherein codes representative of the connections to be established between said paths and said junctors in particular time slots are stored, second memory means wherein call progress words representative of the service states of the particular time slots are stored, reading means connected to said second memory means, an idle time slot conductor, decoding means connected to said reading means, said decoding means arranged to energize said idle time slot conductor whenever the code read from said second memory means indicates the time slot to be idle, means for comparing the idle time slot conductors associated with first and second ones of said control means for providing a common idle time slot signal whenever said time slot is indicated to be idle in both of said second memory means, memory means responsive to said common idle time slot signal for maintaining a record of said common idle time slots, means for determining whether a particular junctor is idle in a particular preferred time slot, said determining means including a third memory means wherein the code representative of said particular junctor is stored, comparison means individual to each of said first and second control means for comparing the codes stored in said first memory means with those stored in said third memory means in said particular preferred time slot, gating means for providing an output signal whenever said particular junctor is idle in said particular preferred time slot, gating means for providing an output signal whenever all of said plurality of junctors are busy in said particular preferred time slot, means for subsequently comparing the code stored in said third memory means with the codes stored in the first memory means of said first and second control means in the remaining common idle time slots, means for generating a junctor idle signal whenever the code stored in said third memory means is not found in either of said first memory means during a common idle time slot, and means for terminating said comparison process in response to said junctor idle signal.

52. In a communication system, a plurality of pairs of communication paths; a central office including means for defining a plurality of time slots in a repetitive office cycle; a time division switching network including a plurality of junctors and associated junctor gates for selectively connecting said junctors to first and second ones of said pairs of paths in particular time slots; control means individual to said pairs of paths, each of said control means comprising a first memory means wherein codes representative of the connections to be established between said pairs of paths and said junctors in said particular time slots are stored, a second memory means wherein call progress word codes representative of the service states of the particular time slots are stored, means for reading information from said memory means, translation means individual to said control means and responsive to codes read from said second memory means for generating a service alert signal representative of a hang-up state; means responsive to said hang-up service alert signal from said translation means in one of said control means for entering in a first register the code representative of the junctor connected to one of said pairs of paths in said particular time slot and for entering in a second register the identity of the time slot in which the hang-up occurred; comparison means individual to said control means for comparing the junctor code registered in said first register with the junctor codes stored in said first memory means in other than said one control means; and indication means individual to said control means, said indication means responsive to said comparison means to indicate and register the identity of other paths connected to said junctor in said time slot in which said hang-up service alert occurred.

53. A time division multiplex line concentrator comprising a plurality of two-wire subscriber lines, bidirectional transmission means, bidirectional line gates individual to said subscriber lines; pulse amplitude modulation to pulse code modulation encoding means connected to said transmission means; sending means connected in common to said line gates, said sending means comprising an input send gate, a storage capacitor, and an output send gate, said output send gate arranged to connect said capacitor to said encoding means; receiving means connected in common to said line gates, said receiving means including input and output gating means and pulse code modulation to pulse amplitude modulation decoding means; and means for selectively energizing said line gates, said input and output send gates and said receiving gates to convey information from a selected one of said plurality of lines to said encoding means and to convey information from said decoding means to said selected one of said lines.

54. A communication system in accordance with claim 42 wherein said concentrator further comprises means for transmitting communication information signals to said central office over said second transmission means and means in said central office responsive to the time of receipt of said communication information signals from said concentrator relative to the elements of the repetitive cycle for establishing the setting of said variable delay means.

References Cited in the file of this patent

UNITED STATES PATENTS 2,773,934 Trousdale ------------- Dec. 16, 1956